United States Patent
Guigues et al.

(10) Patent No.: US 10,839,203 B1
(45) Date of Patent: Nov. 17, 2020

(54) RECOGNIZING AND TRACKING POSES USING DIGITAL IMAGERY CAPTURED FROM MULTIPLE FIELDS OF VIEW

(71) Applicant: Amazon Technologies, Inc., Seattle, WA (US)

(72) Inventors: Jean Laurent Guigues, Seattle, WA (US); Leonid Pishchulin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 3 days.

(21) Appl. No.: 15/391,821

(22) Filed: Dec. 27, 2016

(51) Int. Cl.
| G06K 9/00 | (2006.01) |
| G06T 7/77 | (2017.01) |
| G06T 7/292 | (2017.01) |
| G06K 9/62 | (2006.01) |
| G06K 9/48 | (2006.01) |
| H04N 7/18 | (2006.01) |

(52) U.S. Cl.
CPC ..... *G06K 9/00362* (2013.01); *G06K 9/00771* (2013.01); *G06K 9/481* (2013.01); *G06K 9/623* (2013.01); *G06K 9/6256* (2013.01); *G06K 9/6277* (2013.01); *G06T 7/292* (2017.01); *G06T 7/77* (2017.01); *H04N 7/181* (2013.01); *G06T 2207/20044* (2013.01); *G06T 2207/30232* (2013.01); *G06T 2207/30241* (2013.01)

(58) Field of Classification Search
None
See application file for complete search history.

(56) References Cited

U.S. PATENT DOCUMENTS

| 7,225,980 B2 | 6/2007 | Ku et al. |
| 7,949,568 B2 | 5/2011 | Fano et al. |
| 8,009,864 B2 | 8/2011 | Linaker et al. |
| 8,175,925 B1 | 5/2012 | Rouaix |
| 8,189,855 B2 | 5/2012 | Opalach et al. |
| 8,285,060 B2 | 10/2012 | Cobb et al. |
| 8,369,622 B1 | 2/2013 | Hsu et al. |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Nancy Bitar
(74) *Attorney, Agent, or Firm* — Athorus, PLLC

(57) ABSTRACT

Poses or gestures of actors within a scene may be detected and tracked using multiple imaging devices aligned with fields of view that overlap at least in part. Images captured by the imaging devices may be synchronized and provided to a classifier to recognize body parts within the images, and score maps indicative of locations of peak probabilities that the images include the respective body parts may be generated. Locations of peak values within the score maps may be correlated with one another to confirm that a given body part is depicted in two or more fields of view, and vectors indicative of distances to or ranges of motion of body parts, with respect to the given body part, may be generated. Motion of the body parts may be tracked in subsequent images, and a virtual model of the body parts may be generated and updated based on the motion.

23 Claims, 41 Drawing Sheets

(56) References Cited

U.S. PATENT DOCUMENTS

| | | | |
|---|---|---|---|
| 8,423,431 | B1 | 4/2013 | Rouaix et al. |
| RE44,225 | E | 5/2013 | Aviv |
| 8,630,924 | B2 | 1/2014 | Groenevelt et al. |
| 8,688,598 | B1 | 4/2014 | Shakes et al. |
| 8,943,441 | B1 | 1/2015 | Patrick et al. |
| 9,158,974 | B1 | 10/2015 | Laska et al. |
| 9,208,675 | B2 | 12/2015 | Xu et al. |
| 9,449,233 | B2* | 9/2016 | Taylor ............... G06T 7/11 |
| 9,473,747 | B2 | 10/2016 | Kobres et al. |
| 9,727,838 | B2 | 8/2017 | Campbell |
| 9,846,840 | B1 | 12/2017 | Lin et al. |
| 9,898,677 | B1 | 2/2018 | Andjelković et al. |
| 9,911,290 | B1* | 3/2018 | Zalewski ............ G06Q 20/327 |
| 10,192,415 | B2 | 1/2019 | Heitz et al. |
| 2003/0002712 | A1 | 1/2003 | Steenburgh et al. |
| 2003/0002717 | A1* | 1/2003 | Hamid ............... G06K 9/0002 |
| | | | 382/124 |
| 2003/0128337 | A1 | 7/2003 | Jaynes et al. |
| 2004/0181467 | A1 | 9/2004 | Raiyani et al. |
| 2006/0222206 | A1 | 10/2006 | Garoutte |
| 2007/0182818 | A1 | 8/2007 | Buehler |
| 2008/0055087 | A1 | 3/2008 | Horii et al. |
| 2008/0077511 | A1 | 3/2008 | Zimmerman |
| 2008/0109114 | A1 | 5/2008 | Orita et al. |
| 2008/0137989 | A1 | 6/2008 | Ng et al. |
| 2008/0193010 | A1 | 8/2008 | Eaton et al. |
| 2009/0060352 | A1 | 3/2009 | Distante et al. |
| 2009/0121017 | A1 | 5/2009 | Cato et al. |
| 2009/0132371 | A1 | 5/2009 | Strietzel et al. |
| 2009/0210367 | A1 | 8/2009 | Armstrong et al. |
| 2009/0245573 | A1* | 10/2009 | Saptharishi ........ G06K 9/00771 |
| | | | 382/103 |
| 2009/0276705 | A1 | 11/2009 | Ozdemir et al. |
| 2010/0002082 | A1 | 1/2010 | Buehler et al. |
| 2010/0033574 | A1 | 2/2010 | Ran et al. |
| 2011/0011936 | A1* | 1/2011 | Morandi ............... G06K 9/00 |
| | | | 235/454 |
| 2011/0205022 | A1 | 8/2011 | Cavallaro et al. |
| 2012/0257789 | A1 | 10/2012 | Lee et al. |
| 2012/0284132 | A1 | 11/2012 | Kim et al. |
| 2013/0076898 | A1 | 3/2013 | Philippe et al. |
| 2013/0253700 | A1 | 9/2013 | Carson et al. |
| 2014/0139633 | A1 | 5/2014 | Wang et al. |
| 2014/0279294 | A1 | 9/2014 | Field-Darragh et al. |
| 2014/0362195 | A1 | 12/2014 | Ng-Thow-Hing et al. |
| 2014/0362223 | A1* | 12/2014 | LaCroix ............... H04N 7/183 |
| | | | 348/150 |
| 2014/0379296 | A1 | 12/2014 | Nathan et al. |
| 2015/0019391 | A1 | 1/2015 | Kumar et al. |
| 2015/0073907 | A1 | 3/2015 | Purves et al. |
| 2015/0269143 | A1 | 9/2015 | Park et al. |
| 2015/0294483 | A1 | 10/2015 | Wells et al. |
| 2016/0003636 | A1 | 1/2016 | Ng-Thow-Hing et al. |
| 2016/0127641 | A1 | 5/2016 | Gove |
| 2016/0292881 | A1 | 10/2016 | Bose et al. |
| 2016/0307335 | A1 | 10/2016 | Perry et al. |
| 2017/0345165 | A1 | 11/2017 | Stanhill et al. |
| 2018/0084242 | A1 | 3/2018 | Rublee et al. |
| 2018/0164103 | A1 | 6/2018 | Hill |
| 2018/0218515 | A1 | 8/2018 | Terekhov et al. |
| 2018/0315329 | A1 | 11/2018 | D'Amato et al. |
| 2018/0343442 | A1 | 11/2018 | Yoshikawa et al. |
| 2019/0315329 | A1* | 10/2019 | Adamski ............... B60T 15/182 |

OTHER PUBLICATIONS

Cristian Pop, "Introduction to the BodyCom Technology", Microchip AN1391, May 2, 2011, pp. 1-26, vol. AN1391, No. DS01391A, Publisher: 2011 Microchip Technology Inc.

Ciplak G, Telceken S., "Moving Object Tracking Within Surveillance Video Sequences Based on EDContours," 2015 9th International Conference on Electrical and Electronics Engineering (ELECO), Nov. 26, 2015 (pp. 720-723). IEEE.

Fuentes et al., "People tracking in surveillance applications," Proceedings 2nd IEEE Int. Workshop on PETS, Kauai, Hawaii, USA, Dec. 9, 2001, 6 pages.

Manocha et al., "Object Tracking Techniques for Video Tracking: A Survey," The International Journal of Engineering and Science (IJES), vol. 3, Issue 6, pp. 25-29, 2014.

Phalke K, Hegadi R., "Pixel Based Object Tracking," 2015 2nd International Conference on Signal Processing and Integrated Networks (SPIN), Feb. 19, 2015 (pp. 575-578). IEEE.

Sikdar A, Zheng YF, Xuan D., "Robust Object Tracking in the X-Z Domain," 2016 IEEE International Conference on Multisensor Fusion and Integration for Intelligent Systems (MFI), Sep. 19, 2016 (pp. 499-504). IEEE.

* cited by examiner

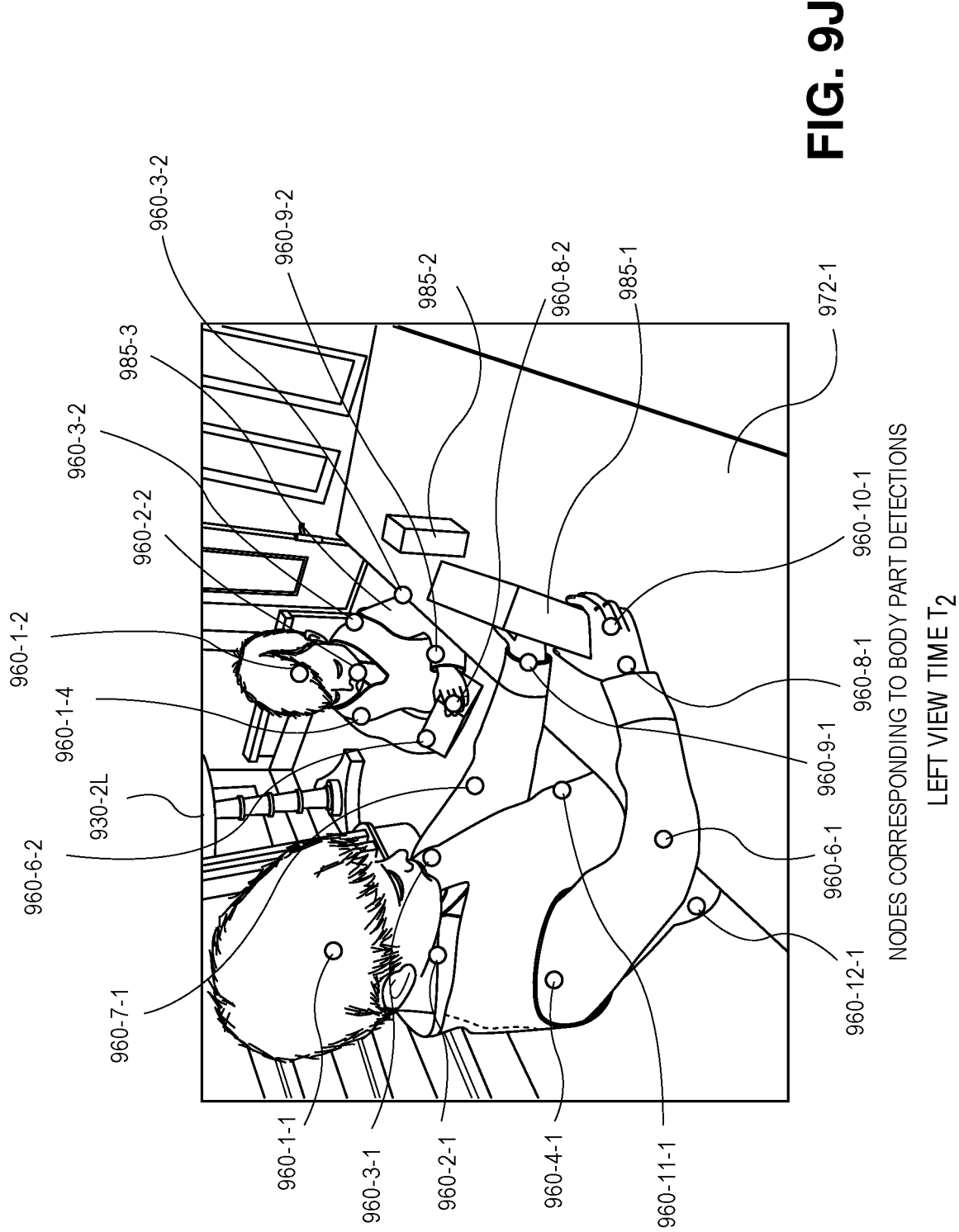

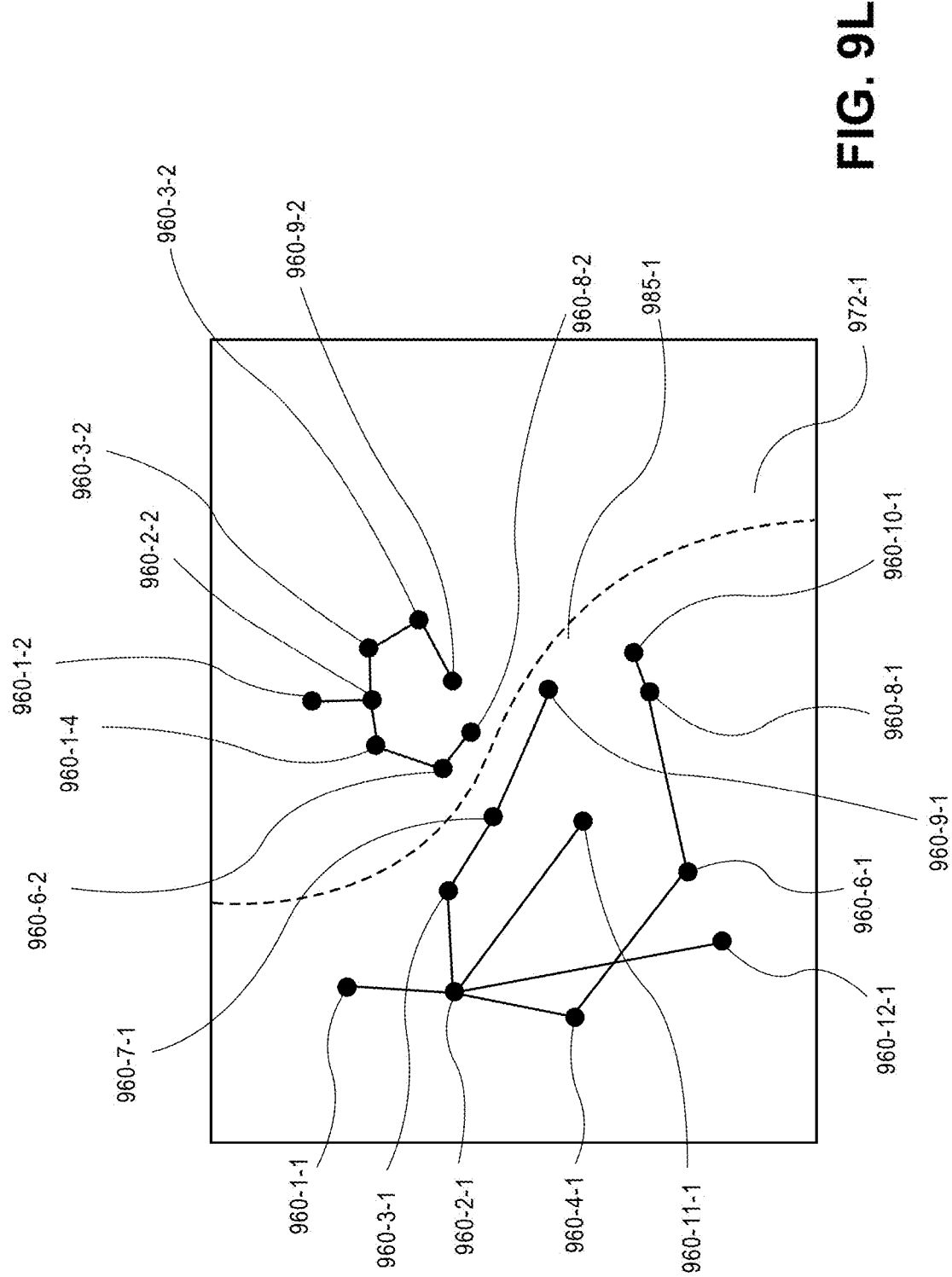

RECOGNIZING AND TRACKING POSES USING DIGITAL IMAGERY CAPTURED FROM MULTIPLE FIELDS OF VIEW

BACKGROUND

Today, imaging devices such as digital cameras are frequently used for conducting surveillance or monitoring operations. For example, digital cameras are also often used to monitor the arrivals or departures of goods or the performance of services in materials handling facilities such as warehouses, fulfillment centers, retail establishments or other like facilities, as well as the travels of persons or objects in locations such as airports, stadiums or other dense environments, or the flow of traffic on one or more sidewalks, roadways or highways. Digital cameras are commonplace in financial settings such as banks or casinos, where money changes hands in large amounts or at high rates of speed.

When conducting surveillance or monitoring operations, digital cameras may be aligned and configured to capture imaging data such as still or moving images of actions or events occurring within their respective fields of view. Information regarding the captured imaging data or the observed actions or events may be subjected to further analysis to identify aspects, elements or features of the content expressed therein. In performing such operations, digital cameras may be utilized alone or in groups, and programmed to recognize when an action or event has occurred, such as when a frame-to-frame analysis of video imagery suggests that a predetermined threshold has been exceeded or that a predetermined condition has been satisfied, or otherwise implies that the action or the event has occurred based on information or data captured by the digital cameras.

In dynamic environments such as materials handling facilities, transportation centers, financial institutions or like structures in which diverse collections of people, objects or machines enter and exit from such environments at regular or irregular times or on predictable or unpredictable schedules, it is frequently difficult to recognize poses, gestures, actions or other aspects of motion of one or more actors occurring within the fields of view of multiple digital cameras or other imaging devices. In particular, where a digital camera has a fixed orientation, or where a field of view of the digital camera includes large numbers of people, objects or machines that have varying sizes or shapes and travel at varying velocities, recognizing a pose of a single actor, or recognizing and distinguishing between poses of multiple actors, may be exceptionally challenging.

BRIEF DESCRIPTION OF THE DRAWINGS

FIGS. 9A through 9L are views of aspects of one system for recognizing and tracking poses using digital imagery captured from multiple fields of view in accordance with implementations of the present disclosure

DETAILED DESCRIPTION

As is set forth in greater detail below, the present disclosure is directed to recognizing poses or gestures of one or more actors within a scene using digital imagery captured from the scene by multiple imaging devices and from multiple fields of view, and defining and refining graphical models of such poses or gestures. More specifically, one or more implementations of the present disclosure are directed to capturing series of digital images of a scene from two or more calibrated color cameras having overlapping fields of view. The digital images may be synchronized, e.g., in real time as the digital images are captured or at a later time, and processed to recognize one or more body parts therein using one or more classifiers, such as artificial neural networks or support vector machines. The classifiers may be used to detect one or more candidates of body parts of actors within the scene, to identify one or more of such candidates that are compatible with one another, and to determine that one or more of such candidates are incompatible with one another.

Where a body part of an actor has been recognized within the fields of view of two or more imaging devices to a sufficiently high degree of confidence, the body part may be confirmed to be present within the scene. Moreover, once a body part of an actor has been detected within a field of view of an imaging device, the body part may be associated with other body parts of the actor, based on probable and/or predicted physiological parameters or constraints, including but not limited to distances between such parts, or ranges of motion of such parts. Where such candidates are detected within image frames captured using two or more imaging devices at various times, the candidates may be modeled as nodes or points of a graph, with a number of edges or line segments connecting such points. Multiple sets of edges may be so defined, including edges that extend between nodes corresponding to a body part that is depicted in different frames captured from the same view, as well as edges that extend between nodes corresponding to a body part that is depicted in image frames captured at the same time from different views, and edges that extend between nodes corresponding to body parts that are depicted within a single frame. Motion of an actor's body parts may be collectively recognized and tracked through the fields of view of one or more of the multiple imaging devices, and poses or gestures performed by the actor may be recognized accordingly. An articulated model, e.g., a virtual skeleton, of the actor may be defined by probabilistically merging the nodes and/or otherwise contracting the edges between such nodes.

Figure 1A:
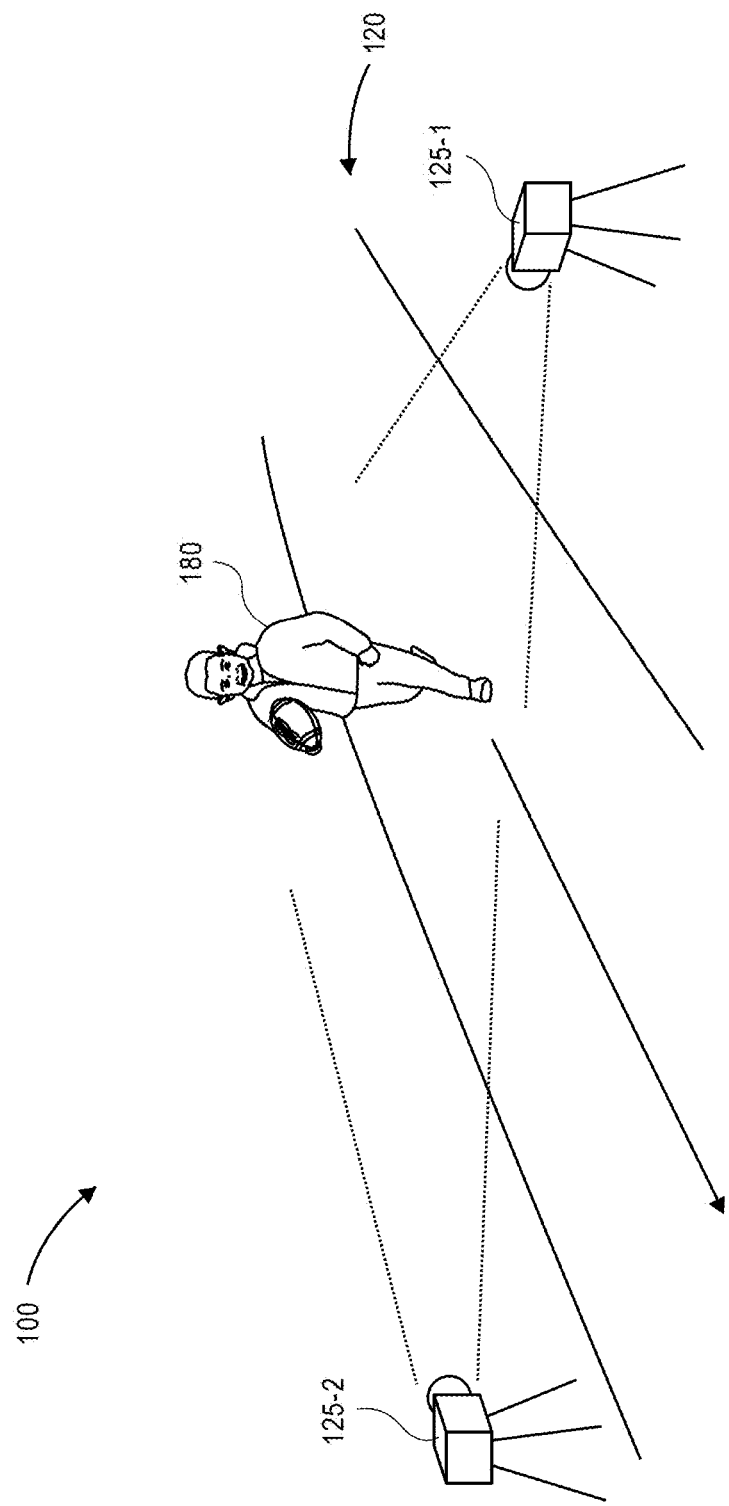
FIGS. 1A through 1J are views of aspects of one system for recognizing and tracking poses using digital imagery captured from multiple fields of view in accordance with implementations of the present disclosure.

Referring to FIGS. 1A through 1J, views of aspects of one system 100 for recognizing and tracking poses using digital imagery captured from multiple fields of view in accordance with implementations of the present disclosure are shown. As is shown in FIG. 1A, the system 100 includes a scene 120 having a pair of imaging devices 125-1, 125-2 (e.g., digital cameras). The scene 120 may be any open or enclosed environment or space in which any number of actors (e.g., humans, other animals or machines) may execute one or more poses, gestures or other actions within the fields of view of the imaging devices 125-1, 125-2. Additionally, the imaging devices 125-1, 125-2 are aligned with fields of view that overlap over at least in part over a portion of the scene 120, and are configured to capture imaging data, such as still or moving images, from the scene 120. As is shown in FIG. 1A, an actor 180 is executing one or more poses or gestures in the scene 120, e.g., the actor 180 is running through the scene 120, and such gestures occur within the respective fields of view of each of the imaging devices 125-1, 125-2.

Figure 1B:
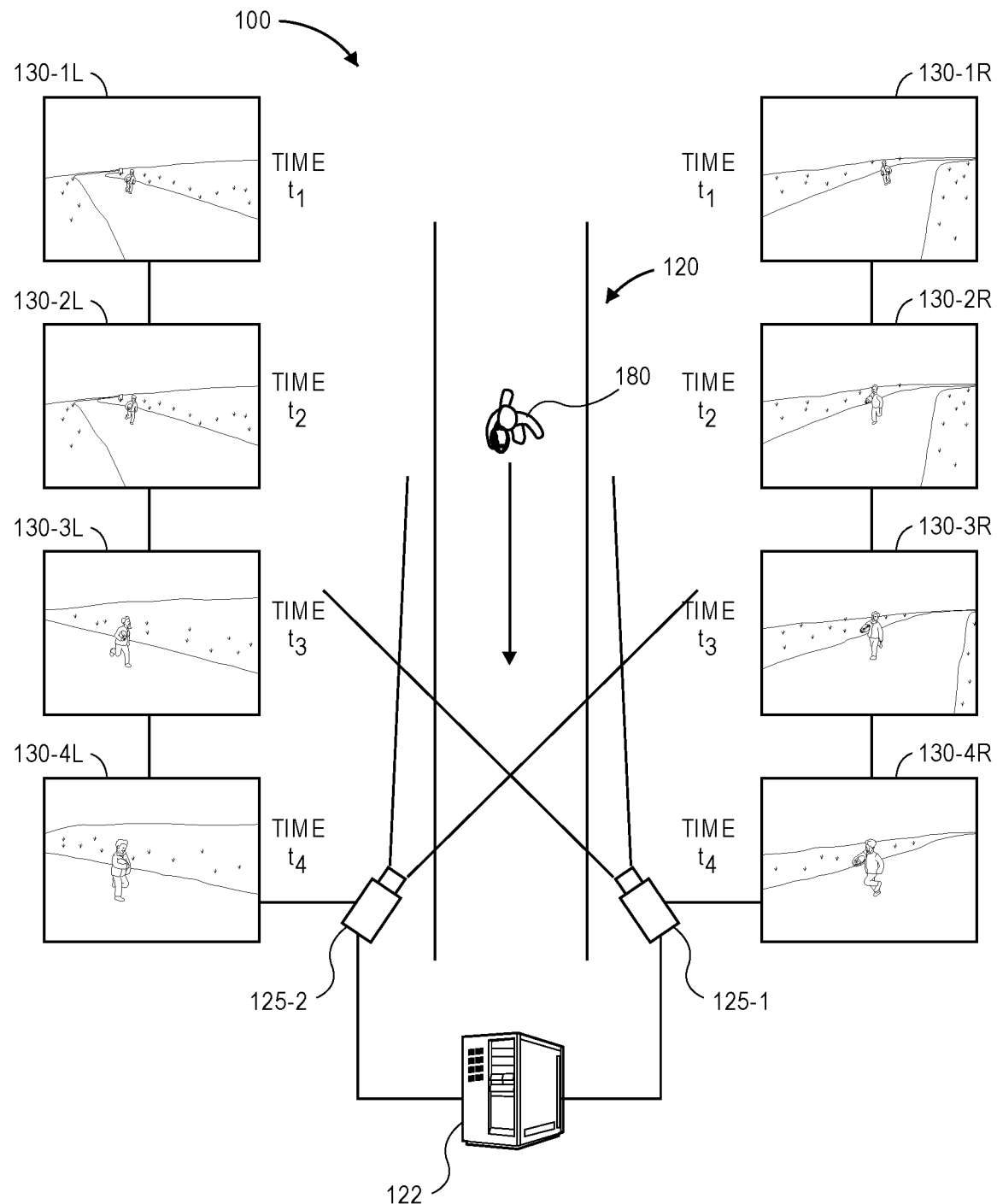

As is shown in FIG. 1B, the imaging devices 125-1, 125-2 are configured to capture visual imaging data, e.g., a series of image frames, of the actor 180 within the scene 120. For example, the imaging device 125-1 is shown as capturing a series of image frames 130-1R, 130-2R, 130-3R, 130-4R including the actor 180 within the field of view of the imaging device 125-1 as the actor 180 performs one or more gestures at times $t_1$, $t_2$, $t_3$, $t_4$, and so on. Concurrently, the imaging device 125-2 is shown as capturing a series of image frames 130-1L, 130-2L, 130-3L, 130-4L including the actor 180 within the field of view of the imaging device 125-2 as the actor 180 performs the one or more gestures therein, also at times $t_1$, $t_2$, $t_3$, $t_4$, and so on. The imaging devices 125-1, 125-2 are in communication with a server 122 (or another network-connected computer device or computer resource).

Figure 1C:
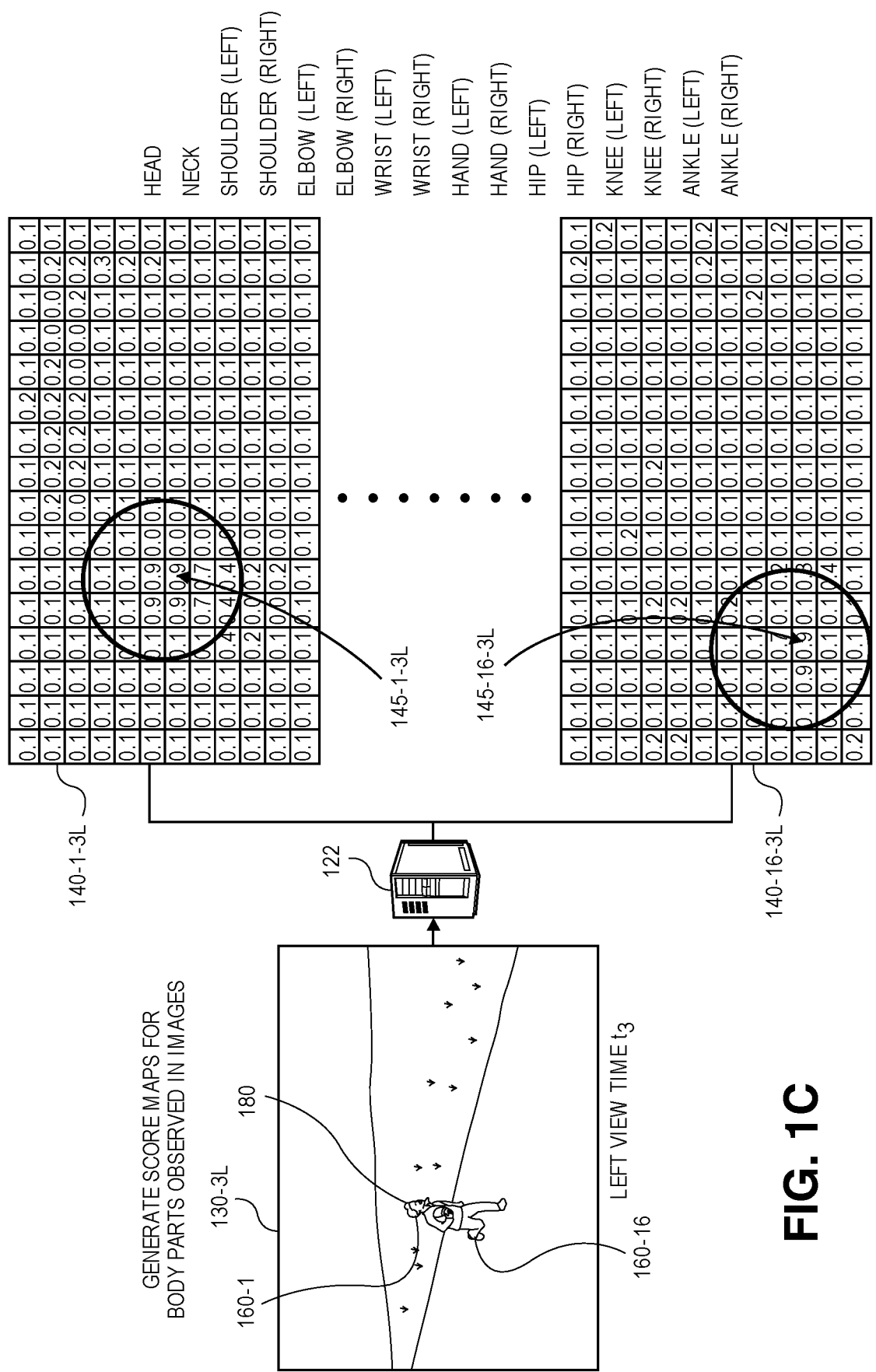

In accordance with the present disclosure, when an image frame is captured of an actor during the performance of one or more poses or gestures within a field of view of an imaging device, a score map identifying which portions of the image frame, if any, include one of a predetermined number of body parts (e.g., joints) therein may be generated. As is shown in FIG. 1C, one or more of the image frames 130-1R, 130-2R, 130-3R, 130-4R, 130-1L, 130-2L, 130-3L, 130-4L, viz., the image frame 130-3L captured from the left view of the imaging device 125-1 at time $t_3$, are provided to the server 122 which operates a classifier, an algorithm or another technique for detecting one or more body parts within image frames. In some implementations, the server 122 may operate a deep neural network, a convolutional neural network, a support vector machine, or any other type or form of classifier that is trained to recognize any number of discrete body parts within image frames captured from multiple perspectives. In some implementations, image frames may be provided to the server 122 and processed to generate one score map for any number of body parts, including but not limited to one or more of a head, a neck, a left shoulder, a right shoulder, a left elbow, a right elbow, a left wrist, a right wrist, a left hand, a right hand, a left hip, a right hip, a left knee, a right knee, a left ankle or a right ankle. The score maps generated thereby may be graphical representations of probabilities that any given pixel within a body frame depicts or is a portion of a depiction of a given body part.

For example, as is shown in FIG. 1C, based on the image frame 130-3L, which was captured from the field of view of the imaging device 125-2 and depicts the actor 180 during the performance of one or more poses or gestures at time $t_3$, score maps for each of sixteen body parts may be generated by a trained classifier operating on the server 122. FIG. 1C includes score maps 140-1-3L, 140-16-3L, for two of such body parts, viz., a head 160-1 of the actor 180, and a right ankle 160-16 of the actor 180. The score map 140-1-3L shown in FIG. 1C includes a region 145-1-3L of peak values that are identified by the server 122 as most likely corresponding to the head 160-1 of the actor 180. Likewise, the score map 140-16-3L shown in FIG. 1C includes a region 145-16-3L of peak values that are identified by the server 122 as most likely corresponding to the right ankle 160-16 of the actor 180. The server 122 also generates score maps (not shown in FIG. 1C) that include regions of peak values identified as most likely corresponding to the neck, the left and right elbows, the left and right wrists, the left and right hands, the left and right hips, the left and right knees, or the left ankle of the user 180. Alternatively, the server 122 may generate score maps including graphical representations of probabilities that any of the pixels of the image frame 130-3L depicts or is a portion of a depiction of any other body parts of the actor 180. Furthermore, although the score maps 140-1-3L, 140-16-3L of FIG. 1C are shown as having a finite number of values and represent probabilities at a level of resolution that is lower than the level of resolution of the image 130-3L, score maps may have any number of values and may represent probabilities that an image includes a given body part at any level of resolution in accordance with implementations of the present disclosure.

Once each of the score maps has been generated for each of the image frames captured by both the imaging device 125-1 and the imaging device 125-2, the image frames may be synchronized, and the score maps for the respective image frames associated with one another. A set of body part candidates for a given body part may be identified based on peak values represented in respective score maps generated for that body part from synchronized image frames, and locations of such candidates within the image frames, e.g., locations of pixels potentially corresponding to the body part within the image frames, may be extracted from the score maps. For example, referring to FIG. 1D, the score map 140-1-3L of FIG. 1C includes probabilities that pixels representing heads are included in the image frame 130-3L that was captured during the performance of one or more gestures at time $t_3$, and identifies the region 145-1-3L of peak values that most likely correspond to the head 160-1 of the actor 180. Similarly, referring to FIG. 1E, the score map 140-1-3R of FIG. 1C includes probabilities that pixels representing heads are included in the image frame 130-3R that was also captured during the performance of one or more gestures at time $t_3$, and identifies the region 145-1-3R of peak values that most likely correspond to the head 160-1 of the actor 180.

Figure 1D:
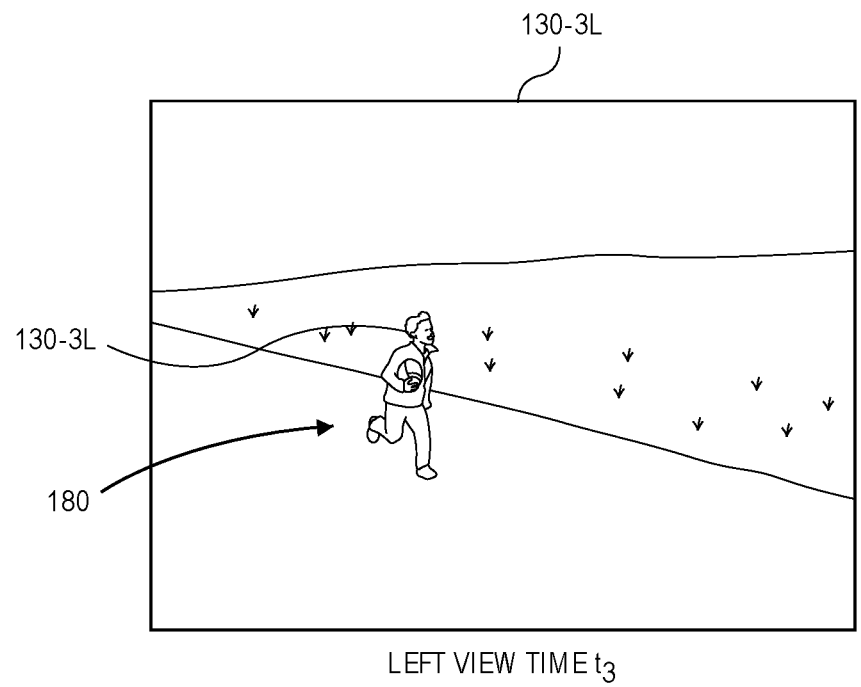
Figure 1E:
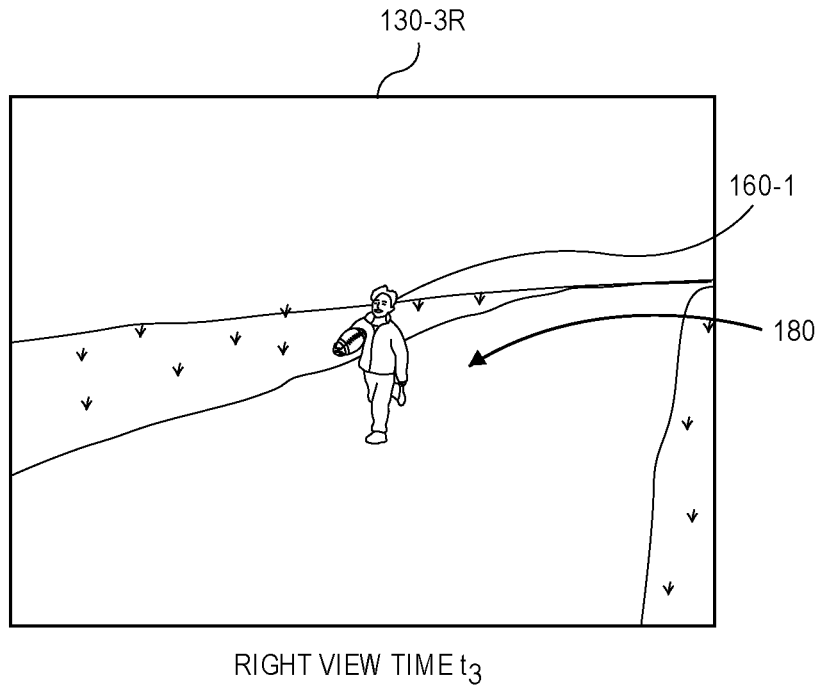
Figure 1F:
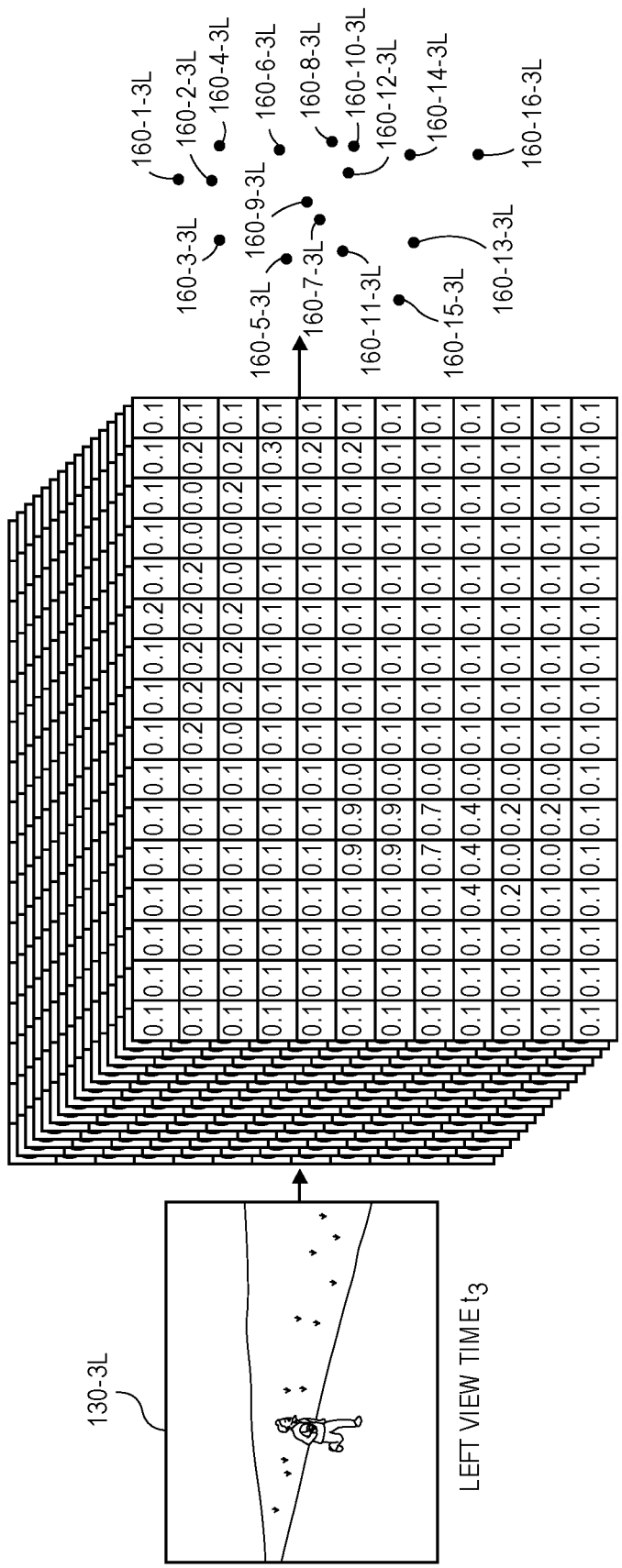

Score maps that are generated for synchronized image frames, such as the score maps 140-1-3L and 140-1-3R shown in FIGS. 1D and 1E, may be used to detect and locate a plurality of candidates of body parts based on peak values within such maps. As is shown in FIG. 1F, peak values within respective score maps 140-1-3L through 140-16-3L that are generated for a plurality of body parts from a single image frame, viz., the image frame 130-3L that was captured at time $t_3$, may be used to identify any detections of such body parts within the single image frame. Based on such score maps 140-1-3L through 140-16-3L, a head 160-1-3L, a neck 160-2-3L, a left shoulder 160-3-3L, a right shoulder 160-4-3L, a left elbow 160-5-3L, a right elbow 160-6-3L, a left wrist 160-7-3L, a right wrist 160-8-3L, a left hand 160-9-3L, a right hand 160-10-3L, a left hip 160-11-3L, a right hip 160-12-3L, a left knee 160-13-3L, a right knee 160-14-3L, a left ankle 160-15-3L and a right ankle 160-16-3L are detected within the image frame 130-3L that was captured at time $t_3$. Using the intrinsic properties of the imaging devices 125-1, 125-2 and extrinsic properties of the scene 120, each of the detections in the respective two-dimensional image frames may be converted to a three-dimensional ray that passes from the sensors and lenses of the respective imaging devices 125-1, 125-2 to a portion of a physical surface of the actor 180 at a given pixel.

Figure 1G:
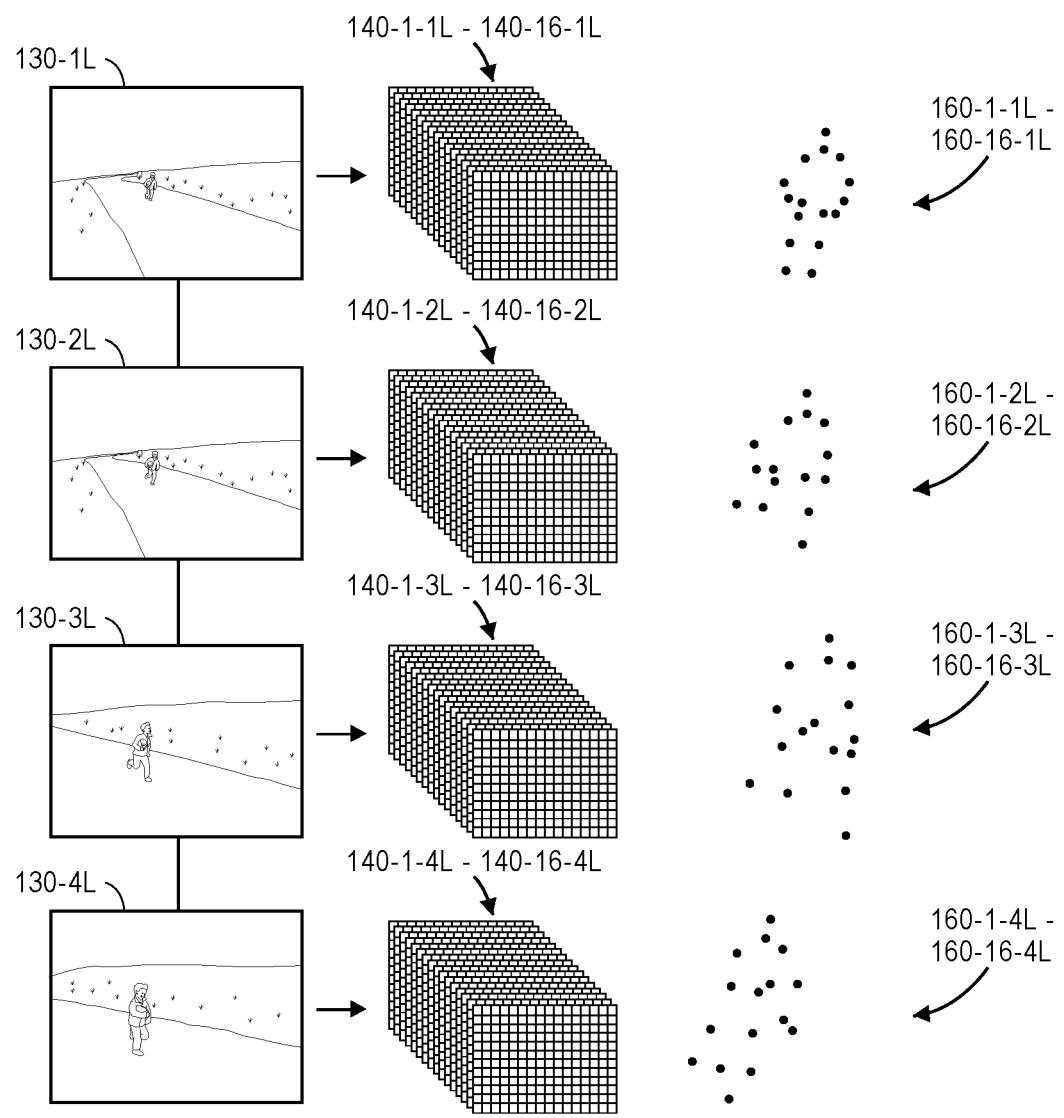
Figure 1H:
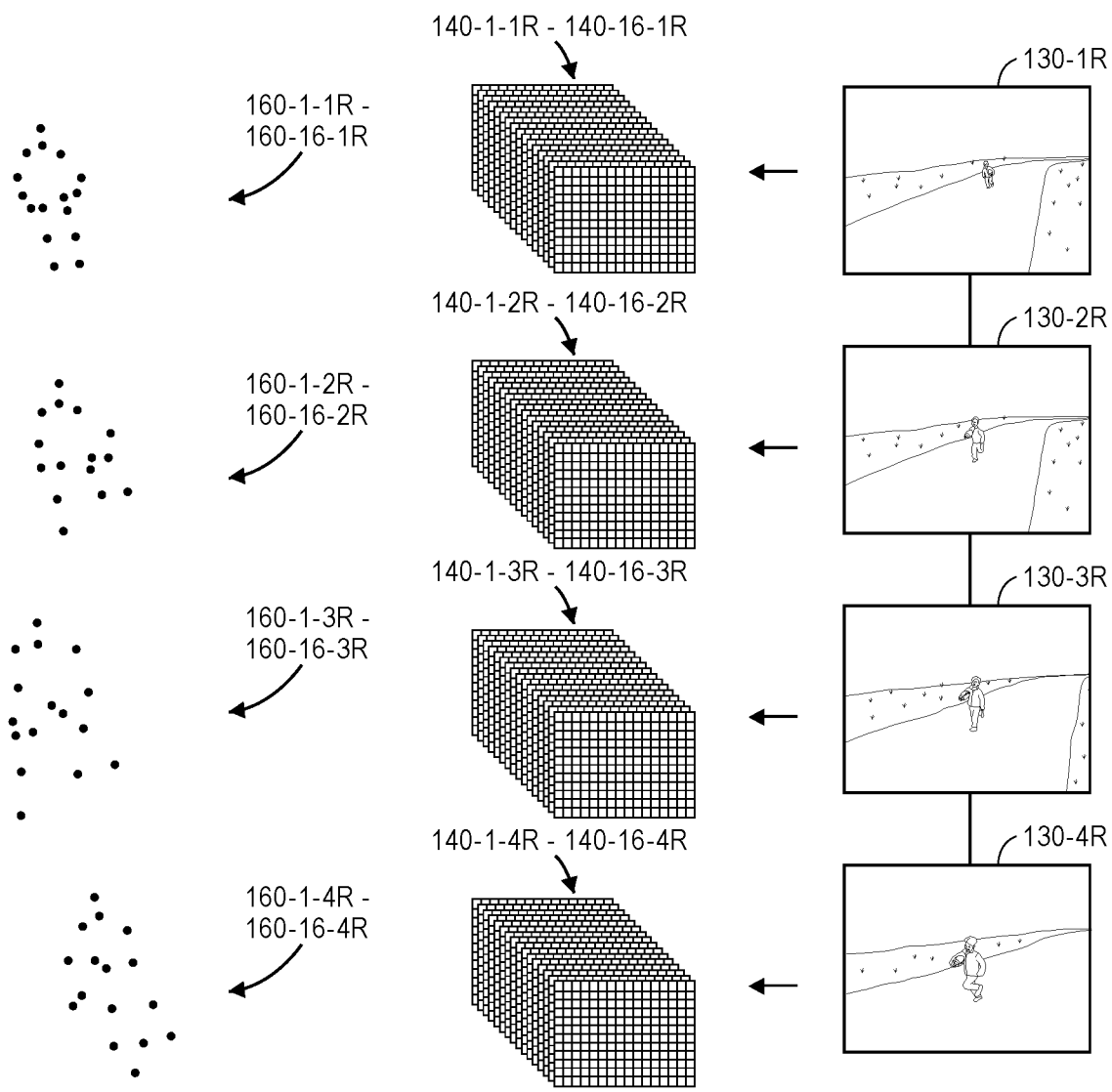

The trained classifier may be utilized to detect and locate a plurality of candidates of body parts based on peak values within score maps for each of the synchronized image frames that is captured using the imaging devices 125-1, 125-2, in a manner similar to that which is shown in FIGS. 1D through 1F. As is shown in FIG. 1G, pluralities of score maps for detecting and locating body parts may be generated for each of the images 130-1L, 130-2L, 130-3L, 130-4L captured using the imaging device 125-1 at times $t_1$, $t_2$, $t_3$, $t_4$. For example, the plurality of score maps 140-1-1L through 140-16-1L may be generated by providing the image frame 130-1L to the trained classifier, and detections 160-1-1L through 160-16-1L of the various body parts shown within the image frame 130-1L are identified and located therein. Similarly, the pluralities of score maps 140-1-2L through 140-16-2L, 140-1-3L through 140-16-3L, 140-1-4L through 140-16-4L may be generated by providing the image frames 130-2L, 130-3L, 130-4L to the trained classifier, and detections 160-1-2L through 160-16-2L, 160-1-3L through 160-16-3L, 160-1-4L through 160-16-4L of the various body parts shown within the image frames 130-2L, 130-3L, 130-4L are identified and located therein. Likewise, as is shown in FIG. 1H, the pluralities of score maps 140-1-1R through 140-16-1R, 140-1-2R through 140-16-2R, 140-1-3R through 140-16-3R, 140-1-4R through 140-16-4R may be generated by providing the image frames 130-1R, 130-2R, 130-3R, 130-4R to the trained classifier, and detections 160-1-1R through 160-16-1R, 160-1-2R through 160-16-2R, 160-1-3R through 160-16-3R, 160-1-4R through 160-16-4R of the various body parts shown within the image frames 130-1R, 130-2R, 130-3R, 130-4R are identified and located therein.

Each of the detections of body parts that are identified based on locations of peak values within score maps generated from image frames using a trained classifier, e.g., one or more of the score maps 140-1-3L through 140-16-3L shown in FIGS. 1C through 1E, may be represented as a node in a graph, with the nodes being defined based on the image frames in which such body parts were detected and the views from which such image frames were captured, as well as times at which such image frames were captured. Each of such nodes has sets of coordinates defined with respect to a unique body part (e.g., because each human has only one head, only one neck, only one left shoulder, and so on and so forth, a given node can only be one of a head, a neck, a left shoulder, or any other specific body part), a unique view from which the body part was detected (e.g., one of the imaging device 125-1, 125-2 of FIG. 1B, or any other imaging device within the scene 120, not shown), and an image frame in which the node was detected, i.e., a frame number or other identifier that was assigned to the image frame and/or a time at which the image frame was captured.

Each detection of a body part may include not only a position of the body part within an image frame, e.g., defined based at least in part on a position of a peak value within a score map, but also a set of vectors extending from the position of the body part to possible positions of other body parts within the image frame, subject to known physiological parameters or constraints for a human body, including but not limited to lengths or configurations of such body parts with respect to one another. For example, a femur extends between a hip and a knee, and has a length of approximately 50.5 centimeters in an average adult male. Similarly, a tibia and a fibula extend between a knee and an ankle, and have lengths of approximately 43.0 centimeters and 40.5 centimeters, respectively, in an average adult male. A humerus, which extends between a shoulder and an elbow, has a length of approximately 36.5 centimeters in an average adult male, while ulna and radii, which extend between elbows and hands, have lengths of approximately 28.2 centimeters and 26.4 centimeters, respectively, in average adult males. Likewise, it is axiomatic that knees are connected to hips and ankles, but not to shoulders, and that heads are connected to necks, but not to wrists. Such parameters or constraints, which may include not only bone lengths or configurations but also distance constraints, articulation constraints or deformation constraints, should be both feasible and proportional for humans, and must remain constant over time, given that actors may not typically change the lengths of their limbs or their respective configurations or orientations over time. In some implementations, standard body proportions such as those defined by the Vitruvian Man of Leonardo da Vinci, or similar ratios or proportions, may be used determine relations of dimensions of two or more body parts to one another.

Subsequently, edges extending between nodes may be defined based on the output of the trained classifier, with such edges being defined along three axes, including temporal edges, triangulation edges and regression edges. Temporal edges are edges that extend between pairs of detections of the same body part within image frames captured from the same view, but in different frames. Triangulation edges are edges that extend between pairs of detections of the same body part at the same time within image frames captured from different views. Regression edges are edges that extend between pairs of detections of different body parts within the same image frame.

Each of the edges between each pair of body part detections may be assigned a probability that the two body part detections of the pair each correspond to the same actor. For example, a temporal edge between two detections of the same type of body part within different successive image frames that are captured from the same view may be assigned a probability that the detections correspond to the same body part (e.g., that detections of heads, necks or left shoulders correspond to the same head, the same neck, the same left shoulder, and so on and so forth) within each of the image frames at different times. A triangulation edge between two detections of the same type of body part within synchronized image frames captured from different views may be assigned a probability that the detections correspond to the same body part (e.g., that detections of heads, necks or left shoulders correspond to the same head, the same neck, the same left shoulder, and so on and so forth) within each of the image frames at different times. A regression edge between two detections of different types of body parts within the same image frame may be assigned a probability that the detections correspond to body parts of the same actor. The edges between nodes across image frames captured from the same view or from different views, or of edges within image frames, may be contracted probabilistically based on pairwise information regarding each of the nodes in a pair that are connected by an edge.

Figure 1I:
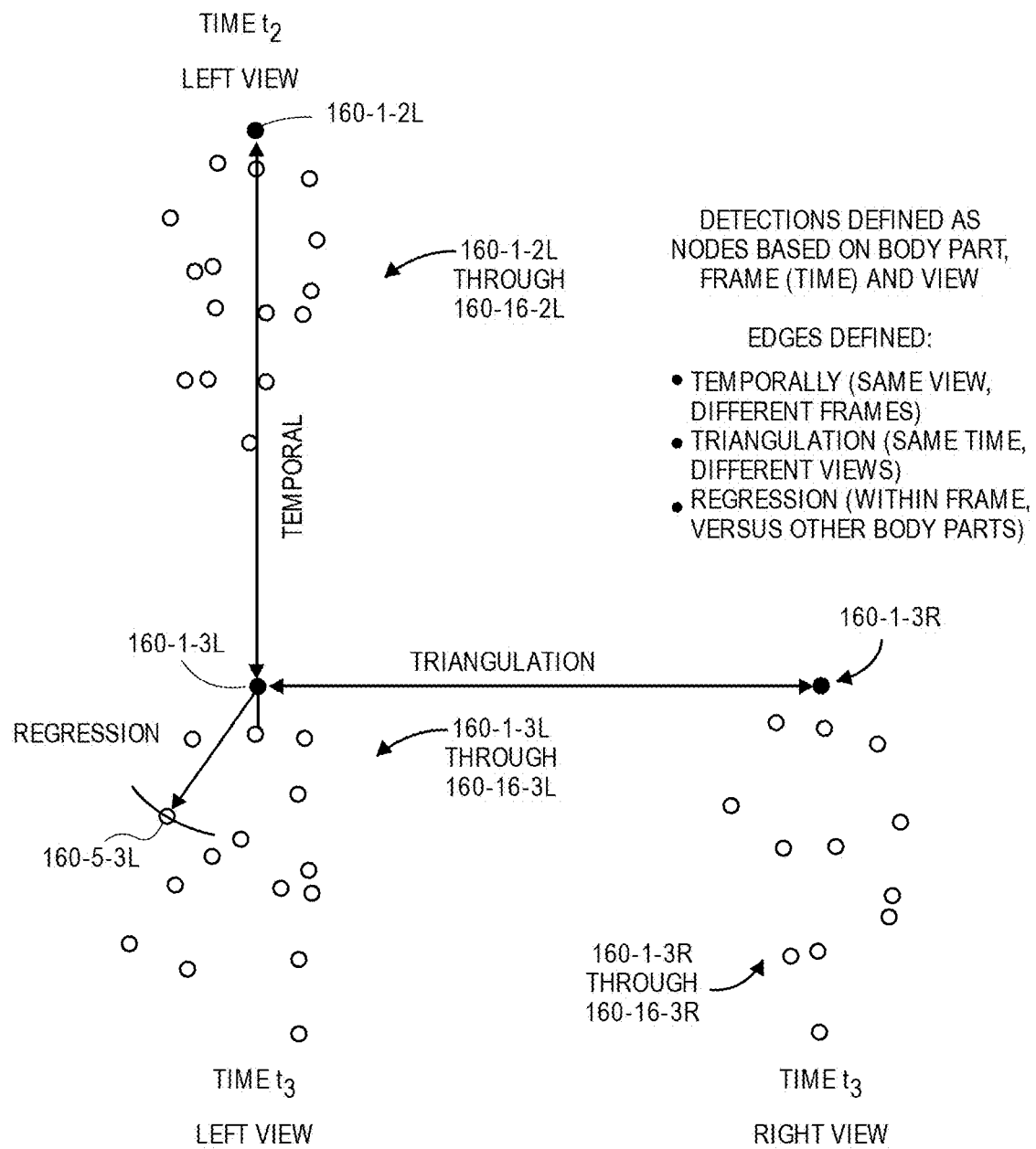

As is shown in FIG. 1I, the detections 160-1-2L through 160-16-2L of body parts within the image frame 130-2L captured by the imaging device 125-1 at time $t_2$, the detections 160-1-3L through 160-16-3L of body parts within the image frame 130-3L captured by the imaging device 125-1 at time $t_3$, and the detections 160-1-3R through 160-16-3R of body parts within the image frame 130-3R captured by the imaging device 125-2 at time $t_3$ are shown. As is noted above, edges extending between pairs of the nodes may be contracted probabilistically. For example, the detection 160-1-2L of a head in the image frame 130-2L captured at time $t_2$ may be probabilistically compared to the detection 160-1-3L of a head in the image frame 130-3L captured at time $t_3$ in order to determine whether the detections 160-1-2L, 160-1-3L correspond to the same head, and the edges between such detections 160-1-2L, 160-1-3L may be contracted accordingly, i.e., by determining that the probabilities corresponding to such edges are sufficiently high. Although FIG. 1I shows a probabilistic comparison on a temporal basis between only the detections 160-1-2L, 160-1-3L, in the successive image frames 130-2L, 130-3L, such probabilistic comparisons may be similarly performed on temporal bases between each of the detections 160-2-2L through 160-16-2L and each of the corresponding detections 160-2-3L through 160-16-3L, respectively, and edges between the corresponding detections may be contracted accordingly. Alternatively, where probabilities assigned to edges between two body parts are determined to be sufficiently low, such edges may be ignored from consideration. For example, the nodes connected by such edges may be determined to correspond to body parts that do not belong to the same actor, or one or both of such nodes may be determined to not correspond to body parts at all, i.e., to be false detections.

Additionally, the detection 160-1-3L of the head in the image frame 130-3L captured by the imaging device 125-1 at time $t_3$ may be probabilistically compared to the detection 160-1-3R of a head in the synchronized image frame 130-3R captured by the imaging device 125-2 at time $t_3$, in order to determine whether the detections 160-1-3L, 160-1-3R correspond to the same head, and the edges between such detections 160-1-3L, 160-1-3R may be contracted accordingly. Although FIG. 1I shows a probabilistic comparison on a triangulation basis between only the detections 160-1-3L, 160-1-3R, in the synchronized image frames 130-3L, 130-3R, such probabilistic comparisons may be similarly performed on triangulation bases between each of the detections 160-2-3L through 160-16-3L and each of the corresponding detections 160-2-3R through 160-16-3R, respectively, and edges between the corresponding detections may also be contracted accordingly.

Likewise, the detection 160-3L of the head in the image frame 130-3L captured by the imaging device 125-1 at time $t_3$ may be probabilistically compared to the detections of the other body parts in the image frame 130-3L, e.g., a detection 160-5-3L of a left elbow, in order to determine whether the head and the left elbow, or any of the other body parts detected within the image frame 130-3L, belong to the same actor or to different actors, and the edges between such detections may be contracted accordingly. Although FIG. 1I shows a probabilistic comparison on a regression basis between only the detections 160-1-3L, 160-5-3L in the single image frame 130-3L, such probabilistic comparisons may be similarly performed on regression bases between each of the detections 160-1-3L through 160-16-3L, respectively, and edges between the corresponding detections may also be contracted accordingly.

Figure 1J:
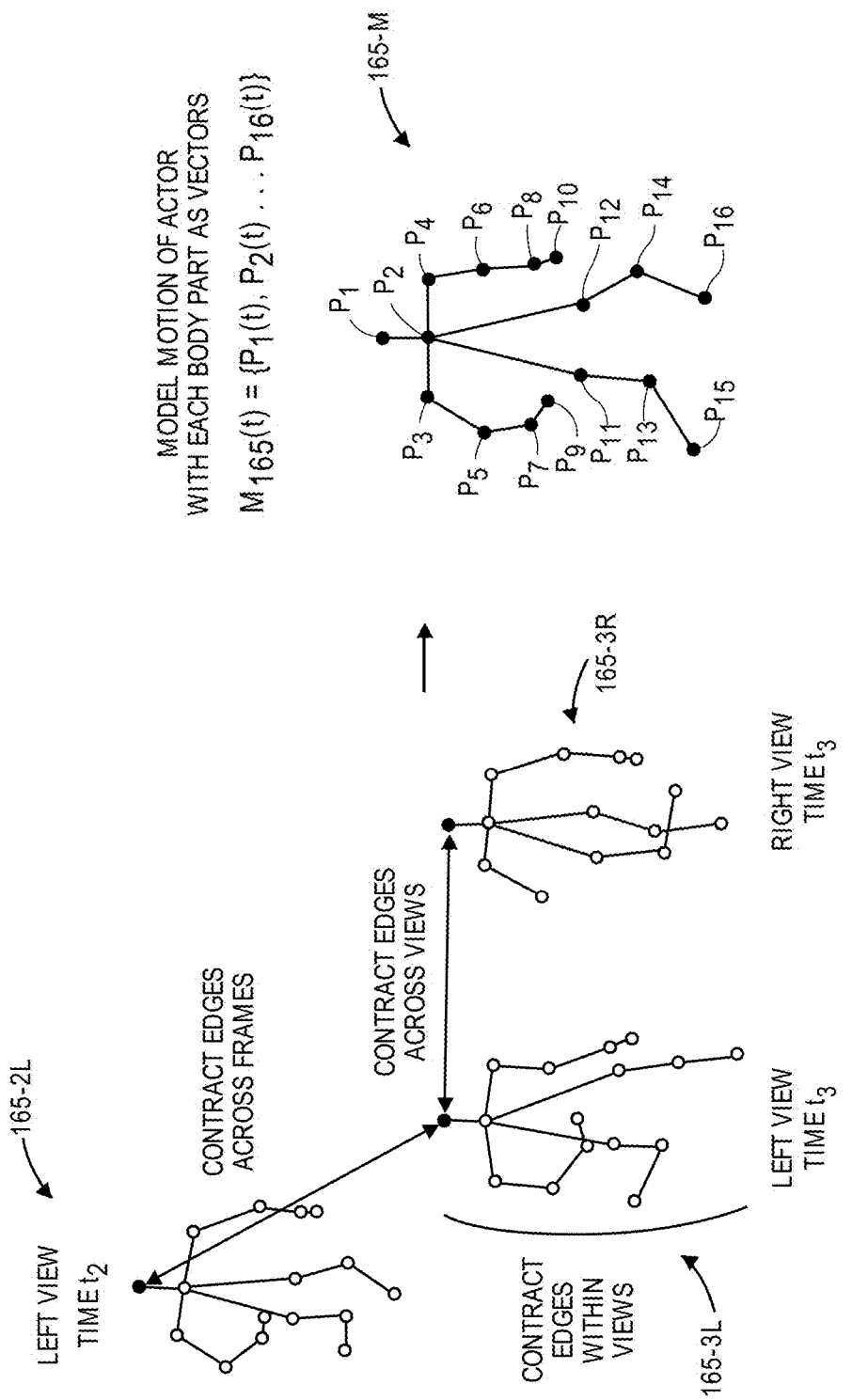

As is shown in FIG. 1J, detections of body parts within the image frames 130-2L, 130-3L, 130-3R shown in FIGS. 1H and 1I that are determined to belong to the same actor may be grouped into models 165-2L, 165-3L, 165-3R. Such models may be defined subject to an assumption that detections for a given actor are independent of and not related to either the presence or the positions of other actors within the scene 120, and also to an assumption that two or more actors may not exist within the same location in space at the same time. Vectors or trajectories representative of motion of the individual body parts, e.g., splines, such as basic splines or B-splines, may be formed from the two-dimensional detections within each frame, and used to temporally merge motion of a given body part within consecutive image frames captured by a single imaging device, to merge the motion of the given body part across synchronized image frames captured by multiple imaging devices, e.g., into one or more basic splines, or to merge the motion of multiple body parts into a common skeleton (or model) of an actor. The mergers of the body parts may be made between compatible body parts as detected within image frames captured by multiple imaging devices, and are made subject to logical and physiological parameters and constraints, including one or more of the parameters or constraints discussed above. Moreover, such parameters and constraints may be used to define a self-regression of a given body part, and to correct its actual position versus a detected position identified in one or more image frames.

From the various models 165-2L, 165-3L, 165-3R of the detections in the image frames 130-2L, 130-3L, 130-3R, and from models of detections in any other image frames, an articulated model 165-M (e.g., a virtual skeleton) of the actor 180 may be defined. The articulated model 165-M of the actor 180 may be defined as a vector $M_{165}(t)$ that is representative of the smoothed three-dimensional motion of the various body parts $P_1(t), P_2(t) \ldots P_{16}(t)$ that are merged together and best fit the respective two-dimensional detections of the respective body parts by the imaging devices 125-1, 125-2.

Accordingly, implementations of the systems and methods of the present disclosure may recognize and track one or more actors within a scene, and the poses or gestures executed by such actors, using two-dimensional images captured by two or more imaging devices including all or portions of a scene within a common field of view. Such images may be processed using a trained classifier, such as a deep neural network, a convolutional neural network, or a support vector machine, to recognize body part candidates within image frames that were captured simultaneously by the respective imaging devices, e.g., based on score maps or other metrics generated by such classifiers.

The compatibility of body part candidates that are detected within synchronized image frames, e.g., whether such body part candidates may possibly correspond to the same actor (e.g., a person), may be determined according to at least three content-based relationships between and among the respective image frames. First, for a selected pair of synchronized image frames and a selected body part type, whether two detections of candidate body parts identified in score maps generated for the pair of synchronized image frames may possibly correspond to a single body part of the given body part type located in a common position in three-dimensional space may be determined. Second, for a selected body part type and a selected imaging device, whether two detections of candidates identified in score maps generated for a pair of successive image frames may possibly correspond to a single body part in motion over a period of time between the capture of each of the successive image frames by the imaging device may be determined. Third, for a selected image frame and a selected imaging device, whether two detections of candidates identified in a score map generated for the selected image frame may possibly correspond to two different body parts of a single actor may be determined. This tripartite analysis of body part candidates that are detected in two-dimensional imaging data, i.e., within synchronized image frames captured by different imaging devices, within consecutive image frames captured by the same imaging device, or within a given image frame, simplifies processes for recognizing body parts or poses or gestures thereof by logically determining which of a plurality of body parts belongs to the same person, or to different people.

Likewise, a number of content-based relationships may determine whether body part candidates do not correspond to the same person, e.g., whether such body part candidates are incompatible with one another. For example, it is axiomatic that each person has only one head, only one neck, only one left shoulder, and so on and so forth. Therefore, where it is determined that an image frame is determined to likely depict two or more heads, necks or left shoulders, such body parts must necessarily belong to different people, and are incompatible with one another, or, alternatively, one or more of the detections may be false. Next, where one image frame is determined to likely depict a type of body part in a specific location in space, and a synchronized image frame depicts the same type of body part in a different, non-corresponding location in space, the two body parts cannot be the same, and are incompatible with one another.

Body parts that are identified as likely depicted within one or more image frames must also be subjected to a number of immutable, physiological parameters or constraints. Where two distinct body parts are likely depicted in an image frame, the two body parts must be within a typical physiological range of one another, e.g., a distance ordinarily observed in humans, if the two body parts may be determined to belong to the same person. For example, in nearly every adult human, shoulders are typically located no closer than ten centimeters from a head, and no farther than fifty centimeters from the head. Therefore, where a shoulder and a head are likely depicted in an image frame at a range of less than ten centimeters or greater than fifty centimeters from one another, the two body parts cannot belong to the same person, and are incompatible with one another. Similarly, separations between a hip and a knee, a knee and an ankle, must remain consistent with traditional lengths of a femur and a tibia or fibula, respectively, if such body parts are to be determined to belong to the same person. Furthermore, humans are typically ground-based animals that move at predictable speeds and in predictable directions or angular extents.

After a plurality of body part candidates have been identified, compatible body part candidates may be associated with each other, e.g., across multiple synchronized image frames, or with one or more other body part candidates, e.g., within common image frames, and incompatible body part candidates may be removed from consideration. Compatible body part candidates may be grouped together subject to a number of logical operations. First, edges between detections of a body part may be tracked over time, e.g., within image frames captured from a single imaging device, and temporally merged. A trajectory, or "tracklet," representative of the motion of the body part within image frames may be defined based on the presence of the body part within image frames captured by a single imaging device, e.g., from a common field of view. The trajectories may be defined over extended series of frames (e.g., tens of frames or more), subject to any compatibility or incompatibility parameters or constraints. Next, detections of body parts that are matched across multiple views in two-dimensional images may be converted to three-dimensional rays that begin at optical elements of the respective imaging devices and terminate at surfaces of objects at a given pixel, based on the intrinsic properties of such imaging devices and extrinsic properties of a scene, and merged into one, e.g., by triangulating the rays corresponding such detections, thereby enabling a body part to be detected and re-detected in the multiple views even if the body part is temporarily occluded in one of the views.

Finally, detected body parts may be merged together into an articulated model of a common actor, e.g., a virtual skeleton. To merge detected body parts, first, strong reciprocal affinities between body parts may be identified, such as by evaluating score maps generated for consecutive frames and identifying pairs of body parts that are observed to consistently move with respect to one another, and to regress to one another, without any other options for compatible body parts. For example, for each detected body part, and for each of the other body parts, a nearest detection of another body part is identified and a level of affinity between the body parts is determined. In some implementations, edges between pairs of nodes corresponding to detections of body parts may be assigned probabilities that the detections each correspond to body parts of the same actor, or weights that favor a given of nodes over a different pair of nodes. A pair of body parts are deemed to have strong reciprocal affinity if each has mutual one-directional affinity with one another, i.e., if a head is determined to have sufficiently strong affinity with only one neck, and if the neck is determined to have sufficiently strong affinity with only the head. Each of the affinities between pairs of body parts may be weighted and sorted in decreasing weight order, and such affinities must satisfy any known incompatibility constraints.

Those of ordinary skill in the pertinent arts will recognize that imaging data, e.g., visual imaging data, depth imaging data, infrared imaging data, radiographic imaging data, or imaging data of any other type or form, may be captured using one or more imaging devices such as digital cameras, depth sensors, range cameras, infrared cameras or radiographic cameras. Such devices generally operate by capturing light that is reflected from objects, and by subsequently calculating or assigning one or more quantitative values to aspects of the reflected light, e.g., image pixels, then generating an output based on such values, and storing such values in one or more data stores. For example, a digital camera may include one or more image sensors (e.g., a photosensitive surface with a plurality of pixel sensors provided thereon), having one or more filters associated therewith. Such sensors may detect information regarding aspects of any number of image pixels of the reflected light corresponding to one or more base colors (e.g., red, green or blue) of the reflected light, or distances to objects from which the light was reflected. Such sensors may then generate data files including such information, and store such data files in one or more onboard or accessible data stores (e.g., a hard drive or other like component), or in one or more removable data stores (e.g., flash memory devices). Such data files may also be printed, displayed on one or more broadcast or closed-circuit television networks, or transmitted over a computer network as the Internet.

An imaging device that is configured to capture and store visual imaging data (e.g., color images) is commonly called an RGB ("red-green-blue") imaging device (or camera), while an imaging device that is configured to capture both visual imaging data and depth imaging data (e.g., ranges) is commonly referred to as an RGBz or RGBD imaging device (or camera). Imaging data files may be stored in any number of formats, including but not limited to .JPEG or .JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), QuickTime (or ".MOV"), Moving Picture Experts Group (or ".MPG," ".MPEG" or ".MP4") or Windows Media Video (or ".WMV") files.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, a digital camera may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., a zoom level of the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

For example, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Furthermore, some imaging devices may digitally or electronically adjust an image identified in a field of view, subject to one or more physical or operational constraints. For example, a digital camera may virtually stretch or condense the pixels of an image in order to focus or broaden the field of view of the digital camera, and also translate one or more portions of images within the field of view. Some imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures or outlines of the features or objects, may be extracted from the data in any number of ways. For example, colors of image pixels, or of groups of image pixels, in a digital image may be determined and quantified according to one or more standards, e.g., the RGB color model, in which the portions of red, green or blue in an image pixel are expressed in three corresponding numbers ranging from 0 to 255 in value, or a hexadecimal model, in which a color of an image pixel is expressed in a six-character code, wherein each of the characters may have a range of sixteen. Colors may also be expressed according to a six-character hexadecimal model, or #NNNNNN, where each of the characters N has a range of sixteen digits (i.e., the numbers 0 through 9 and letters A through F). The first two characters NN of the hexadecimal model refer to the portion of red contained in the color, while the second two characters NN refer to the portion of green contained in the color, and the third two characters NN refer to the portion of blue contained in the color. For example, the colors white and black are expressed according to the hexadecimal model as #FFFFFF and #000000, respectively, while the color National Flag Blue is expressed as #3C3B6E. Any means or model for quantifying a color or color schema within an image or photograph may be utilized in accordance with the present disclosure. Moreover, textures or features of objects expressed in a digital image may be identified using one or more computer-based methods, such as by identifying changes in intensities within regions or sectors of the image, or by defining areas of an image corresponding to specific surfaces.

Furthermore, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts. For example, objects or portions thereof expressed within imaging data may be associated a label or labels according to one or more machine learning classifiers, algorithms or techniques, including but not limited to nearest neighbor methods or analyses, artificial neural networks, support vector machines, factorization methods or techniques, K-means clustering analyses or techniques, similarity measures such as log likelihood similarities or cosine similarities, latent Dirichlet allocations or other topic models, or latent semantic analyses.

The systems and methods of the present disclosure are directed to determining poses, in three dimensions, of one or more actors (e.g., humans or, alternatively, one or more other animals or machines) in a scene or other common region of interest within the fields of view of multiple imaging devices. In some implementations, the systems and methods disclosed herein may be configured to produce a full body motion of an arbitrary (and unknown) number of actors that have been simultaneously recorded by multiple calibrated color cameras during a certain time interval. Such systems and methods may be configured to predict or determine positions, in three dimensions, of each of the body parts of an articulated human model, e.g., a skeleton, over an entire time interval, with a goal of both determining a number of actors present within a scene, and also independently estimating their respective motion.

In some implementations, synchronized (e.g., time-stamped) image frames captured using imaging devices having different but overlapping fields of view may be evaluated to identify any number of body parts therein. To identify body parts, any detection system, algorithm or technique may be performed, including but not limited to systems, algorithms or techniques that rely on trained classifiers such as deep neural networks, convolutional neural networks or support vector machines.

Based on the detections of body parts within synchronized image frames, an actor, e.g., a person, may be detected by generating a graph having nodes corresponding to originally detected body parts, with each of the linked nodes having a sufficiently strong affinity with one another. When the detected body parts are grouped into a single actor, the motion of the actor may be determined by optimizing an articulated model of the actor, e.g., a virtual skeleton or model, over time. Trajectories of the respective body parts may be modeled as trajectories or splines within single fields of view that may be best fit together with one another across multiple fields of view.

In one implementation of the present disclosure, score maps representative of probabilities that a given body part appears in an image frame may be generated, e.g., by a trained classifier, such as a deep neural network, a convolutional neural network or a support vector machine, and peak values in the score maps may be extracted accordingly in order to obtain unique detections of each body part from each field of view. For a given image frame, one score map may be generated for each body part under consideration. For example, where a neural network is trained to recognize discrete body parts within images such as heads, necks, left shoulders and right shoulders, among others, the neural network may generate, for a given image frame, one score map indicating probabilities that each of the pixels within the image frame includes a head, a neck, a left shoulder, a right shoulder, and so on and so forth. Using the score maps and the peak values extracted therefrom, possible correspondences between pairs of detections in the multiple fields of view (e.g., compatible detections), and impossible correspondences between such pairs of detections (e.g., incompatible detections) may be identified. Based on detections of body parts that are compatible with one another, hypothetical positions of body parts may be established, e.g., where rays corresponding to the peak values of score maps from each of the respective fields of view may be deemed to intersect, three-dimensional trajectories or "tracklets" consistent with the motion of the body parts may be constructed, subject to compatibility (or incompatibility) parameters or constraints.

The systems and methods of the present disclosure may be utilized in any number of applications in which the recognition and tracking of actors within multiple views is desired, including but not limited to the motion of one or more human operators within a materials handling facility. As used herein, the term "materials handling facility" may include, but is not limited to, warehouses, distribution centers, cross-docking facilities, order fulfillment facilities, packaging facilities, shipping facilities, rental facilities, libraries, retail stores or establishments, wholesale stores, museums, or other facilities or combinations of facilities for performing one or more functions of material or inventory handling for any purpose. For example, in some implementations, one or more of the systems and methods disclosed herein may be used to detect and distinguish between actors (e.g., customers) and recognize their respective interactions within a materials handling facility, including but not limited to interactions with one or more items (e.g., consumer goods) within the materials handling facility. Such systems and methods may also be utilized to identify and track actors within transportation centers, financial institutions or like structures in which diverse collections of people, objects or machines enter and exit from such environments at regular or irregular times or on predictable or unpredictable schedules. By relying on multiple imaging devices, motion of an actor may be tracked even when the actor, or one or more body parts thereof, is occluded in one or more of the fields of view of the imaging devices.

Figure 2:
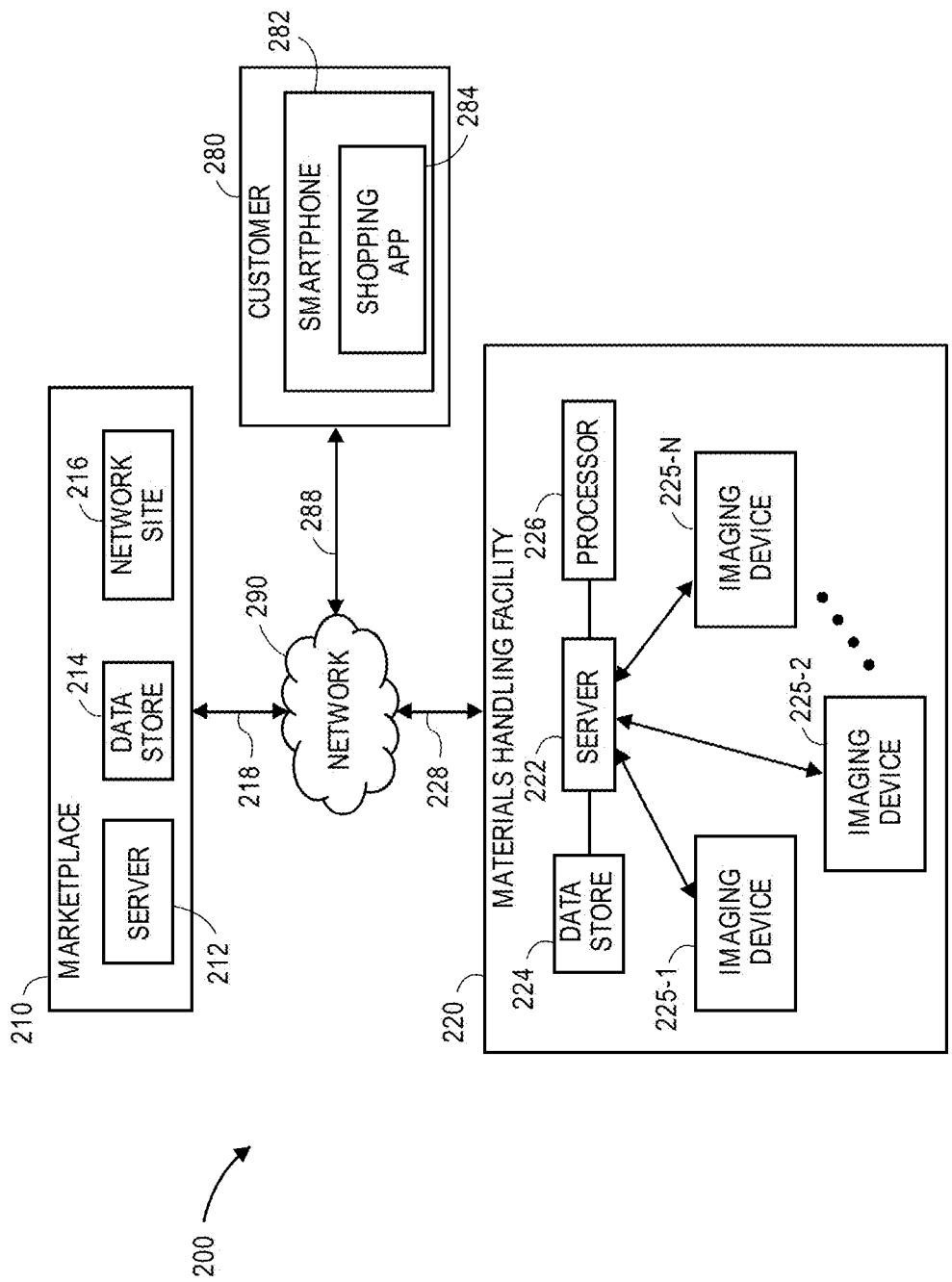
FIG. 2 is a block diagram of components of one system for recognizing and tracking poses using digital imagery captured from multiple fields of view in accordance with implementations of the present disclosure.

Referring to FIG. 2, a block diagram of components of one system 200 for recognizing and tracking poses using digital imagery captured from multiple fields of view in accordance with implementations of the present disclosure is shown. The system 200 includes a marketplace 210, a materials handling facility 220 and a customer (or actor, or worker, or other human operator) 280 that are connected to one another across a network 290, such as the Internet. Except where otherwise noted, reference numerals preceded by the number "2" shown in FIG. 2 indicate components or features that are similar to components or features having reference numerals preceded by the number "1" shown in FIGS. 1A through 1J.

The marketplace 210 may be any entity or individual that wishes to make items from a variety of sources (e.g., manufacturers, merchants, sellers or vendors) available for download, purchase, rent, lease or borrowing by customers using a networked computer infrastructure, including one or more physical computer servers 212 and data stores (e.g., databases) 214 for hosting a network site 216 (e.g., a web site). The marketplace 210 may be physically or virtually associated with one or more materials handling facilities, including but not limited to the materials handling facility 220. The network site 216 may be implemented using the one or more servers 212, which connect or otherwise communicate with the one or more data stores 214 as well as the network 290, as indicated by line 218, through the sending and receiving of digital data. The servers 212 may cause the display of information associated with the network site 216 in any manner, e.g., by transmitting code such as Hypertext Markup Language (HTML), over the network 290 to another computing device or resource that may be configured to generate and render the information into one or more pages or to cause a display of such pages on a computer display of any kind. Moreover, the data stores 214 may include any type of information regarding items that have been made available for sale through the marketplace 210, or ordered by customers (e.g., the customer 280) from the marketplace 210. The servers 212 may further execute any type of computer-based function or compute any type or form of calculation, including but not limited to any formulas, equations, algorithms or techniques for determining one or more probabilities or performing any number of statistical tests.

The materials handling facility 220 may be any facility that is adapted to receive, store, process and/or distribute items on behalf of the marketplace 210. The materials handling facility 220 may be configured to receive any type or kind of inventory items from various sources, to store the inventory items until a user orders or retrieves one or more of the items, or to distribute the inventory items to the user. For example, inventory items such as merchandise, commodities, perishables or any other type of item may be received from one or more suppliers, e.g., manufacturers, distributors, wholesalers, vendors or the like, at the materials handling facility 220. Upon their arrival at the materials handling facility 220, the inventory items may be prepared for storage, such as by unpacking or otherwise rearranging the inventory items, and updating one or more records to reflect the types, quantities, conditions, costs, locations or any other parameters associated with the arrival of the inventory items. Subsequently, the inventory items may be stocked, managed or dispensed in terms of countable, individual units or multiples of units, such as packages, cartons, crates, pallets or other suitable aggregations. Alternatively, one or more of the items, such as bulk products, commodities, or the like, may be stored in continuous or arbitrarily divisible amounts that may not be inherently organized into countable units, and may instead be managed in terms of measurable quantities such as units of length, area, volume, weight, time duration or other dimensional properties characterized by units of measurement.

Inventory items may be stored within an inventory area on an inventory shelf, a storage unit or another like system, such as in bins, on shelves or via other suitable storage mechanisms. The inventory shelves, storage units or like units may be flat or angled, stationary or mobile, and of any shape or size. In some implementations, all inventory items of a given type or kind may be stored in a common location within an inventory area. In other implementations, like inventory items may be stored in different locations. For example, to optimize the retrieval of inventory items having high turnover rates or velocities within a large materials handling facility, such inventory items may be stored in several different locations to reduce congestion that might be encountered if the items are stored at a single location.

When a request or an order specifying one or more of the inventory items is received, or as a user progresses through the materials handling facility 220, inventory items that are listed in the request or order, or are desired by the user, may be selected or "picked" from an inventory area at the materials handling facility 220. For example, in one implementation, a customer or other user may travel through the materials handling facility 220 with a list (e.g., a paper list, or a handheld mobile device displaying or including such a list) and may pick one or more of the inventory items from an inventory area at the materials handling facility 220. In other implementations, an employee of the materials handling facility 220 or another user may pick one or more inventory items, as may be directed by one or more written or electronic pick lists derived from orders. In some instances, an inventory item may be retrieved and delivered to a customer or another user who placed a request for the inventory item. In other instances, the inventory item may require repositioning from one location within an inventory area to another location. For example, in some instances, an inventory item may be picked from a first location (e.g., a first inventory shelf or other storage unit) in an inventory area, moved a distance, and placed at a second location (e.g., a second inventory shelf or other storage unit) in the inventory area.

As is shown in FIG. 2, the materials handling facility 220 includes a networked computer infrastructure for performing various computer-related functions associated with the receipt, storage, processing and distribution of such items, including one or more physical computer servers 222, data stores (e.g., databases) 224 and processors 226, that may be provided in the same physical location as the materials handling facility 220, or in one or more alternate or virtual locations, e.g., in a "cloud"-based environment. In some implementations, the servers 222, the data stores 224 and/or the processors 226 or any number of other computing devices or resources may further execute any type of computer-based function or compute any type or form of calculation, including but not limited to any formulas, equations, algorithms or techniques for determining one or more probabilities or performing any number of statistical tests.

Such computer devices or resources may also operate or provide access to one or more reporting systems for receiving or displaying information or data regarding workflow operations, and may provide one or more interfaces for receiving interactions (e.g., text, numeric entries or selections) from one or more operators, users or workers in response to such information or data. Such computer devices or resources may be general purpose devices or machines, or dedicated devices or machines that feature any form of input and/or output peripherals such as scanners, readers, keyboards, keypads, touchscreens, voice interaction or recognition components or modules, or like devices, and may further operate or provide access to one or more engines for analyzing the information or data regarding the workflow operations, or the interactions received from the one or more operators, users or workers.

The materials handling facility 220 may include one or more inventories having predefined two-dimensional or three-dimensional storage units for accommodating items and/or containers of such items, such as aisles, rows, bays, shelves, slots, bins, racks, tiers, bars, hooks, cubbies or other like storage means, or any other appropriate regions or stations, which may be flat or angled, stationary or mobile, and of any shape or size. Additionally, as is discussed above, the materials handling facility 220 may further include one or more receiving stations featuring any apparatuses that may be required in order to receive shipments of items at the materials handling facility 220 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The materials handling facility 220 may further include one or more distribution stations where items that have been retrieved from a designated inventory area may be evaluated, prepared and packed for delivery from the materials handling facility 220 to addresses, locations or destinations specified by customers, also by way of carriers such as cars, trucks, trailers, freight cars, container ships or cargo aircraft (e.g., manned aircraft or unmanned aircraft, such as drones).

Alternatively, an item received at a receiving station of the materials handling facility 220 may be transferred directly to a distribution station for further processing, or "cross-docked," without first being placed into storage in an intermediate inventory area. The materials handling facility 220 may also include one or more additional stations for receiving and distributing items to customers, as well as one or more conveying systems, autonomous mobile robots, or other manual or automated vehicles for transporting items between such stations or areas (not shown in FIG. 2). The materials handling facility 220 may operate one or more order processing and/or communication systems using computer devices or resources in communication with one or more of the servers 222, the data stores 224 and/or the processors 226, or through one or more other computing devices or resources that may be connected to the network 290, as is indicated by line 228, in order to transmit or receive information in the form of digital or analog data, or for any other purpose.

The imaging devices 225-1, 225-2 . . . 225-n may be any form of optical recording device that may be used to photograph or otherwise record imaging data of structures, facilities or any other elements within the materials handling facility 220, as well as any items within the materials handling facility 220, or for any other purpose. The imaging devices 225-1, 225-2 . . . 225-n may be mounted in any specific location or orientation within the materials handling facility 220, e.g., above, below or alongside one or more inventory areas or stations for receiving or distributing items.

The imaging devices 225-1, 225-2 . . . 225-n may include one or more sensors, memory or storage components and processors, and such sensors, memory components or processors may further include one or more photosensitive surfaces, filters, chips, electrodes, clocks, boards, timers or any other relevant features (not shown). The imaging devices 225-1, 225-2 . . . 225-n may capture imaging data in the form of one or more still or moving images of any kind or form, as well as any relevant audio signals or other information, within one or more designated locations within the materials handling facility 220. In some implementations, one or more of the imaging devices 225-1, 225-2 . . . 225-n may be configured to capture depth imaging data, e.g., distances or ranges to objects within their respective fields of view. In some implementations, one or more of the imaging devices 225-1, 225-2 . . . 225-n may be configured to capture visual imaging data, e.g., visual images or image frames in color, grayscale or black-and-white.

For example, one or more of the imaging devices 225-1, 225-2 . . . 225-n may be an RGB color camera, a still camera, a motion capture/video camera or any other type or form of camera. In other implementations, one or more of the imaging devices 225-1, 225-2 . . . 225-n may be depth-sensing cameras, such as a RGBD (or RGBz) camera. In still other implementations, one or more of the imaging devices 242 may be a thermographic or infrared (IR) camera. Additionally, in some implementations, the imaging devices 225-1, 225-2 . . . 225-n may simply be camera modules that include a lens and an image sensor configured to convert an optical image obtained using the lens of the camera into a digital signal or digital representation of the image (generally referred to herein as imaging data). In one implementation, the image sensor may be a RGB sensor capable of supporting an image resolution of at least 860×480 at six frames per second that may likewise be configured to provide image data to other components (e.g., a graphics processing unit) for processing. In some implementations, the imaging devices 225-1, 225-2 . . . 225-n may be paired to provide stereo imagery and depth information, and may include a pair of camera modules. Additionally, imaging data may be stored in any variety of formats including, but not limited to, YUYV, RGB, RAW, .bmp, .jpeg, .gif, or the like.

The imaging devices 225-1, 225-2 . . . 225-n may also include manual or automatic features for modifying their respective fields of view or orientations. For example, one or more of the imaging devices 225-1, 225-2 . . . 225-n may be configured in a fixed position, or with a fixed focal length (e.g., fixed-focus lenses) or angular orientation. Alternatively, one or more of the imaging devices 225-1, 225-2 . . . 225-n may include one or more motorized features for adjusting a position of the imaging device, or for adjusting either the focal length (e.g., zooming the imaging device) or the angular orientation (e.g., the roll angle, the pitch angle or the yaw angle), by causing changes in the distance between the sensor and the lens (e.g., optical zoom lenses or digital zoom lenses), changes in the location of the imaging devices 225-1, 225-2 . . . 225-n, or changes in one or more of the angles defining the angular orientation.

For example, one or more of the imaging devices 225-1, 225-2 . . . 225-n may be hard-mounted to a support or mounting that maintains the device in a fixed configuration or angle with respect to one, two or three axes. Alternatively, however, one or more of the imaging devices 225-1, 225-2 . . . 225-n may be provided with one or more motors and/or controllers for manually or automatically operating one or more of the components, or for reorienting the axis or direction of the device, i.e., by panning or tilting the device. Panning an imaging device may cause a rotation within a horizontal axis or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Some of the imaging devices 225-1, 225-2 . . . 225-n may digitally or electronically adjust an image identified in a field of view, subject to one or more physical and operational constraints. For example, a digital camera may virtually stretch or condense the pixels of an image in order to focus or broaden a field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Once the characteristics of stationary or moving objects or portions thereof have been recognized in one or more digital images, such characteristics of the objects or portions thereof may be matched against information regarding edges, contours, outlines, colors, textures, silhouettes, shapes or other characteristics of known objects, which may be stored in one or more data stores. In this regard, stationary or moving objects may be classified based at least in part on the extent to which the characteristics identified in one or more digital images correspond to one or more of the characteristics of the known objects.

The operability of networks including one or more of the imaging devices 225-1, 225-2 . . . 225-n, e.g., digital cameras, may be affected based on the lighting conditions and characteristics of the scenes in which the imaging devices 225-1, 225-2 ... 225-*n* are deployed, e.g., whether such scenes have sufficient lighting at appropriate wavelengths, whether such scenes are occluded by one or more objects, or whether such scenes are plagued by shadows or other visual impurities. The operability may also depend on the characteristics of the objects within the scenes, including variations, reflectances or deformations of their respective surfaces, as well as their sizes or textures.

Although the materials handling facility 220 of FIG. 2 includes boxes corresponding to three imaging devices 225-1, 225-2 ... 225-*n*, those of ordinary skill in the pertinent arts will recognize that any number or type of imaging devices may be provided within the materials handling facility 220 in accordance with the present disclosure, including but not limited to digital cameras, depth sensors or range cameras, infrared cameras, radiographic cameras or other optical sensors.

The materials handling facility 220 may also include any number of other sensors, components or other features for controlling or aiding in the operation of the materials handling facility 220, including but not limited to one or more thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), laser sensors, weight sensors, attitude indicators, depth gauges, accelerometers, or sound sensors (e.g., microphones, piezoelectric sensors, vibration sensors or other transducers for detecting and recording acoustic energy from one or more directions).

The customer 280 may be any entity or individual that wishes to manually or automatically retrieve, evaluate and/or purchase one or more items maintained in an inventory area of the materials handling facility 220, or to download, purchase, rent, lease, borrow or otherwise obtain items (e.g., goods, products, services or information of any type or form) from the marketplace 210. The customer 280 may utilize one or more computing devices, such as a smartphone 282 or any other like machine that may operate or access one or more software applications, such as a web browser (not shown) or a shopping application 284, and may be connected to or otherwise communicate with the marketplace 210, or the materials handling facility 220 through the network 290, as indicated by line 288, by the transmission and receipt of digital data. For example, the customer 280 may use the smartphone 282 or another like client device to interact with one or more computer devices and/or input/output devices within the materials handling facility 220, and for any purpose. Moreover, the customer 280 may retrieve items from the materials handling facility 220, and also receive deliveries or shipments of one or more items from facilities maintained by or on behalf of the marketplace 210, such as the materials handling facility 220.

Alternatively, or in addition to the customer 280, the materials handling facility 220 may also include one or more human operators (not shown), such as one or more workers, who may be any designated personnel tasked with performing one or more tasks within the materials handling facility 220 in general, or within one or more inventory areas, receiving stations, distribution stations or other locations of the materials handling facility 220 in particular. Such workers may handle or transport items (e.g., any type or form of good, product, media or other tangible consumer article) within the materials handling facility 220, or operate one or more pieces of equipment therein (not shown). The workers may also operate one or more specific computing devices or resources for registering the receipt, retrieval, transportation or storage of items within the materials handling facility 220, or a general purpose device such a personal digital assistant, a digital media player, a smartphone, a tablet computer, a desktop computer or a laptop computer (not shown), which may include any form of input and/or output peripherals such as scanners, readers, keyboards, keypads, touchscreens or like devices.

In some implementations, such devices may include one or more wireless modules to facilitate communications with the server 222, with one or more of the imaging devices 225-1, 225-2 ... 225-*n*, or with one or more computer devices or resources, such as the server 212 or the smartphone 282, over the network 290, as well as a display (e.g., a touchscreen display) to facilitate the visible presentation to and interaction with a human operator. Such devices may be configured to store a unique identifier associated with a given human operator, and provide the unique identifier to the server 222 or to another computer device or resource in order to identify the human operator. In some implementations, a portable device may also include one or more other features, e.g., audio input/output peripherals or accessories, such as speakers or microphones, as well as video input/output peripherals or accessories, such as cameras, projectors, haptic peripherals, accessories such as keyboards, keypads, touchscreens, joysticks, control buttons, or other components. Such portable devices may operate in conjunction with or may otherwise utilize or communicate with one or more components of the materials handling facility 220.

The computers, servers, devices and other resources described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method (e.g., speech recognition or gesture recognition devices or techniques) to interact with the computers, servers, devices and the like, or to "select" an item, link, node, hub or any other aspect of the present disclosure.

Those of ordinary skill in the pertinent arts will understand that process steps described herein as being performed by a "marketplace," a "materials handling facility," or a "customer" (or "human operator" or "user") or like terms, may be automated steps performed by their respective computer devices or resources, or implemented within software modules (or computer programs) executed by one or more general purpose computers. Those of ordinary skill in the pertinent arts would also recognize that process steps described as being performed by a "marketplace," a "fulfillment center," or a "customer" (or "human operator" or "user") may be typically performed by a human, but could, alternatively, be performed by an automated agent.

The marketplace 210, the materials handling facility 220 and/or the customer 280 may use any web-enabled or Internet applications or features, or any other client-server applications or features including electronic mail (or E-mail), or other messaging techniques, to connect to the network 290 or to communicate with one another, such as through short or multimedia messaging service (SMS or MMS) text messages. For example, the server 222 may be adapted to transmit information or data in the form of synchronous or asynchronous messages from the materials handling facility 220 to the server 212, the smartphone 282 or any other computer device (e.g., any device having any number of other servers, data stores, processors or the like) in real time or in near-real time, or in one or more offline processes, via the network 290. Those of ordinary skill in the pertinent art would recognize that the marketplace 210, the materials handling facility 220 or the customer 280 may operate any of a number of computing devices or resources that are capable of communicating over the network 290, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a transitory and/or non-transitory computer-readable medium that is within or accessible by computers or computer components such as the server 212, the server 222, the imaging devices 225-1, 225-2 . . . 225-n or the smartphone 282, or any other computers or control systems utilized by the marketplace 210, the materials handling facility 220 or the customer 280 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

The present disclosure references a number of computer-based functions or tasks that may be executed by one or more computer processors, systems or resources. In some implementations, each of such functions or tasks may be executed by processors associated with an imaging device, or two or more imaging devices, which may control one or more aspects of the capture, processing and/or storage of imaging data. In some other implementations, each of such functions or tasks may be executed by processors that are external to an imaging device, such as in one or more other physical, alternate or virtual locations, e.g., in a "cloud"-based environment. In still other implementations, such functions or tasks may be executed in a distributed manner, such as by computer processors, systems or resources in two or more distributed locations. For example, some of such functions or tasks may be executed by processors associated with one or more imaging devices, while other functions or tasks may be executed by processors located in one or more other physical, alternate or virtual locations.

Figure 3:
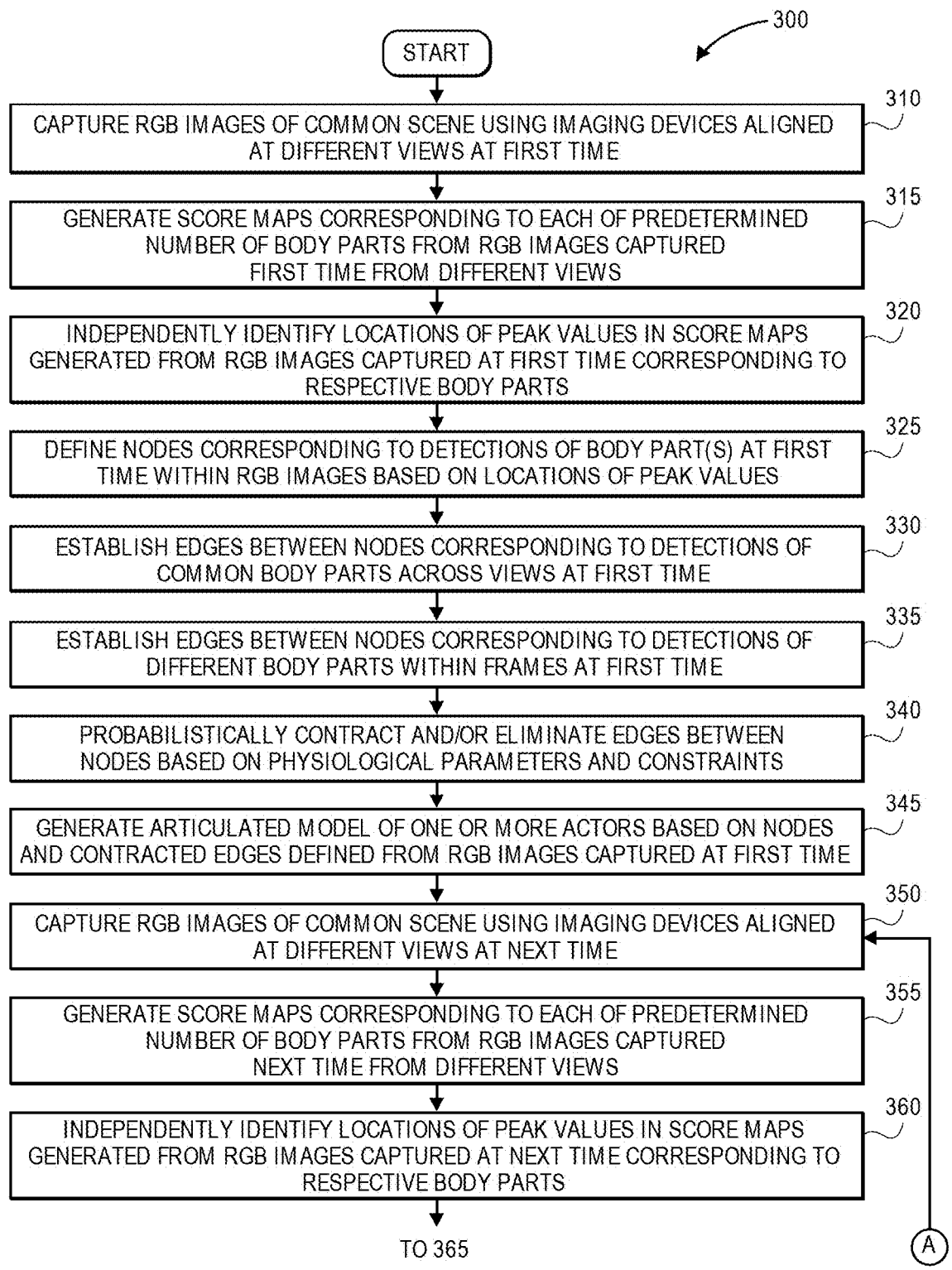
FIG. 3 is a flow chart of one process for recognizing and tracking poses using digital imagery captured from multiple fields of view in accordance with implementations of the present disclosure.
Figure 3:
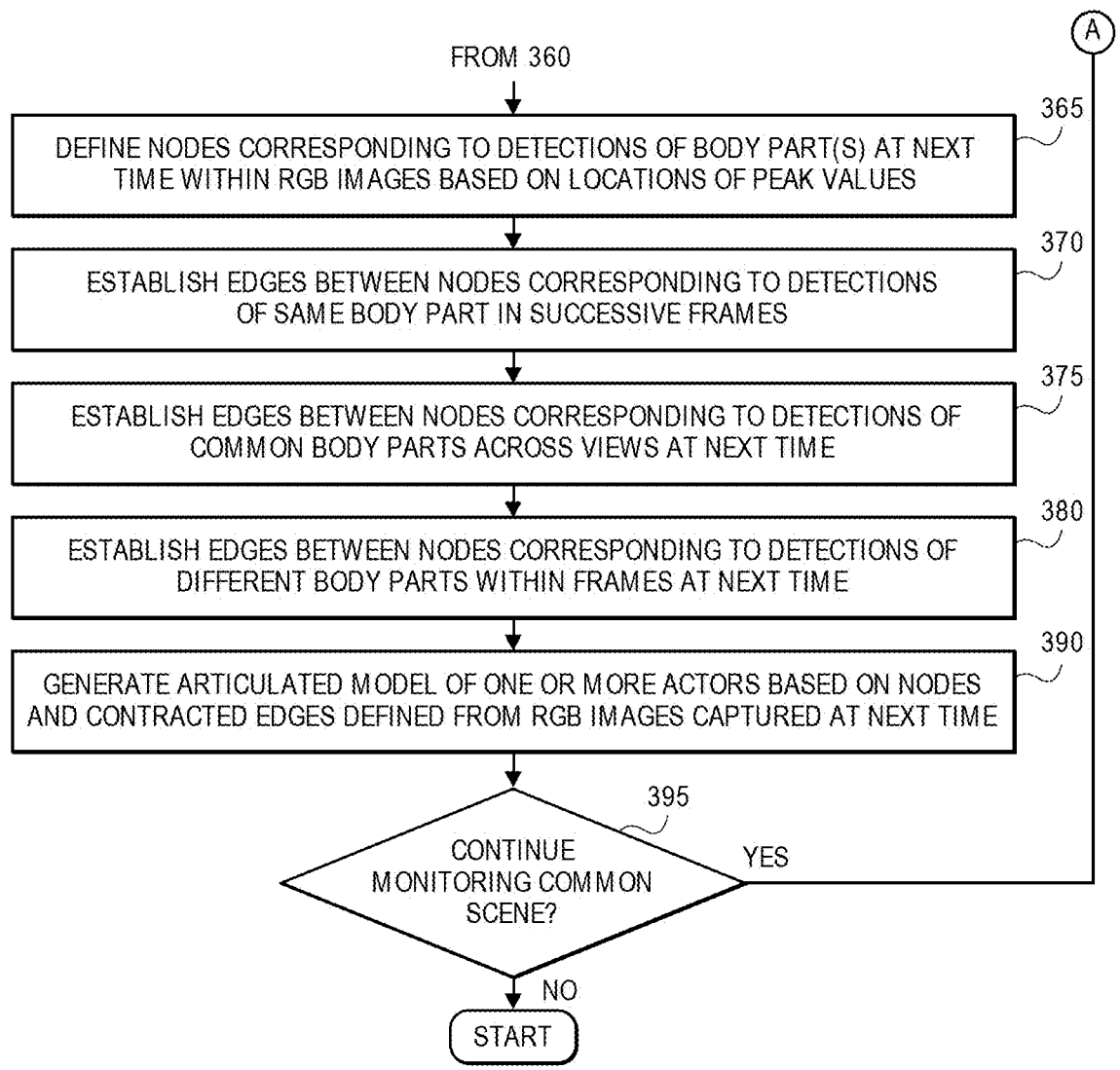

Referring to FIG. 3, a flow chart 300 of one process for recognizing and tracking poses using digital imagery captured from multiple fields of view in accordance with implementations of the present disclosure is shown. At box 310, RGB (e.g., color) images are captured of a common scene at a first time using two or more imaging devices that are aligned at different views. For example, referring again to FIGS. 1A through 1C, the imaging devices 125-1, 125-2 are shown as having fields of view that overlap and/or intersect, and simultaneously capture image frames from the scene. At box 315, score maps corresponding to each of a predetermined number of body parts are generated from the RGB images captured at the first time from the different views. As is discussed, the RGB images may be provided to a deep neural network, a convolutional neural network, a support vector machine or another classifier that is trained to recognize discrete body parts within imaging data. A classifier may be trained to recognize any number of body parts including but not limited to heads, necks, and left or right shoulders, elbows, wrists, hands, hips, knees, ankles, or others. The score maps generated thereby may be graphical representations of probabilities that a given pixel depicts all or a portion of a given body part, with one score map being generated for each of the body parts under consideration from each of the images. Alternatively, a classifier could also be trained to determine probability values and/or vectors that are similar (or close) to one another for body parts belonging to a common actor, and values and/or vectors that are dissimilar (or distant) for body parts that do not belong to a common actor.

At box 320, locations of peak values in each of the score maps that are generated from the RGB images captured from the different views at the first time may be independently identified. The peak values may be identified by any algorithms or techniques, and may represent maximum peak values, e.g., portions of the score maps having the highest absolute values, or localized peak values, e.g., portions of the score maps having the highest localized values. Any number of regions having peak values may be identified in each of the score maps, and such regions may represent candidates of a body part associated with the score map appearing within a given image frame. For example, where a score map generated for a given body part from an image frame includes one location of sufficiently high peak values, the image frame may depict, at most, one of the given body part. Where the score map includes two or more locations of sufficiently high peak values, however, the image frame may depict two or more of the given body part, and may, therefore, depict two or more actors therein.

Additionally, the trained classifier may also generate a vector field including pluralities of vectors extending from the locations of the peak values within each of the score maps generated at box 315, with each of the vectors indicating a bearing and a range, a distance or other measure of a relationship between a given candidate body part and possible locations of other candidate body parts within an image frame. For example, where a location of peak values in a score map indicating probabilities that an image frame includes a neck is identified, a field of vectors extending from that location to locations where a head, shoulders, and other body parts would likely be located if the location of the peak values did, in fact, correspond to a location of a neck may be generated. The vectors for one body part candidate may be represented with bearings and ranges to another body part, and may, alternatively or additionally, include tolerances for each of the bearings and ranges. The reliability and accuracy of the vectors will vary based on the degrees of separation between the body part candidates. For example, vectors corresponding to a left knee that extend from a location of a peak value in a score map to possible locations of left hips and left ankles in space, each of which is intrinsically linked to a left knee, or to possible locations of right knees in space, which are each typically located alongside or near a left knee, may be expected to have greater reliability or accuracy than vectors corresponding to left elbows or right shoulders, for example. Each of the vectors must be generated according to principles of not only compatibility but also incompatibility, in that the vectors must extend from a location of a body part to locations where a corresponding body part may be located, but must not extend to locations where corresponding body parts may not be located. For example, where a candidate of a left hip is identified from peak values in a score map generated from an image frame, a vector between the left hip and a location of a right ankle must extend in an opposite direction from a vector between the left hip and a location of a head, based on the fact that heads are ordinarily observed above hips, and ankles are ordinarily observed below hips.

At box 325, one or more nodes are defined based on locations of peak values within each of the score maps generated at box 315, with each node corresponding to a detection of a body part at the first time. For example, as is shown in FIG. 1C, the score map 140-1-3L includes the region 145-1-3L of peak values that are identified by the server 122 as most likely corresponding to the head 160-1 of the actor 180, while the score map 140-16-3L includes the region 145-16-3L of peak values that are identified by the server 122 as most likely corresponding to the right ankle 160-16 of the actor 180. Each of the nodes may be defined with respect to a unique body part, a unique view or imaging device, and a unique image frame (e.g., a frame number or other identifier of the image frame, or a time at which the image frame was captured.

At box 330, edges are established between nodes corresponding to detections of common body parts across views at the first time. For example, where peak values of a score map generated from image frames captured from two or more different views at the same time indicate that two or more right elbows have been detected from the different views, an edge extending between nodes corresponding to the right elbows may be defined, and a probability that the body parts connected by the edge correspond to the same person may be assigned to the edge. At box 335, edges are established between nodes corresponding to detections of different body parts within image frames at the first time. For example, where an image frame is determined to include two or more body parts based on peak values of score maps corresponding to such body parts, edges extending between body parts (e.g., between a head and a neck, a left shoulder, a right shoulder, or the like) may be defined, and a probability that the body parts connected by the edge correspond to the same person may be assigned to the edge.

At box 340, edges between nodes may be probabilistically contracted and/or eliminated based on physiological parameters and/or constraints. For example, where a node corresponding to one body part is located at a distance that is too close, or too far from, a node corresponding to another body part in order for the body parts to belong to the same actor, the nodes may be reasonably determined to not belong to the same actor, and an edge between such nodes may be eliminated accordingly. Similarly, in some implementations, where two or more nodes corresponding to detections of the same body part are identified and are sufficiently proximate to one another, physically and/or logically, the nodes may be grouped together and the respective probabilities of edges with the grouped nodes may be multiplied.

Any basis for enhancing a probability that a node is associated with another node, or determining that a node is not associated with another node, may be utilized to alter or eliminate edges between nodes in accordance with the present disclosure. For example, the respective probabilities of edges between nodes may be reevaluated based on any information that may be newly obtained, e.g., by the evaluation of subsequently or concurrently captured image frames. In some implementations, for example, when detections of wrists are grouped across views, and elbows are subsequently detected, the wrists and the elbows may be positioned in three-dimensions, e.g., by triangulation, and the probability that a given wrist and a given elbow belong to the same actor may be reevaluated based on this newly constructed information, as distances between wrists and elbows are much more constrained in three-dimensional space than in two-dimensional images. For example, where detections of body parts of a right arm (e.g., a shoulder, an elbow, a wrist or a hand) of an actor are grouped together and modeled in three-dimensions, then determinations of possible detections corresponding to a left arm of the same actor are simplified once the length and other dimensions of the right arm are known, because humans typically have left arms and right arms of the same length.

Therefore, in some implementations, detections of body parts that are most obviously related to or correlated with one another, e.g., where edges established between nodes corresponding to such body parts have highest levels of probability, may be merged, grouped or contracted with one another first, and any information gained based on the merger, grouping or contraction of such body parts may be further utilized to identify the most accurate probabilities associated with edges extending between pairs of other nodes.

At box 345, an articulated model of one or more actors may be generated based on the nodes and the contracted edges defined from the RGB color images captured at the first time. For example, an articulated model may be defined based on the established positions of the body parts and geometric constraints, e.g., known physiological parameters or constraints for a human body. The model may include each of the body parts under consideration, or, alternatively, body parts for which positions and relationships with other body parts are determined to a sufficiently high degree of confidence (e.g., edges having sufficiently high probabilities), and may represent the model at rest or during the execution of a given pose or gesture. For example, where image frames captured using multiple imaging devices include only a portion of a body of an actor, e.g., an upper torso, and omit other portions of the body of the actor, e.g., hips and/or legs, score maps generated based on such image frames may not include any locations of peak values corresponding to body parts that are occluded or not shown in the image frames. Therefore, a skeleton that includes each of the visible body parts based on their confirmed locations and each of the invisible body parts based on their predicted or putative locations may be generated. Alternatively, a skeleton that includes only the visible body parts, based on their confirmed locations, may be constructed.

At box 350, RGB images of the common scene are captured at a next time using the two or more imaging devices. The next time may immediately follow the first time, e.g., the RGB images may be captured by each of the imaging devices immediately after the RGB images that were captured at box 310. Alternatively, any number of image frames may have been captured by any of the imaging devices between the first time and the next time.

At box 355, score maps corresponding to each of the predetermined number of body parts are generated based on the RGB images that were captured at the next time from the different views, e.g., by providing the RGB images to the same neural network or other classifier that generated the score maps from the RGB images that were captured at the first time. At box 360, locations of peak values in each of the score maps that are generated from the RGB images captured from the different views at the next time may be independently identified by any means, including but not limited to the same algorithms or techniques by which the locations of the peak values were identified at box 320. For example, if a score map includes a single location of peak values, the image frame from which the score map was generated for a given body part may include, at most, one of the given body part. If the score map includes two or more locations of peak values, however, the image frame from which the score map was generated for the given body part may include two or more of the given body part.

At box 360, locations of peak values in each of the score maps that are generated from the RGB images captured from the different views at the next time may be independently identified, e.g., by any algorithms or techniques, and may represent maximum or local peaks. Any number of regions having peak values may be identified in each of the score maps. Moreover, a vector field including pluralities of vectors extending from locations of peak values to possible locations of corresponding candidate body parts may be generated, representing the compatibility and/or incompatibility of the corresponding candidate body parts, may be generated.

At box 365, one or more nodes are defined based on locations of peak values within each of the score maps generated at box 355, with each node corresponding to a detection of a body part at the next time. As is discussed above, each of the nodes may be defined with respect to a unique body part, a unique view or imaging device, and a unique image frame (e.g., a frame number or other identifier of the image frame, or a time at which the image frame was captured). At box 370, edges are established between nodes corresponding to detections of the same body part in successive frames, e.g., frames captured at the next time, and at a prior time, such as the first time. Positions of the nodes in the successive frames may be used to track the motion of the corresponding body part over time, e.g., to define a vector or trajectory, e.g., a spline, from the motion of the body part. At box 375, edges are established between nodes corresponding to detections of common body parts across views at the next time, and at box 380, edges are established between nodes corresponding to detections of different body parts within image frames at the first time.

At box 390, the articulated model of the one or more actors is updated based on the nodes and the contracted edges defined from the RGB images captured at the next time. The articulated model may be defined based on the established positions of the body parts, known physiological parameters or constraints for a human body, or any other intrinsic or extrinsic factors. For example, where body parts from which the articulated model was constructed at box 345 are determined, with sufficiently high levels of confidence, to have changed their respective positions, then the positions and poses of the articulated model may be updated accordingly to reflect such changes. In some implementations, when a position of a given body part is determined to have changed, e.g., based on image frames captured at a first time and at a next time, a position of another body part may also be determined to have changed accordingly, e.g., subject to one or more known compatibility or incompatibility constraints. For example, because an actor may not typically raise a hand above his or her head without also raising a corresponding wrist, a recognized change in an established position of a hand may also be presumably accompanied by a change in position of a wrist to which the hand is joined.

At box 395, whether the continued monitoring of the scene is desired may be determined. If the continued monitoring of the scene is desired, then the process returns to box 350, where RGB images of the common scene are captured at a next time using the two or more imaging devices. If the continued monitoring of the scene is not desired, however, then the process ends.

As is discussed above, a classifier (e.g., a deep neural network, a convolutional neural network or a support vector machine) may be trained to generate a variety of information regarding positions of body parts and their relationships with other body parts. For example, when an image frame is provided to a classifier that is trained in accordance with some implementations of the present disclosure, the trained classifier produces, for each body part, a score map indicating probabilities that image pixels of the image depict portions of the body part, and as many vector fields as there are body parts under consideration, e.g., heads, necks, shoulders, elbows, wrists, hands, hips, knees or ankles, or others. Such vector fields may comprise images, or regression maps, in which each image pixel in the images has a value corresponding to a vector extending to an image pixel of a given body part.

Data generated by a trained classifier may be exploited in any number of ways and for any number of purposes, including but not limited to extracting peak values from score maps, extracting possible or predicted positions of all other body parts under consideration based on the corresponding vector fields, and defining edges between all of the body parts or assigning probabilities values to such edges, with such probabilities being defined as functions of how well the possible or predicted positions (e.g., regressions) correlate with actual locations of peak values within the score maps, and one or more physiological constraints. Moreover, in some implementations, a classifier may be trained to produce, for each detection, a value or a set of values such that body parts which belong to a common actor produce similar (or close) values and body parts which belong to different actors produce dissimilar (or distant) values. Distances between such values may then be utilized to evaluate a probability that any two given body parts belong to the common actor.

Figure 4A:
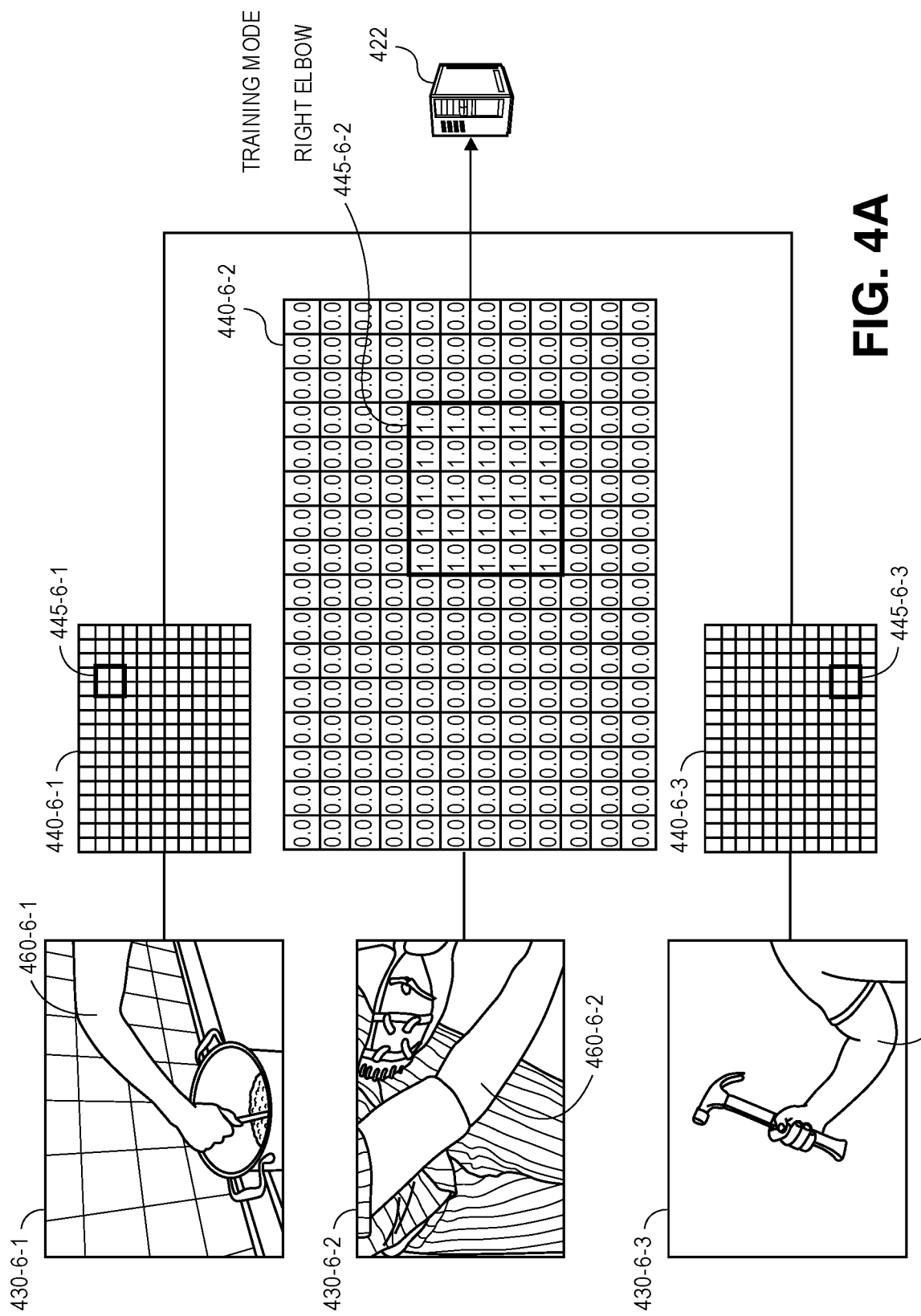
FIG. 4A and FIG. 4B are views of aspects of one system for recognizing and tracking poses using digital imagery captured from multiple fields of view in accordance with implementations of the present disclosure.
Figure 4B:
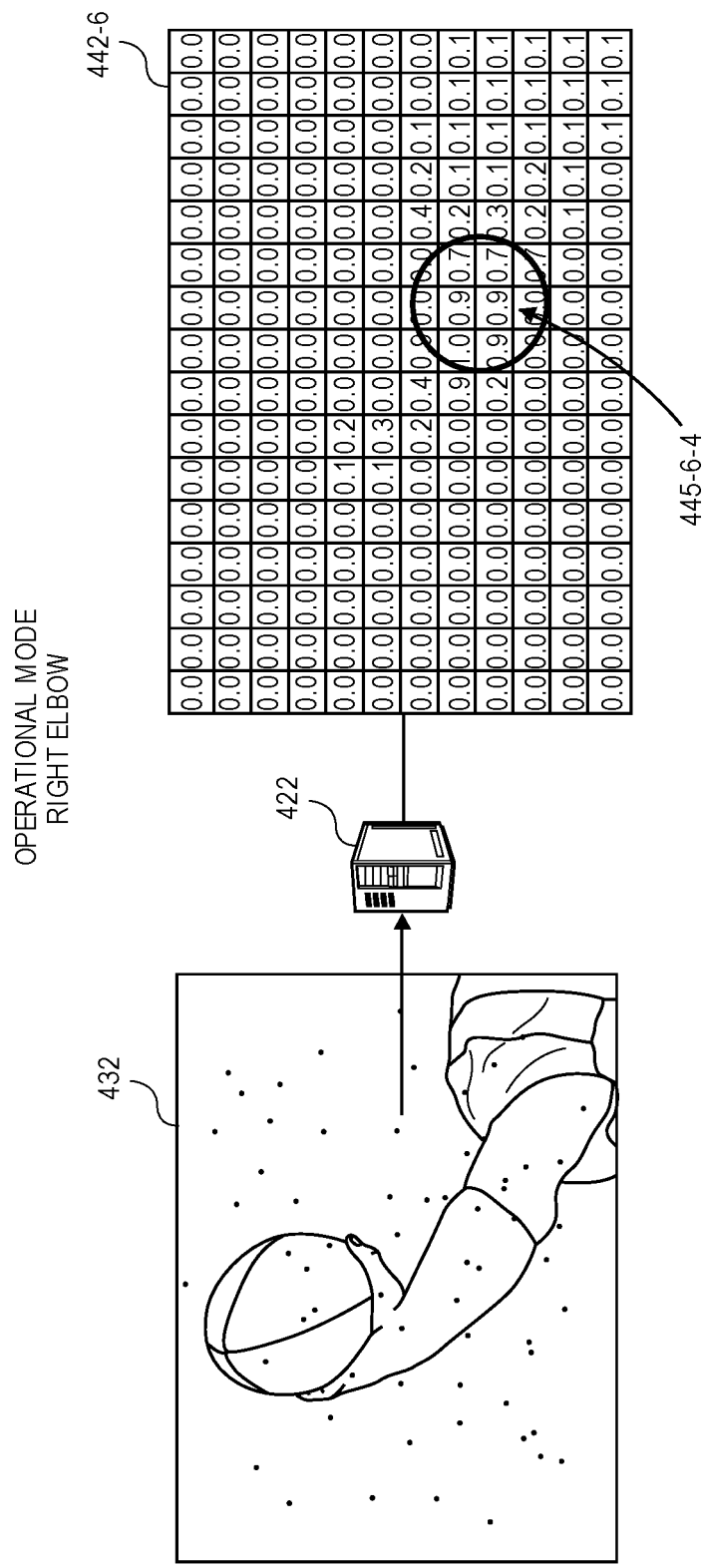

Referring to FIGS. 4A and 4B, views of aspects of one system for recognizing and tracking poses using digital imagery captured from multiple fields of view in accordance with implementations of the present disclosure are shown. Except where otherwise noted, reference numerals preceded by the number "4" shown in FIG. 4A or FIG. 4B indicate components or features that are similar to components or features having reference numerals preceded by the number "2" shown in FIG. 2 or by the number "1" shown in FIGS. 1A through 1J.

As is shown in FIG. 4A, a plurality of training images 430-6-1, 430-6-2, 430-6-3 and training score maps 440-6-1, 440-6-2, 440-6-3 may be provided to a server 422 or other computer-based resource. The server 422 may be configured to function in a training mode, and may operate any type or form of trainable classifier, such as a deep neural network, a convolutional neural network or a support vector machine that may be trained to recognize one or more specific body parts (viz., a right elbow) in image frames. Each of the training images 430-6-1, 430-6-2, 430-6-3 may be annotated or labeled with locations of body parts 460-6-1, 460-6-2, 460-6-3 (viz., right elbows) shown therein. Likewise, the training score maps 440-6-1, 440-6-2, 440-6-3 may expressly identify locations 445-6-1, 445-6-2, 445-6-3 therein as having maximum values (e.g., values of 1.0), and such locations may correspond to locations of specific body parts 460-6-1, 460-6-2, 460-6-3 within the image frames 430-6-1, 430-6-2, 430-6-3. The training score maps 440-6-1, 440-6-2, 440-6-3 may include minimum values (e.g., values of 0.0) at all other locations.

In some implementations, the server 422 receives the training images 430-6-1, 430-6-2, 430-6-3 and the training score maps 440-6-1, 440-6-2, 440-6-3. The server 422 provides the training images 430-6-1, 430-6-2, 430-6-3 to a trainable classifier (e.g., a deep neural network, a convolutional neural network or a support vector machine) operating thereon as training inputs, and provides the training score maps 440-6-1, 440-6-2, 440-6-3 to the trainable classifier as training outputs. The classifier may then be trained to associate each of the training images 430-6-1, 430-6-2, 430-6-3, and the portions of which include the body parts 460-6-1, 460-6-2, 460-6-3, with the maximum values of the scores in the training score maps 440-6-1, 440-6-2, 440-6-3.

After a classifier has been sufficiently trained to recognize body parts expressed within images, and to assign values to each of the pixels representative of probabilities that the pixels depict all or a portion of a given body part, imaging data may be provided to the trained classifier and used to determine whether, and where, the imaging data depicts the given body part. As is shown in FIG. 4B, an image 432 captured from a scene is provided to the server 422 operating the trained classifier in an operating mode. The server 422 may then generate a score map 442-6 that represents probabilities that pixels of the image 432 depict all or a portion of a right elbow. Within the score map 442-6, a region of peak values 445-6-4 likely corresponding to a location of a right elbow within the image 432 are identified. In order to confirm that the scene does, in fact, include an elbow, another image (not shown) captured from a different field of view within the scene may be provided to the trained classifier, and a score map may be generated accordingly. Regions of peak values within the score map may be identified and, if such regions correlate with the region 445-6-4 of the score map 442-6, may be confirmed to correspond a right elbow within the scene.

Although FIGS. 4A and 4B depict the training of a classifier operating on the server 422 to recognize right elbows within imaging data, the systems and methods of the present disclosure are not so limited. A plurality of training images, each depicting any number of body parts, including but not limited to right wrists, may be provided to a classifier as training inputs, and a plurality of training score maps with maximum values in locations corresponding to locations of the body parts in the training images and minimum values in all other locations may be provided to the classifier as training outputs. The classifier may be trained to process images captured from any scene, and from any perspective, to detect any number of body parts therein, and also to generate score maps for each of the body parts. Peak values within each of the score maps may be identified and correlated with peak values within score maps generated from synchronized images captured of the same scene and with fields of view that overlap at least in part.

Figure 5:
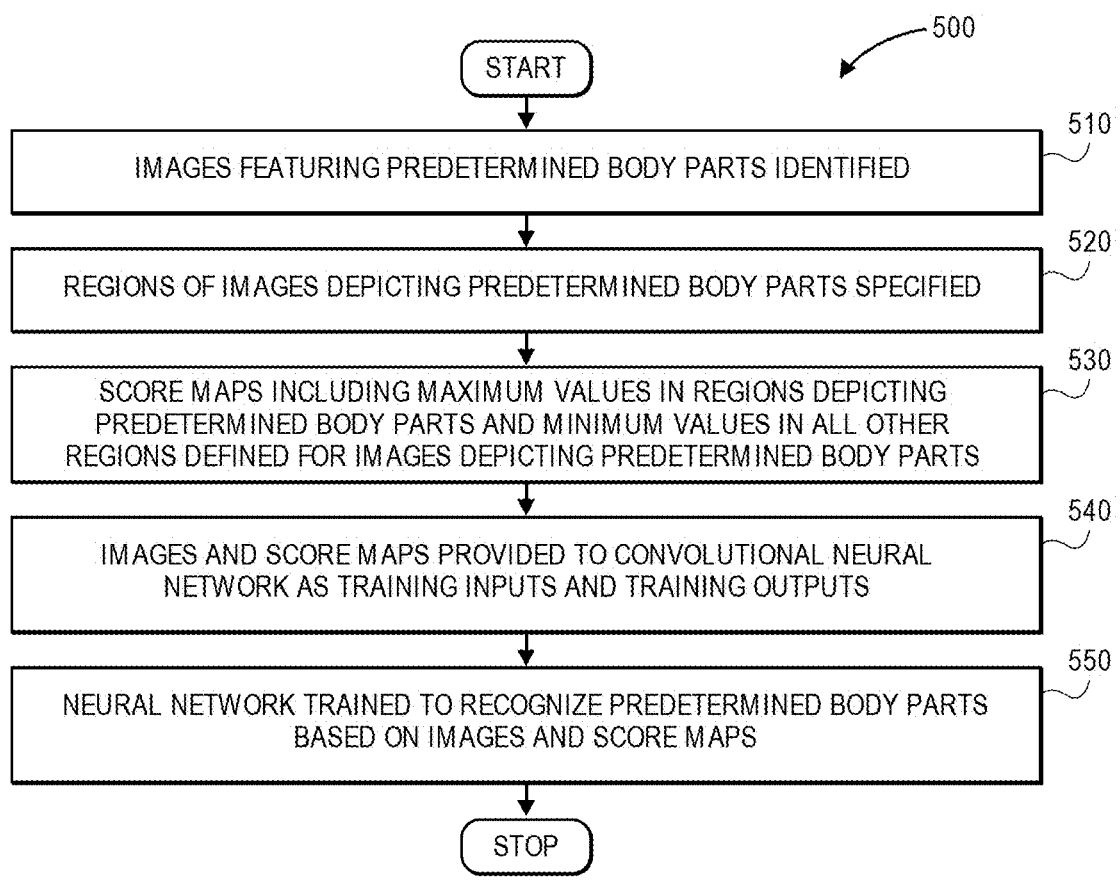
FIG. 5 is a flow chart of one process for recognizing and tracking poses using digital imagery captured from multiple fields of view in accordance with implementations of the present disclosure.

Referring to FIG. 5, a flow chart 500 of one process for recognizing and tracking poses using digital imagery captured from multiple fields of view in accordance with implementations of the present disclosure is shown. At box 510, images featuring a predetermined body part are identified, and at box 520, regions of the images that depict the predetermined body part are specified. For example, referring again to FIG. 4A, training image frames 430-6-1, 430-6-2, 430-6-3 indicating locations of the body parts 460-6-1, 460-6-2, 460-6-3 may be provided to the server 422. Other image frames indicating locations of other body parts (not shown) may also be provided to the server 422. At box 530, training score maps indicating maximum values in the regions corresponding to the predetermined body parts and minimum values in all other regions are defined for the images that depict the predetermined body parts. For example, as is shown in FIG. 4A, the training score maps 440-6-1, 440-6-2, 440-6-3 include regions 445-6-1, 445-6-2, 445-6-3 of maximum values corresponding to the locations of the body parts 460-6-1, 460-6-2, 460-3 in the training images 430-6-1, 430-6-2, 430-6-3, respectively, are defined with minimum values in all other regions.

At box 540, the images and the score maps are provided to a convolutional neural network as training inputs and training outputs, respectively. For example, referring again to FIG. 4A, the server 422 may be configured to train the convolutional neural network to recognize the locations of the body parts 460-6-1, 460-6-2, 460-6-3 in the training image frames 430-6-1, 430-6-2, 430-6-3 based on the training score maps 440-6-1, 440-6-2, 440-6-3, which identify such locations as having maximum values (viz., 1.0), and all other locations as having minimum values. At box 550, the neural network is trained to recognize the predetermined body parts based on the test images and the test score maps, and the process ends.

As is discussed above, tracks or trajectories may be generated for each body part that appears in frames captured by the same imaging device. After such tracks or trajectories are generated for each of a plurality of imaging devices that are aligned to capture imaging data from a scene, and confirmed to correspond to the same body part, the tracks or trajectories may be correlated and/or merged with one another to track the motion of that body part within the plurality of imaging devices. Referring to FIGS. 6A through 6E, views of data captured or generated by a system for recognizing and tracking poses using digital imagery captured from multiple fields of view in accordance with implementations of the present disclosure are shown. Except where otherwise noted, reference numerals preceded by the number "6" shown in FIG. 6A through 6E indicate components or features that are similar to components or features having reference numerals preceded by the number "4" shown in FIG. 4A or FIG. 4B, by the number "2" shown in FIG. 2 or by the number "1" shown in FIGS. 1A through 1J.

Figure 6A:
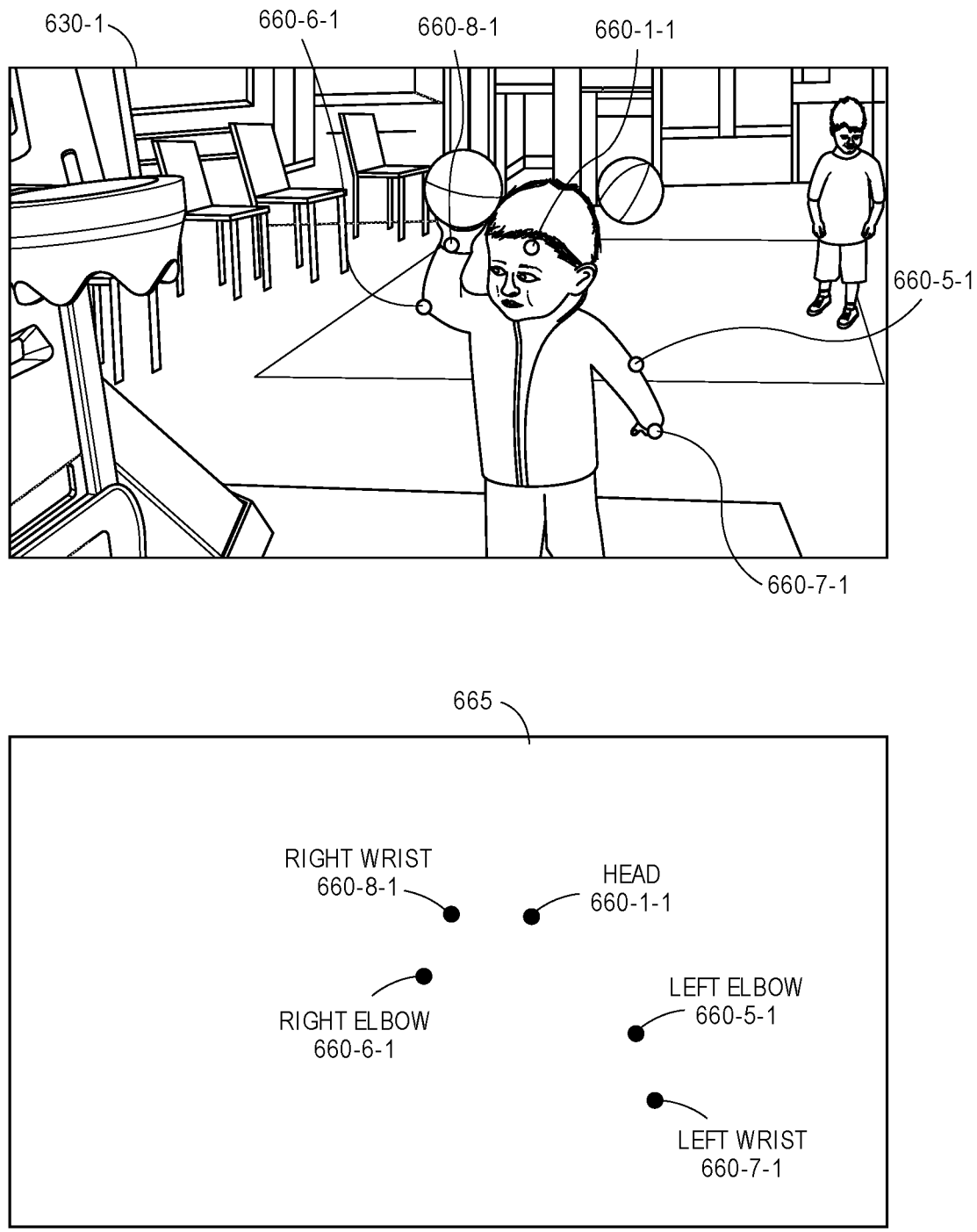
FIGS. 6A through 6E are views of data captured or generated by a system for recognizing and tracking poses using digital imagery captured from multiple fields of view in accordance with implementations of the present disclosure.

Referring to FIGS. 6A through 6E, a plurality of image frames 630-1, 630-2, 630-3, 630-4, 630-5 that were captured from a scene in series by an imaging device (not shown) are shown. As is shown in FIG. 6A, the image frame 630-1 depicts positions of a head 660-1-1, a left elbow 660-5-1, a right elbow 660-6-1, a left wrist 660-7-1 and a right wrist 660-8-1 of an actor 680 during the performance of one or more gestures. The positions of the head 660-1-1, the left elbow 660-5-1, the right elbow 660-6-1, the left wrist 660-7-1 and the right wrist 660-8-1 may be detected in accordance with any of the systems or methods of the present disclosure, such as by providing the image frames 630-1, 630-2, 630-3, 630-4, 630-5, and any synchronized image frames captured at the same times using imaging devices having fields of view that overlap at least in part, to a classifier that is trained to recognize body parts within such image frames and to generate score maps including probabilities that each of the pixels of an image frame depicts all or a portion of a given body part. Where peak values in two or more synchronized image frames are correlated with one another, the peak values may be confirmed to correspond to positions of a given body part, e.g., positions of one or more of the head 660-1-1, the left elbow 660-5-1, the right elbow 660-6-1, the left wrist 660-7-1 and the right wrist 660-8-1. Although the image frames 630-1, 630-2, 630-3, 630-4, 630-5 of FIGS. 6A through 6E are marked with locations of five body parts of the actor 680, as depicted within five image frames captured using a single imaging device, any number of body parts belonging to any number of actors may be identified in any number of synchronized image frames captured from two or more views in accordance with implementations of the present disclosure.

Figure 6B:
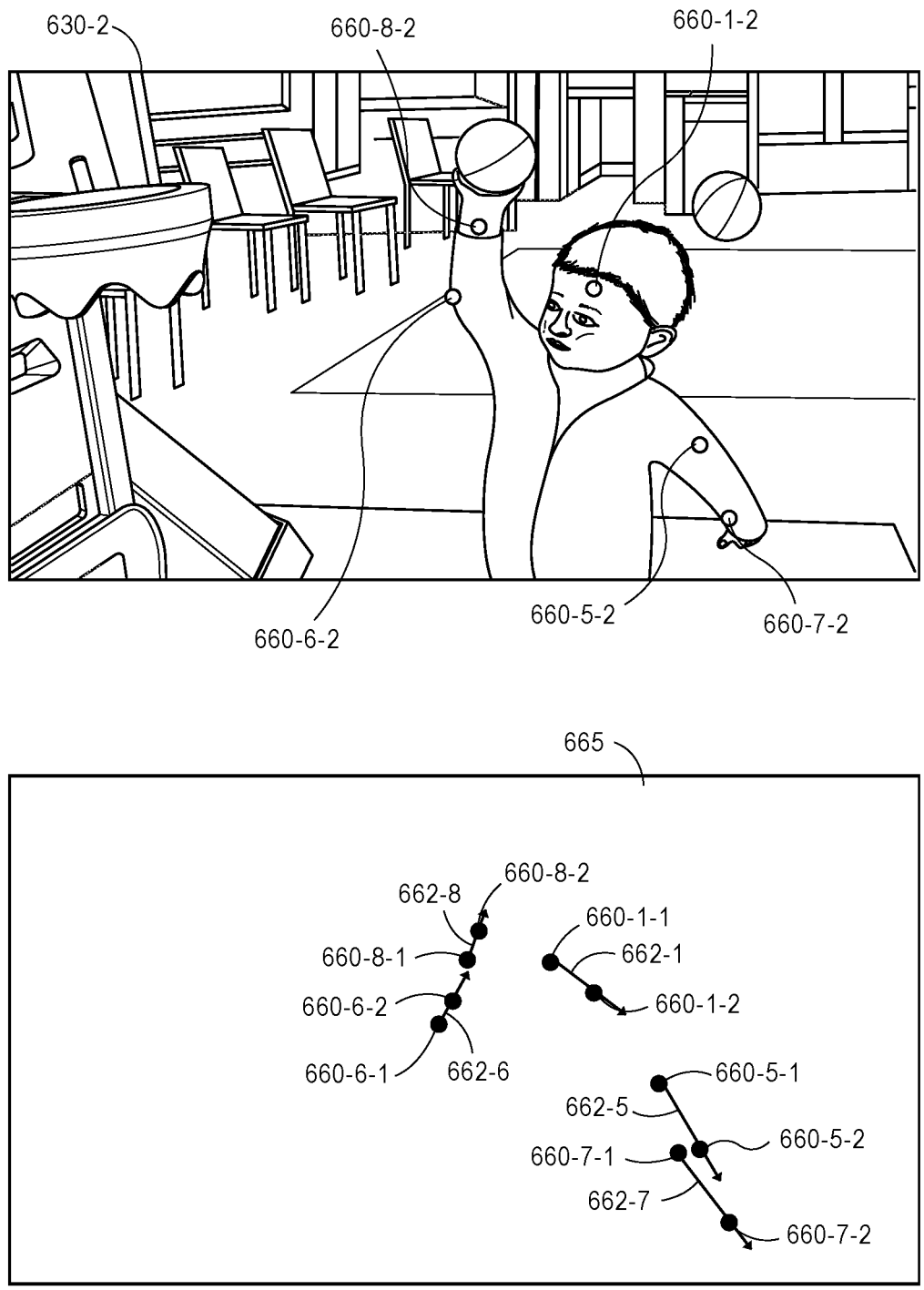
Figure 6C:
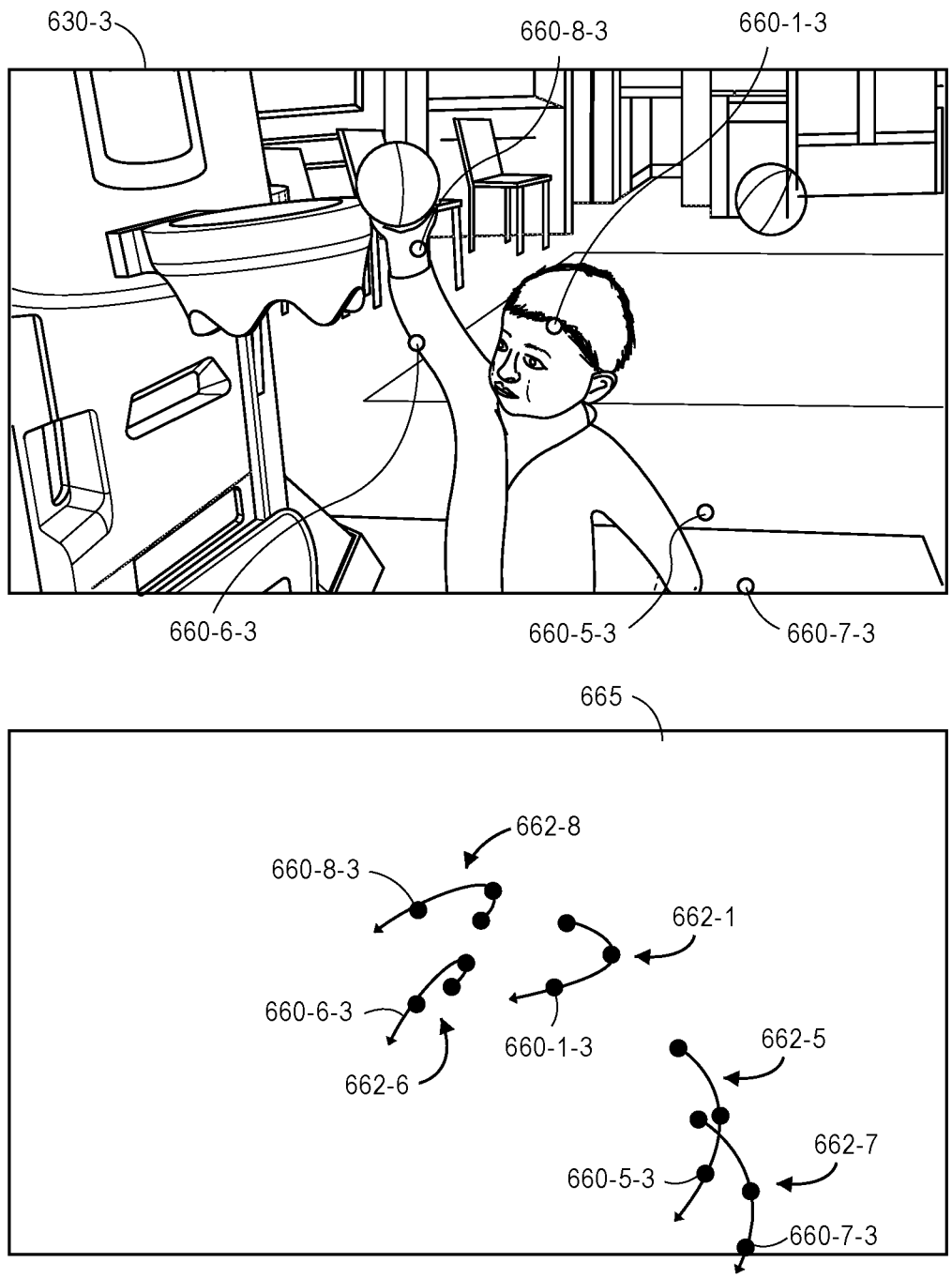
Figure 6D:
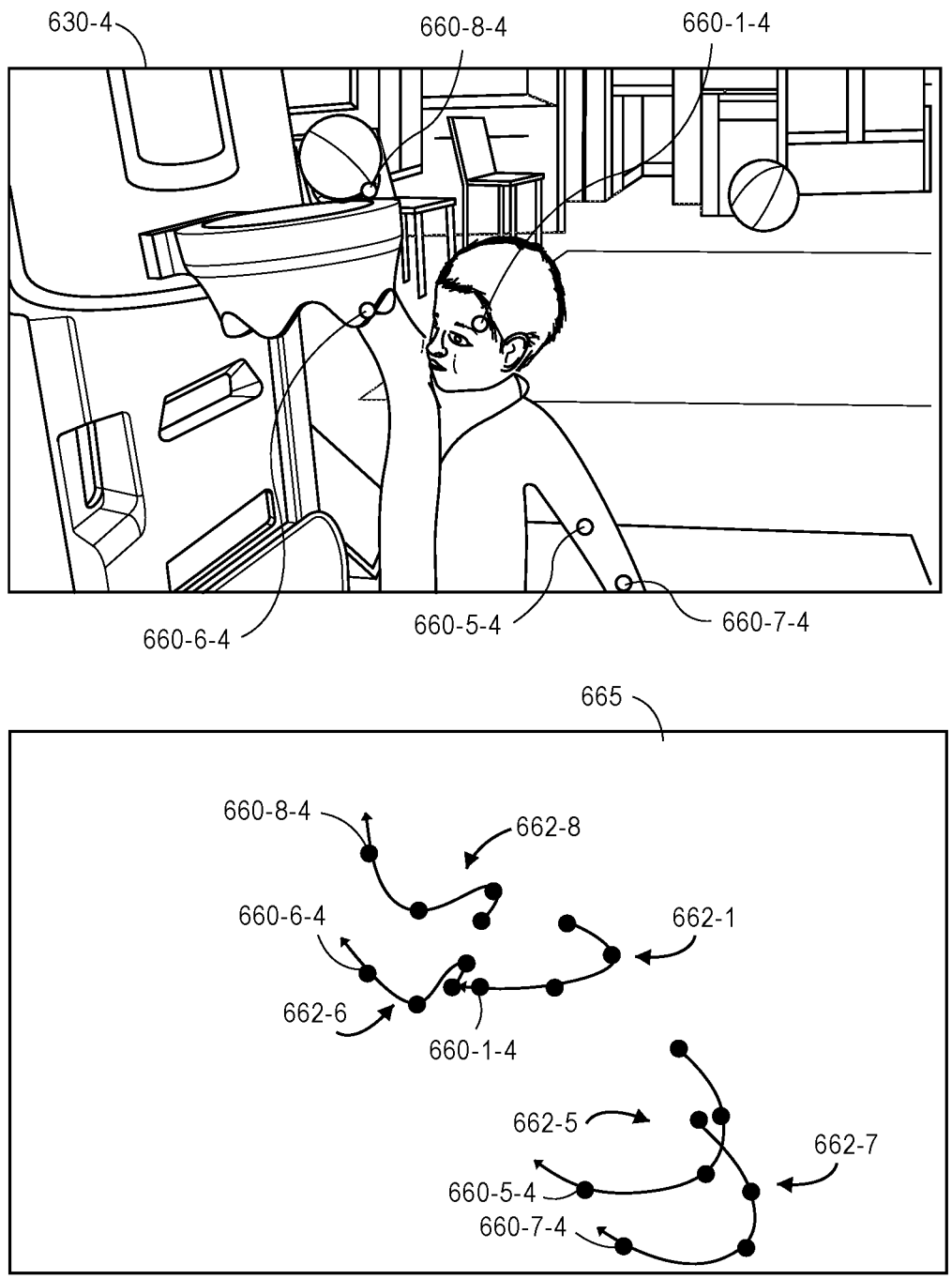
Figure 6E:
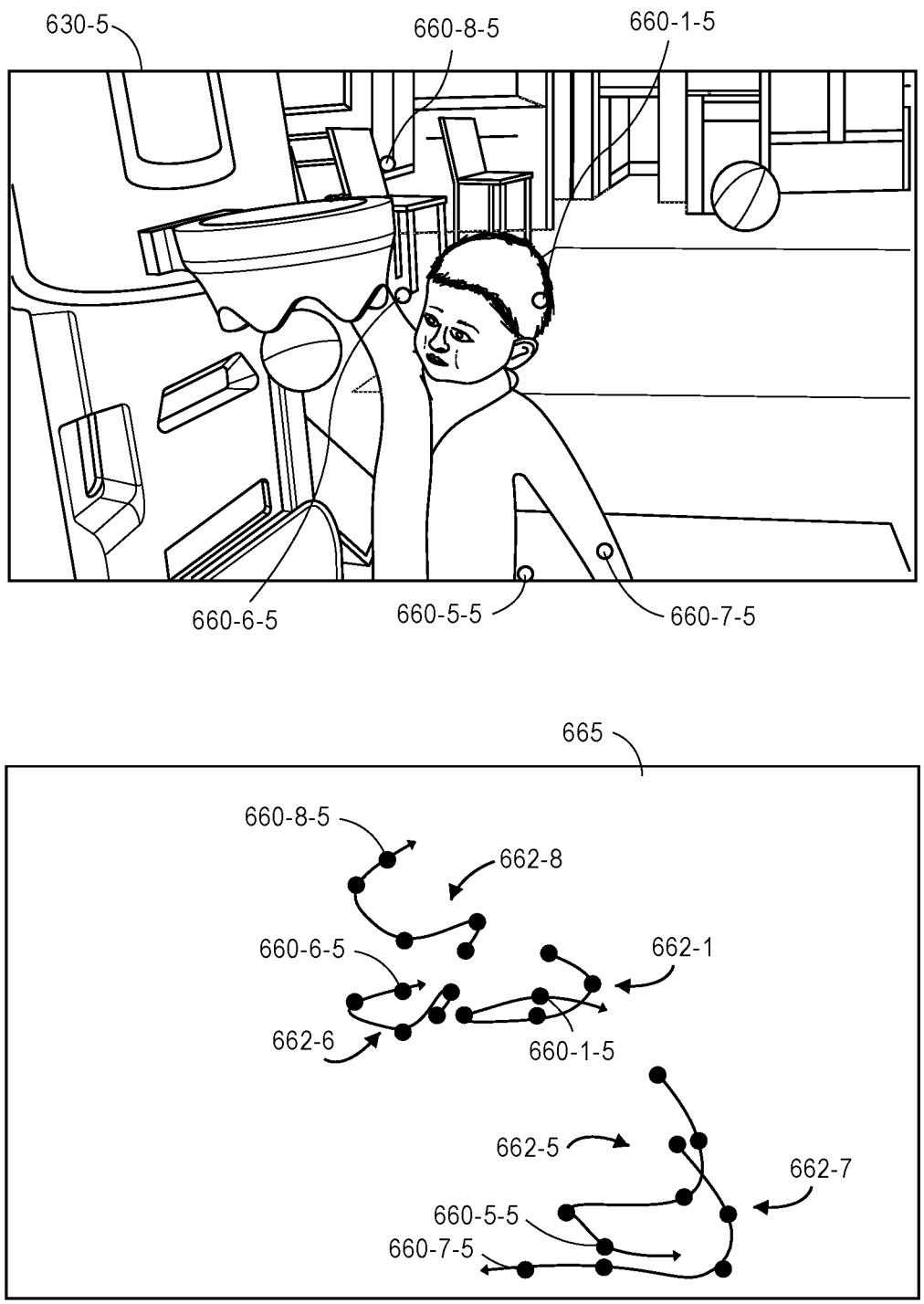

Tracks or trajectories of the positions of the body parts identified within synchronized image frames may be tracked over time. For example, as is shown in FIG. 6B, a trajectory 662-1 of the head of the actor 680 may be defined based on the positions of the head 660-1-1, 660-1-2 in the successive image frames 630-1, 630-2. Likewise, as is also shown in FIG. 6B, trajectories 662-5, 662-6, 662-7, 662-8 may also be defined based on the positions of the left elbow 660-5-1, 660-5-2, the right elbow 660-6-1, 660-6-2, the left wrist 660-7-1, 660-7-2 and the right wrist 660-8-1, 660-8-2 in the successive image frames 630-1, 630-2. Similarly, as is shown in FIGS. 6C, 6D and 6E, the trajectories 662-1, 662-5, 662-6, 662-7, 662-8 may be further enhanced based on the positions of the head 660-1-3, 660-1-4, 660-1-5, the left elbow 660-5-3, 660-5-4, 660-5-5, the right elbow 660-6-3, 660-6-4, 660-6-5, the left wrist 660-7-3, 660-7-4, 660-7-5, and the right wrist 660-8-3, 660-8-4, 660-8-5 in the following image frames 630-3, 630-4, 630-5.

Once the trajectories 662-1, 662-5, 662-6, 662-7, 662-8 have been defined based on detections of the body parts within the image frames 630-1, 630-2, 630-3, 630-4, 630-5, each of the trajectories 662-1, 662-5, 662-6, 662-7, 662-8 may be merged with trajectories defined based on detections of one or more of the same body parts within synchronized image frames captured using one or more other imaging devices (not shown), each having a field of view that overlaps at least in part with the field of view of the imaging device that captured the image frames 630-1, 630-2, 630-3, 630-4, 630-5 of FIGS. 6A through 6E, subject to one or more physiological parameters or constraints, e.g., bone lengths, distance constraints, articulation constraints or deformation constraints.

As is discussed above, positions of body parts of actors detected in imaging data captured from two or more imaging devices having fields of view that overlap at least in part may be determined by triangulating rays extending from optical sensors of such imaging devices to pixels on external surfaces of the body parts and confirmed to correspond to the same actor if such rays intersect, or to different actors if such rays diverge. Referring to FIGS. 7A through 7H, views of data captured or generated by a system for recognizing and tracking poses using digital imagery captured from multiple fields of view in accordance with implementations of the present disclosure are shown. Except where otherwise noted, reference numerals preceded by the number "7" shown in FIG. 7A through 7H indicate components or features that are similar to components or features having reference numerals preceded by the number "6" shown in FIG. 6A through 6E, by the number "4" shown in FIG. 4A or FIG. 4B, by the number "2" shown in FIG. 2 or by the number "1" shown in FIGS. 1A through 1J.

Figure 7A:
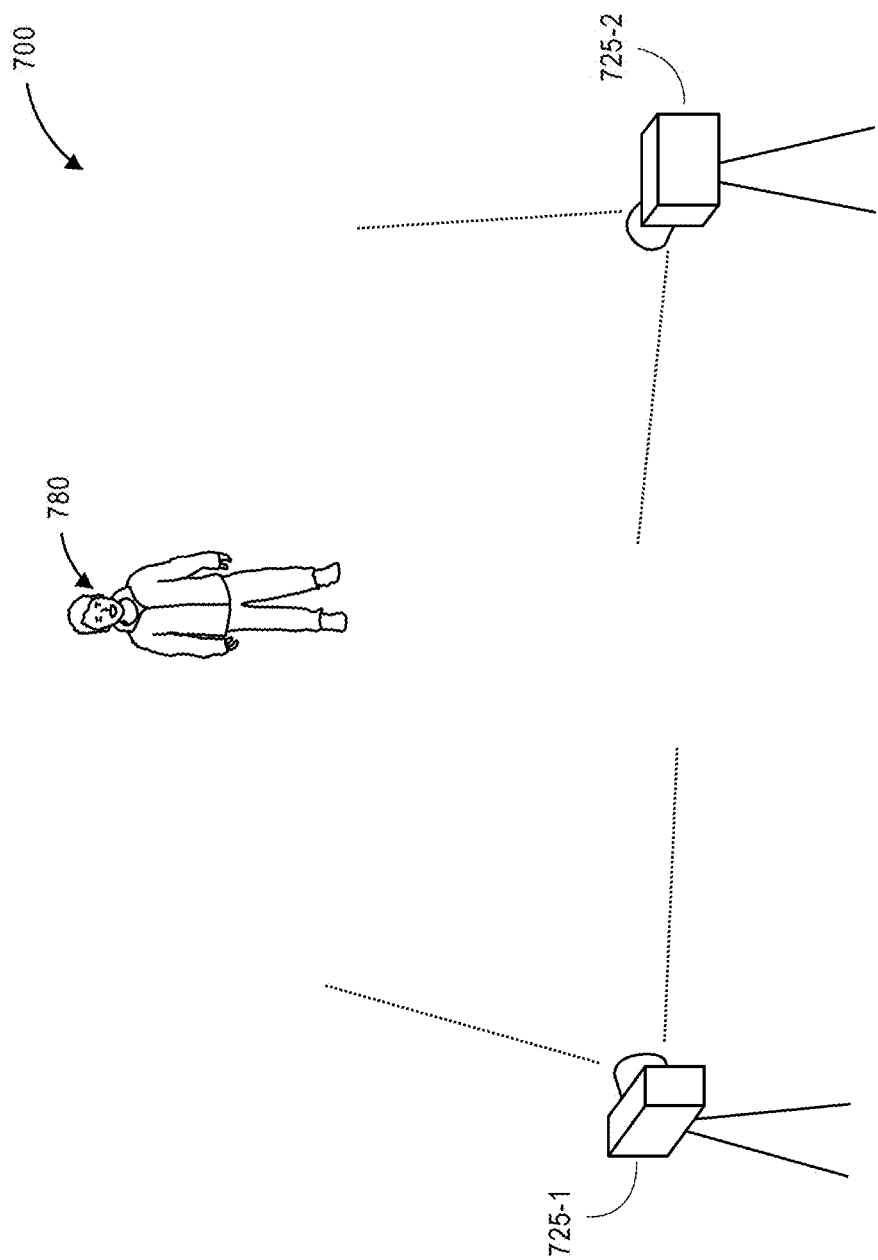
FIGS. 7A through 7H are views of data captured or generated by a system for recognizing and tracking poses using digital imagery captured from multiple fields of view in accordance with implementations of the present disclosure.
Figure 7B:
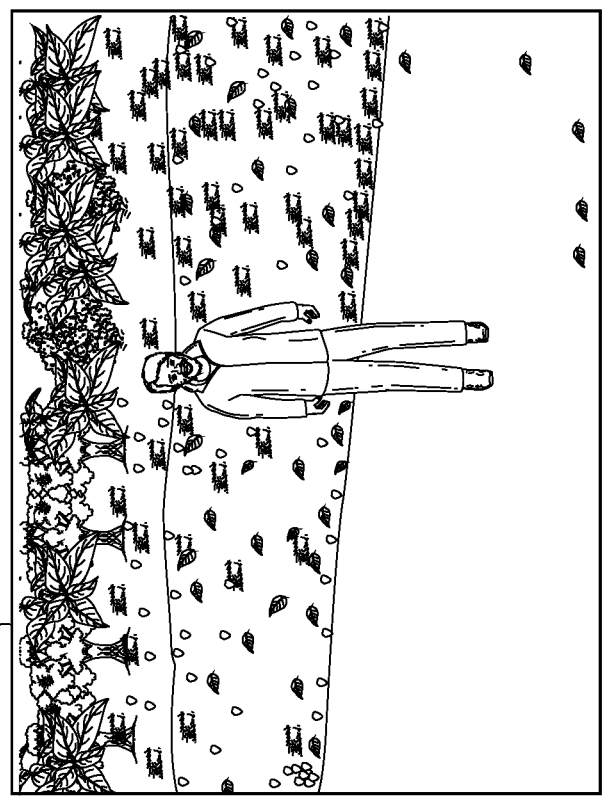
Figure 7B:
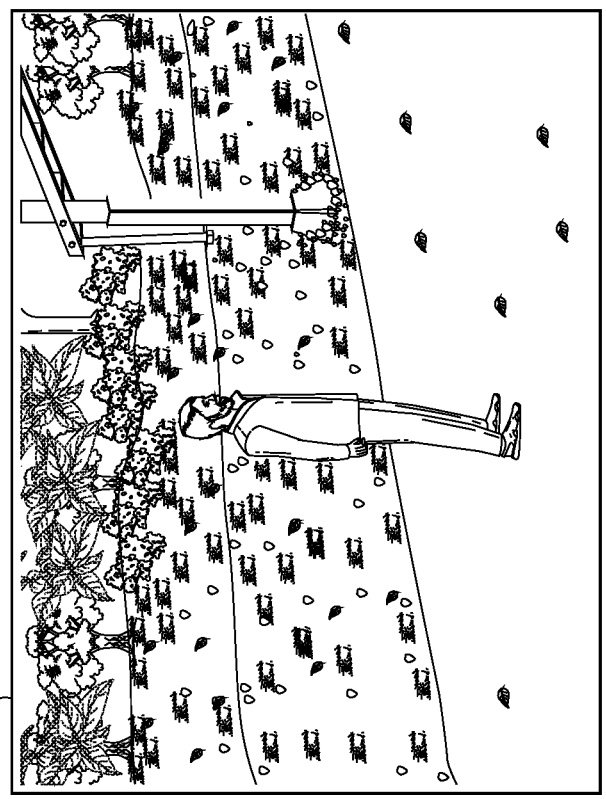

As is shown in FIG. 7A and FIG. 7B, a pair of image frames 730-1L, 730-1R are captured from a common scene at time $t_1$ using a pair of imaging devices having fields of view that overlap at least in part are shown. The image frames 730-1L, 730-1R may be processed by providing the image frames 730-1L, 730-1R to a classifier (e.g., a deep neural network, a convolutional neural network, or a support vector machine) that is trained to recognize one or more body parts within imaging data. For example, based on an output of a trained classifier, and as is discussed above, a score map may be generated for each of a plurality of body parts, and candidates for detections of such parts may be identified based on locations or regions of peak values within such score maps. Locations or regions of the peak values in score maps for specific body parts that are generated from synchronized images may be correlated with one another and used to confirm positions of the body parts therein.

Figure 7C:
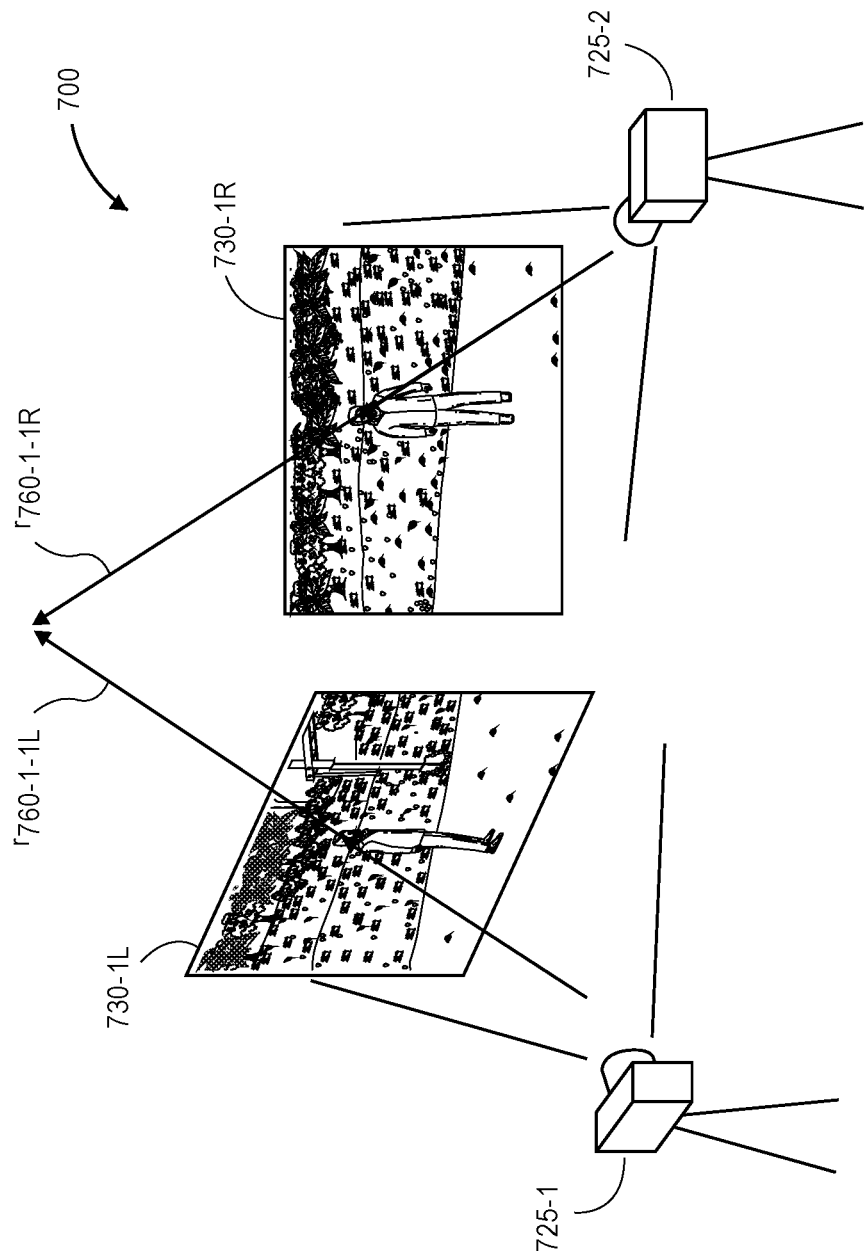

As is shown in FIG. 7C, nodes corresponding to body parts that are detected within the image frames 730-1L, 730-1R, and an edge extending between the nodes, may be defined accordingly. Additionally, the nodes may be correlated, or determined to correspond to the same actor, by extending rays $r_{760\text{-}1\text{-}L}$, $r_{760\text{-}1\text{-}1R}$ from optical elements of the respective imaging devices 725-1, 725-2 that captured the image frames 730-1L, 730-1R to corresponding body parts of the actor, viz., a head of the actor, as is shown in FIG. 7C. If the rays $r_{760\text{-}1\text{-}L}$, $r_{760\text{-}1\text{-}1R}$ intersect, or closely approach one another, then the body parts may be determined to correspond to one another. If the rays $r_{760\text{-}1\text{-}L}$, $r_{760\text{-}1\text{-}1R}$ diverge, or do not approach one another, then the body parts may be determined to correspond to different actors.

Figure 7D:
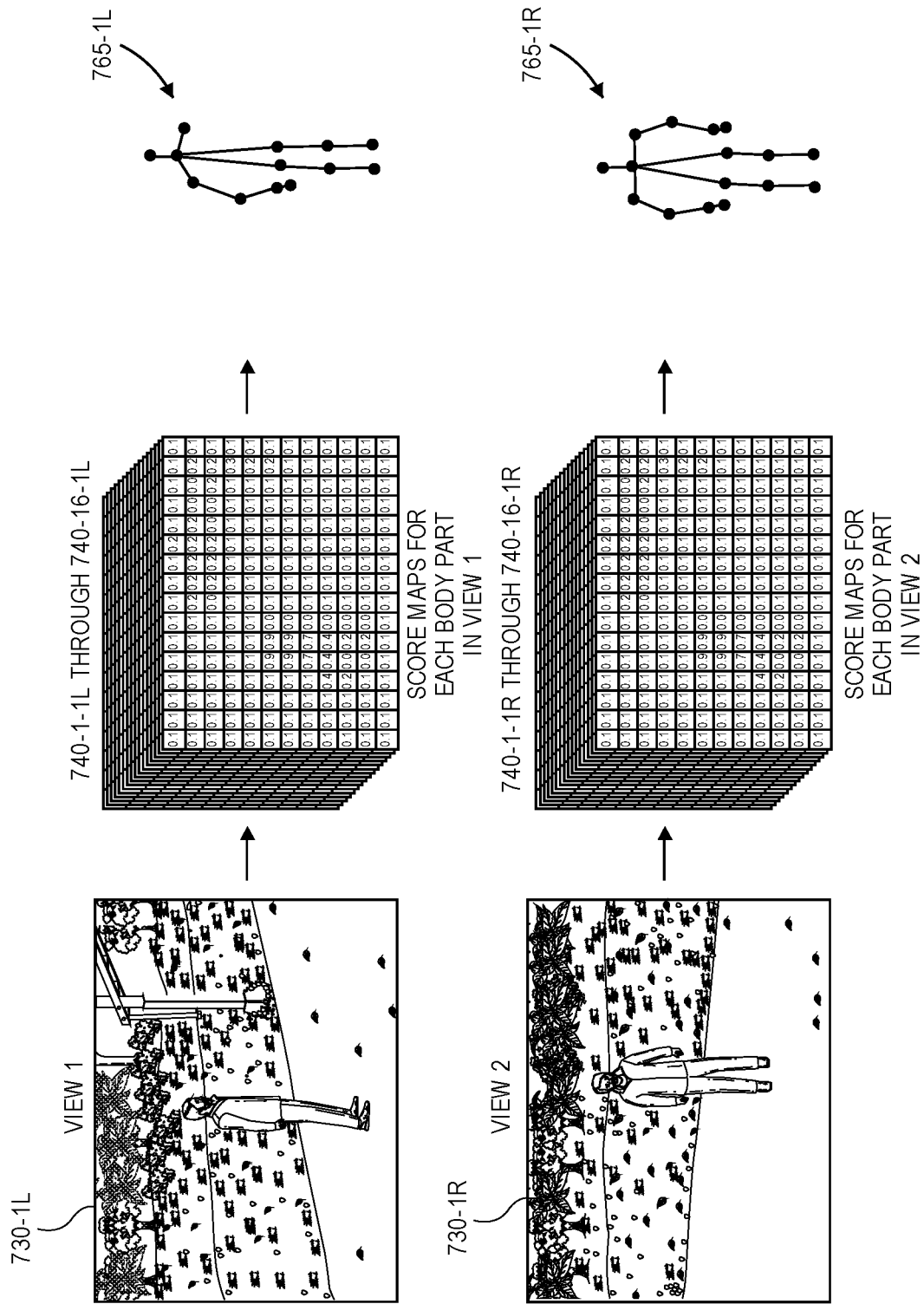

Models of the body parts of an actor may be constructed based on detections of body parts within each of the image frames. For example, as is shown in FIG. 7D, a model 765-1L and a model 765-1R may be constructed based on detections of body parts in the respective views of the imaging devices 725-1, 725-2, by providing the image frames 730-1L, 730-2L to a trained classifier as inputs and generating score maps 740-1-1L through 740-16-1L, 740-1-1R through 740-16-1R for each of the body parts under consideration as outputs. From the respective score maps 740-1-1L through 740-16-1L, 740-1-1R through 740-16-1R, peak values may be identified, and locations of such peak values may be determined to correspond to detections of specific body parts associated with each of the score maps 740-1-1L through 740-16-1L, 740-1-1R through 740-16-1R. Additionally, the trained classifier may also generate a vector field including pluralities of vectors extending from the locations of such peak values within each of the score maps, with each of the vectors indicating a bearing and a range, a distance or other measure of a relationship between a given candidate body part and other candidate body parts.

Each of the vectors must be generated according to principles of not only compatibility but also incompatibility, in that the vectors must extend from a location of a body part to locations where a corresponding body part may be located, but must not extend to locations where corresponding body parts may not be located. The vectors may act as regression tools, in that such vectors may determine where a corresponding body part may be located, and locations defined by such vectors may be compared to detections of such body parts. Based on such detections, and such vectors, a unique model 765-1L, 765-1R of the actor may be defined from each of the image frames 730-1L, 730-1R.

Figure 7E:
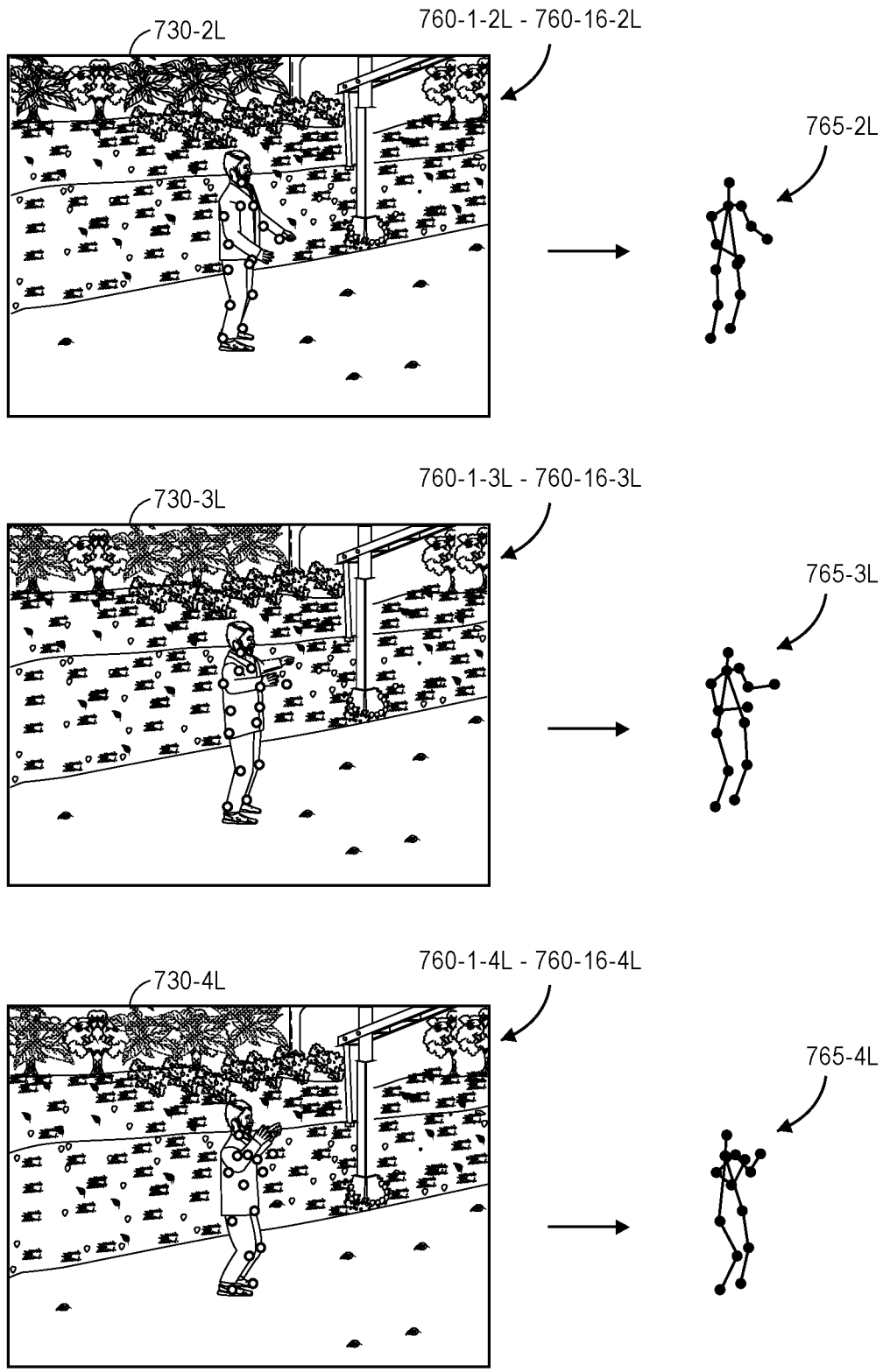
Figure 7F:
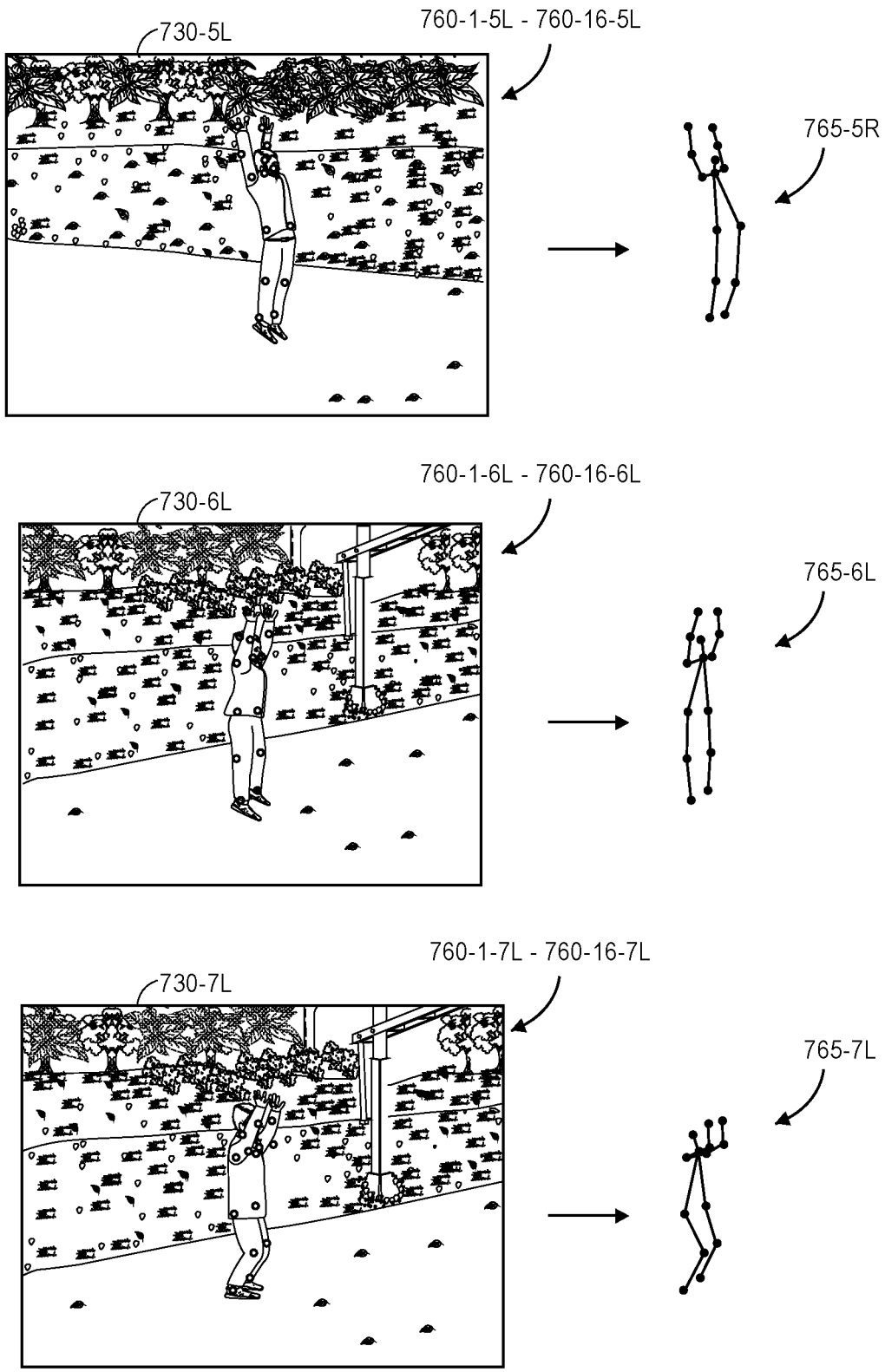
Figure 7G:
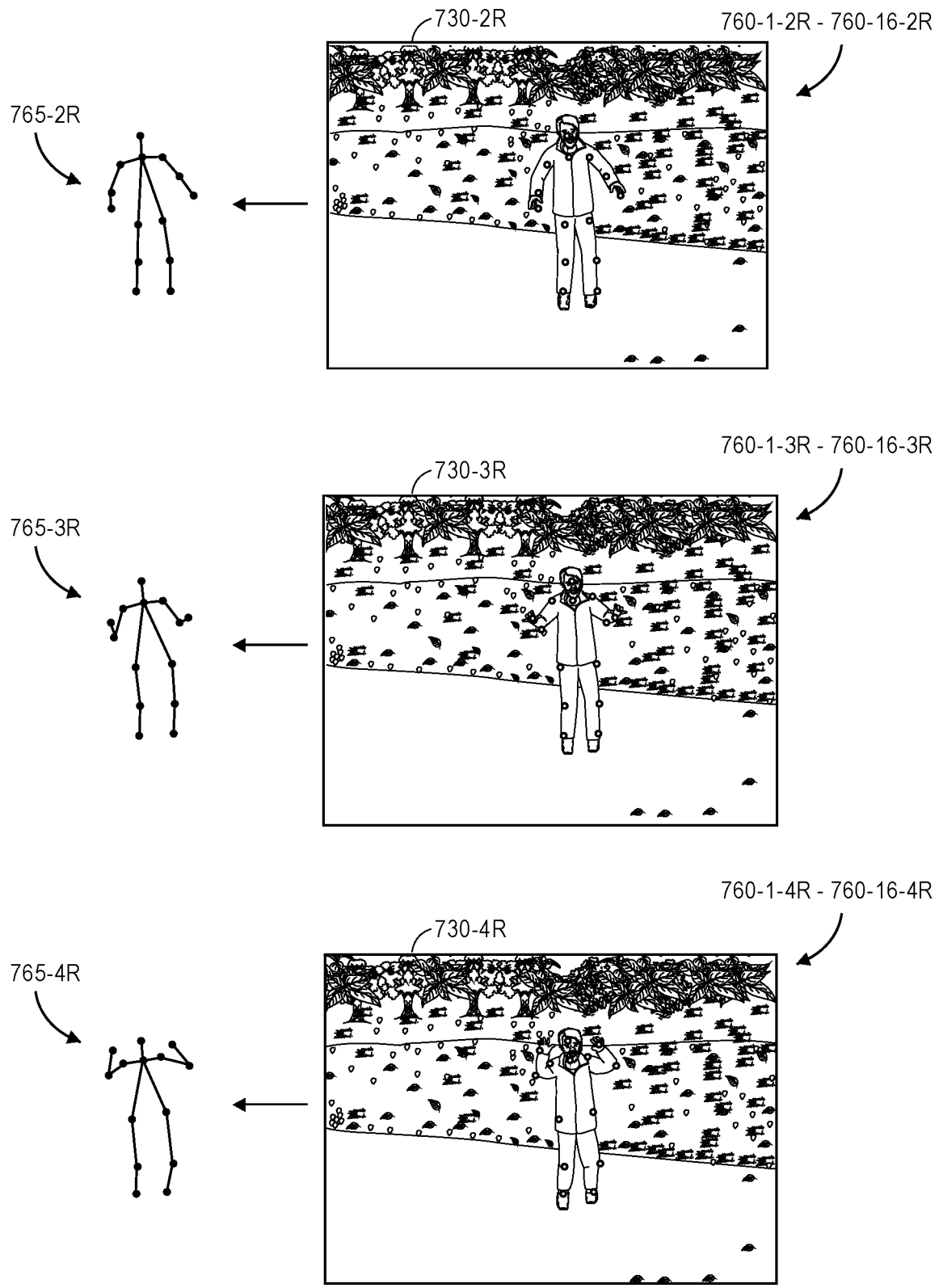
Figure 7H:
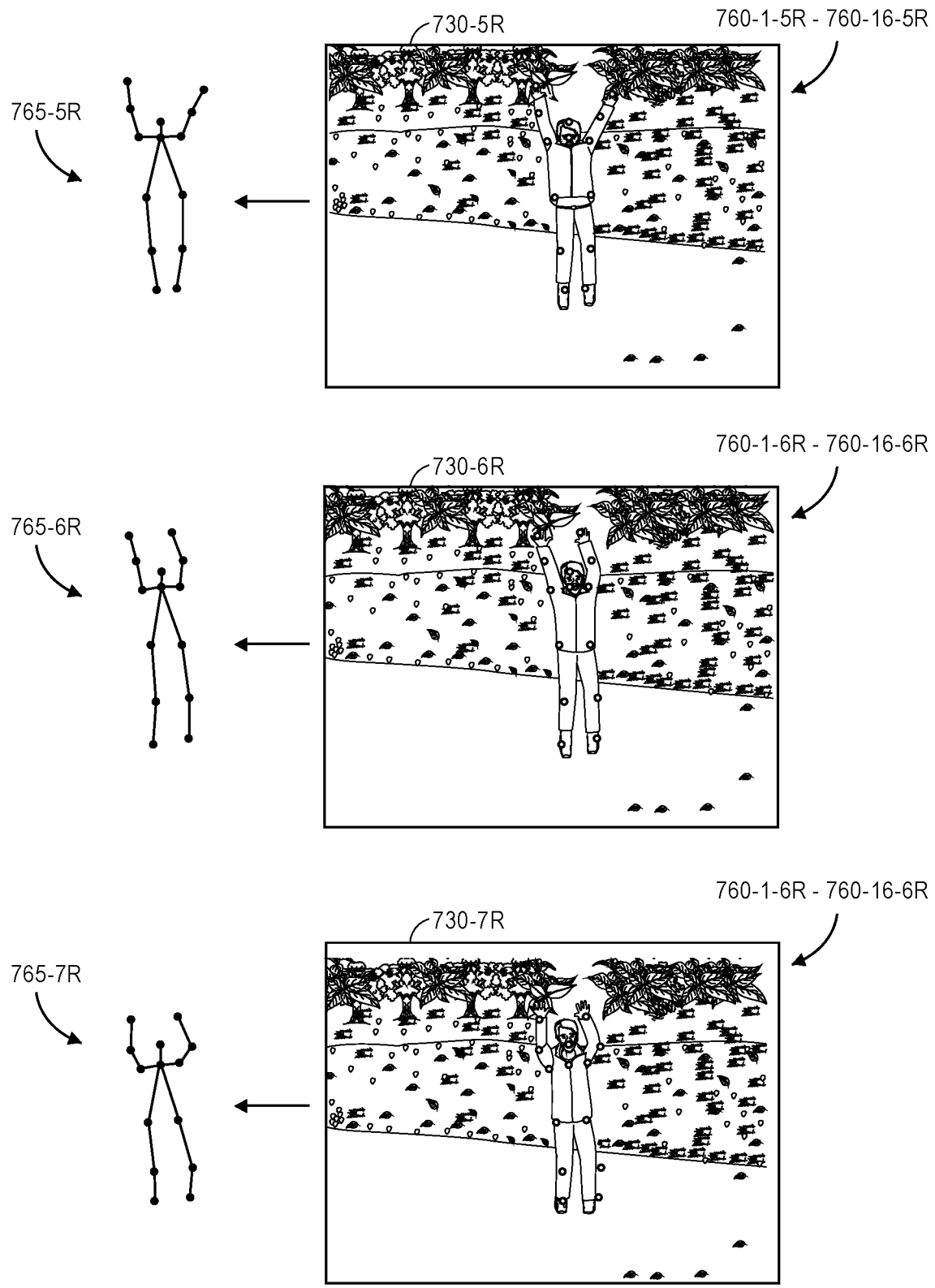

Processes by which body parts are detected and located within image frames, and by which models are constructed, may be repeated for each of the synchronized image frames that are captured using the imaging devices 725-1, 725-2. For example, as is shown in FIGS. 7E and 7F, a plurality of body parts 760-1-2L through 760-16-2L, 760-1-3L through 760-16-3L, 760-1-4L through 760-16-4L, 760-1-5L through 760-16-5L, 760-1-6L through 760-16-6L, 760-1-7L through 760-16-7L are detected in the image frames 730-2L, 730-3L, 730-4L, 730-5L, 730-6L, 730-7L captured at times $t_2$, $t_3$, $t_4$, $t_5$, $t_6$, $t_7$ using the imaging device 725-1. Models 765-2L, 765-3L, 765-4L, 765-5L, 765-6L, 765-7L of the detected body parts may be constructed based on detections thereof within each of the image frames 730-2L, 730-3L, 730-4L, 730-5L, 730-6L, 730-7L. Similarly, as is shown in FIGS. 7G and 7H, a plurality of body parts 760-1-2R through 760-16-2R, 760-1-3R through 760-16-3R, 760-1-4R through 760-16-4R, 760-1-5R through 760-16-5R, 760-1-6R through 760-16-6R, 760-1-7R through 760-16-7R are detected in the synchronized image frames 730-2R, 730-3R, 730-4R, 730-5R, 730-6R, 730-7R captured at times $t_2$, $t_3$, $t_4$, $t_5$, $t_6$, $t_7$ using the imaging device 725-2. Models 765-2R, 765-3R, 765-4R, 765-5R, 765-6R, 765-7R of the detected body parts may be constructed based on detections thereof within each of the image frames 730-2R, 730-3R, 730-4R, 730-5R, 730-6R, 730-7R.

Three-dimensional tracks or trajectories of the body parts identified within the two-dimensional synchronized image frames 730-1L, 730-2L, 730-3L, 730-4L, 730-5L, 730-6L, 730-7L and image frames 730-1R, 730-2R, 730-3R, 730-4R, 730-5R, 730-6R, 730-7R may be defined based on the motion of the respective body parts from frame to frame, as represented by the models 765-1L, 765-2L, 765-3L, 765-4L, 765-5L, 765-6L, 765-7L and the models 765-1L, 765-2L, 765-3L, 765-4L, 765-5L, 765-6L, 765-7L, and merged together to form an articulated model of the actor, subject to one or more physiological parameters or constraints, e.g., bone lengths, distance constraints, articulation constraints or deformation constraints.

Figure 8:
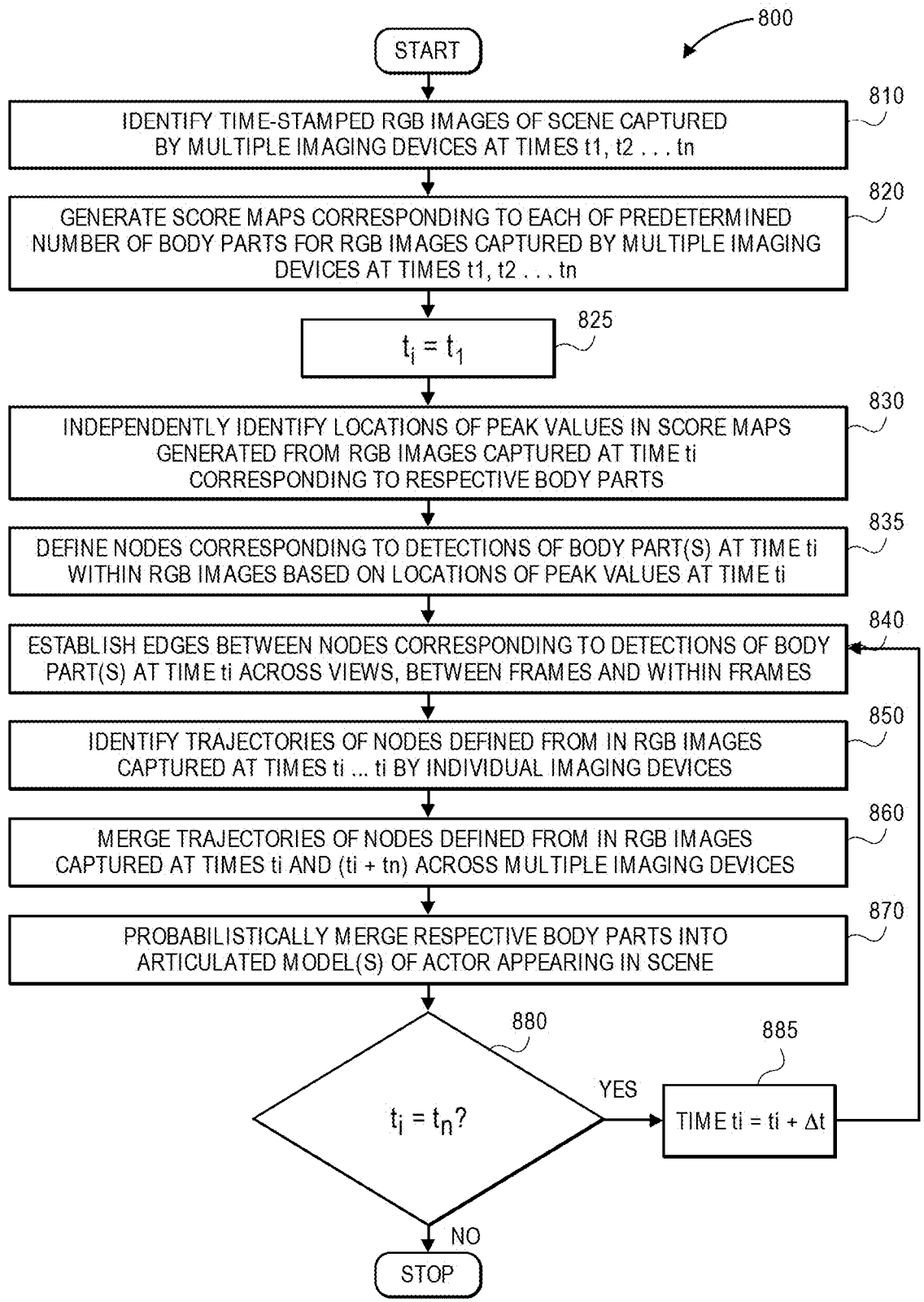
FIG. 8 is a flow chart of one process for recognizing and tracking poses using digital imagery captured from multiple fields of view in accordance with implementations of the present disclosure.

In some implementations of the present disclosure, poses or gestures of one or more actors may be recognized and tracked within scenes either in real time or in near-real time, or forensically after the poses or gestures have been executed, in synchronized image frames captured by two or more imaging devices aligned with overlapping fields of view. Referring to FIG. 8, a flow chart 800 of one process for recognizing and tracking poses using digital imagery captured from multiple fields of view in accordance with implementations of the present disclosure is shown. At box 810, a plurality of time-stamped RGB images of a scene that were captured by multiple imaging devices at times $t_1$, $t_2 \ldots t_n$ are identified. The RGB images may have been captured by any number of imaging devices, e.g., two or more of such devices, mounted in specific perspectives and having views that overlap within a scene. The images may have been synchronized at the time of their capture or subsequently. At box 820, score maps corresponding to each of the predetermined number of body parts are generated for each of the RGB images captured by the imaging devices at times $t_1$, $t_2 \ldots t_n$. As is discussed above, for each body part, and for each image, the score maps indicate probabilities that a given pixel of the image depicts all or a portion of a given body part.

At box 825, a value of a step variable $t_i$ is set to the time $t_1$. At box 830, locations of peak values within the score maps generated from the RGB images captured at time $t_i$ are independently identified. Where any portion of score map generated from an image includes a predetermined value corresponding to a given body part, or values in excess of a predetermined threshold for the given body part, the image may be presumed to depict the given body part in locations corresponding to such values. Where a score map does not include any of the predetermined value, or any values in excess of the predetermined threshold, however, the image may be presumed to not depict the given body part anywhere therein. At box 835, nodes corresponding to the detections of the one or more body parts at time $t_i$ within the RGB images are defined based on the locations of the peak values at time $t_i$ determined at box 830. Additionally, one or more vectors extending from nodes corresponding to detected body parts, to locations where other body parts may be located with respect to the detected body parts, may be defined.

At box 840, edges between the nodes corresponding to the detections of the one or more body parts at time $t_i$ are established across views from which frames were captured at time between frames captured at time $t_i$ or at other times, or within frames captured at time $t_i$. As is discussed above, triangulation edges may be established between nodes corresponding to detections of the same body part in synchronized image frames captured at time $t_i$ from different views, while temporal edges may be established between nodes corresponding to detections of the same body part in image frames captured by a common imaging device at time $t_i$ and at other times, and regression edges may be established between nodes corresponding to detections of different body parts in the same image frame.

At box 850, trajectories of the nodes defined from the RGB images captured by the individual imaging devices from time $t_1$ to time $t_i$ are defined. For example, referring again to FIGS. 6A through 6E, trajectories 662-1, 662-5, 662-6, 662-7, 662-8 of individual body parts may be defined based on positions of such body parts identified in successive image frames 630-1, 630-2, 630-3, 630-4, 630-5, and such trajectories may be further enhanced based on the detections of such body parts in successive image frames. Where an image frame does not include any locations of peak values corresponding to a given body part of an actor therein, the body part may be determined to have departed a scene, or may be occluded within the scene, e.g., obscured by one or more structural features, other body parts of the actor, or by one or more other actors. The trajectories may be smoothed three-dimensional tracks that best fit a plurality of two-dimensional observations of a body part within multiple image frames. In some implementations, the trajectories may be defined by minimizing differences between ray projections extending from optical elements of imaging devices to pixels depicting specific body parts detected within image frames captured by such imaging devices and splines or other curves defined from such frames, e.g., according to a least squares problem. Any method or technique for defining a three-dimensional track or trajectory of a body part from two-dimensional observations of the body part in image frames may be utilized in accordance with the present disclosure.

At box 860, the trajectories of the respective body parts in the images captured by the multiple imaging devices from time $t_1$ to time $t_1$ are merged with one another. For example, where a trajectory of a left wrist of an actor is identified based on consecutive image frames captured by two different imaging devices, e.g., the imaging devices 725-1, 725-2 of FIG. 7A, the trajectories of the left wrist may be merged with one another to depict the overall motion of the left wrist in the fields of view of each of the imaging devices. At box 870, the respective body parts are probabilistically merged into a common skeleton (or model) of the actor, such as is shown in FIG. 1J. For example, where a trajectory of a left hip of an actor is defined from frame-to-frame in image frames captured by two or more imaging devices, the trajectory of the left hip may be merged with a trajectory of a left knee or a right hip of the actor that is similarly defined from frame-to-frame in the image frames, and an articulated model or virtual skeleton of the actor may be defined accordingly, subject to one or more known physiological parameters or constraints.

At box 880, whether the value of the step variable $t_1$ equals the time $t_n$ is determined, e.g., thereby indicating that locations of peak values in score maps generated from RGB images captured at each of the times $t_1$, $t_2$ . . . $t_n$ have been identified, and that nodes, edges, and trajectories have been established based on locations of peak values within such score maps, and that such trajectories have been merged to establish or update an articulated model from such images accordingly. If the value of the step variable $t_1$ is not equal to time $t_n$, then the process advances to box 885, where the value of the step variable $t_1$ is incremented by an increment $\Delta t$, before returning to box 830, where locations of peak values within the score maps generated from the RGB images captured at time $t_1$ are independently identified. If the value of the step variable $t_1$ is not equal to time $t_n$, then the process ends.

As is discussed above, some implementations of the present disclosure may be configured to recognize two or more unique actors within a scene, and to track the poses or gestures performed by each of the actors. Referring to FIGS. 9A through 9L, views of aspects of one system 900 for recognizing and tracking poses using digital imagery captured from multiple fields of view in accordance with implementations of the present disclosure are shown. Except where otherwise noted, reference numerals preceded by the number "9" shown in FIG. 9A through 9L indicate components or features that are similar to components or features having reference numerals preceded by the number "7" shown in FIG. 7A through 7H, by the number "6" shown in FIG. 6A through 6E, by the number "4" shown in FIG. 4A or FIG. 4B, by the number "2" shown in FIG. 2 or by the number "1" shown in FIGS. 1A through 1J.

Figure 9A:
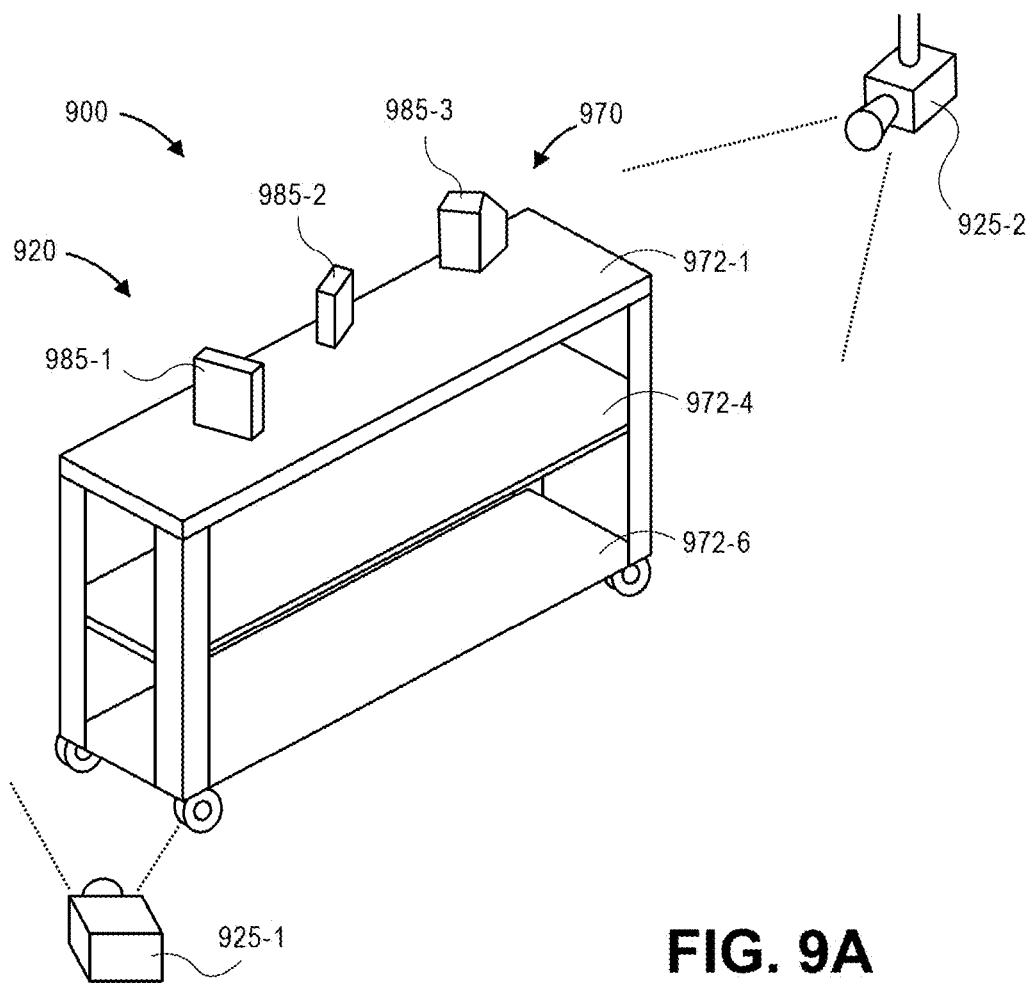
Figure 9B:
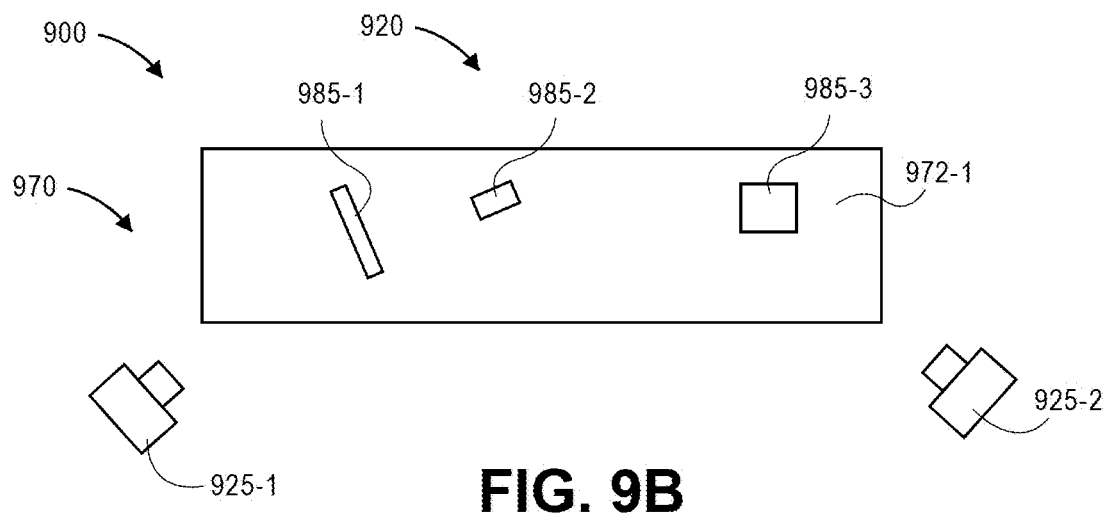

As is shown in FIGS. 9A and 9B, the system 900 includes a materials handling facility 920 having a pair of imaging devices 925-1, 925-2 and a storage unit 970 with a plurality of shelves 972-1, 972-2, 972-3. The imaging devices 925-1, 925-2 are aligned to include all or portions of the storage unit 970 and/or the shelves 972-1, 972-2, 972-3 within their respective fields of view. As is also shown in FIGS. 9A and 9B, a plurality of items 985-1, 985-2, 985-3 are deposited on the shelf 972-1.

Figure 9C:
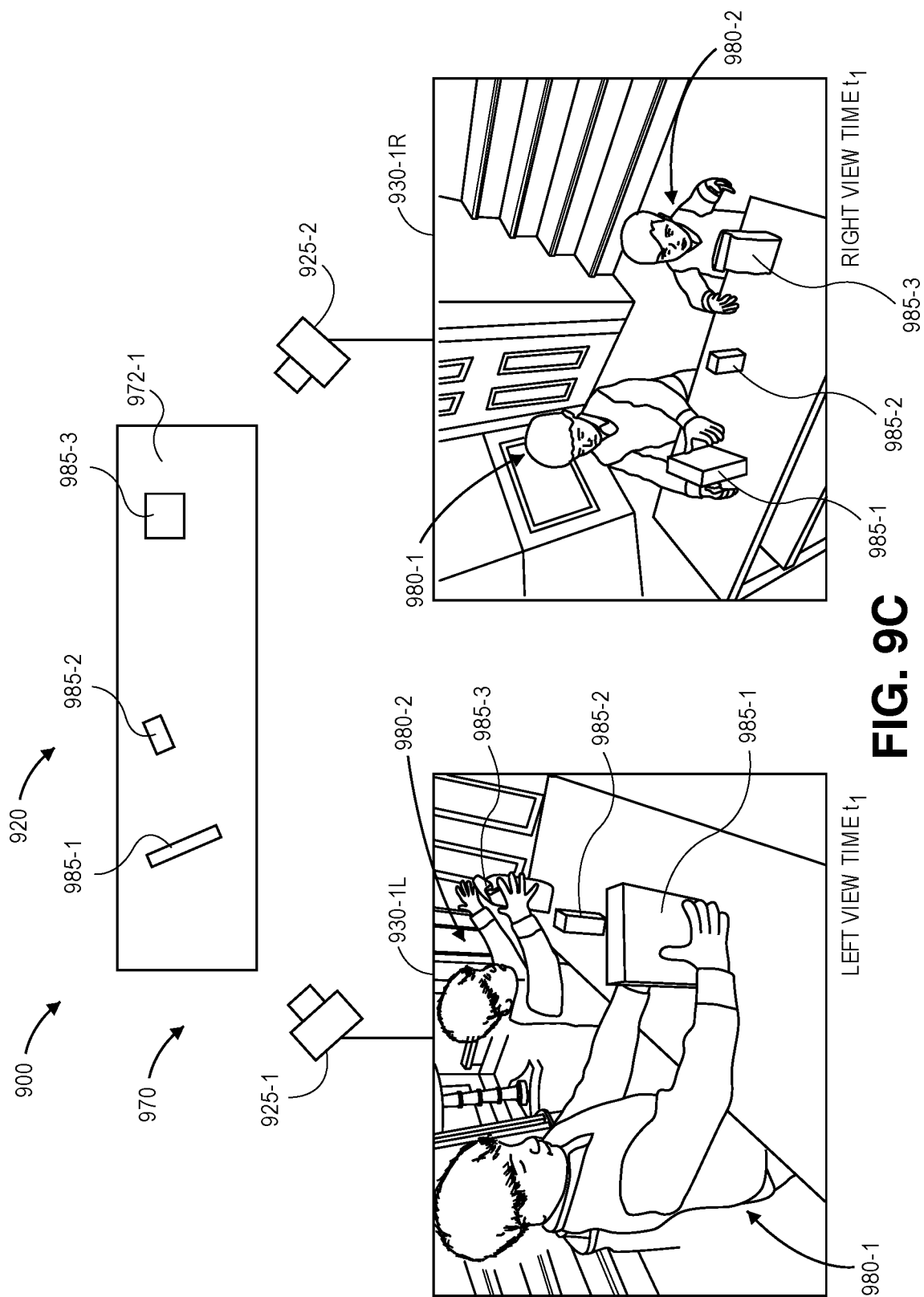

As is shown in FIGS. 9C through 9F, the imaging devices 925-1, 925-2 capture imaging data as a plurality of actors 980-1, 980-2 perform poses and gestures within the materials handling facility 920, and interact with the one or more items 985-1, 985-2, 985-3 or other items on the shelves 972-1, 972-2, 972-3 there. For example, as is shown in FIG. 9C, the imaging devices 925-1, 925-2 captured the synchronized images 930-1L, 930-1R at a time with each of the images 930-1L, 930-1R depicting the actor 980-1 evaluating the item 985-1 and the actor 980-2 interacting with the item 985-3 on the shelf 972-1.

Figure 9D:
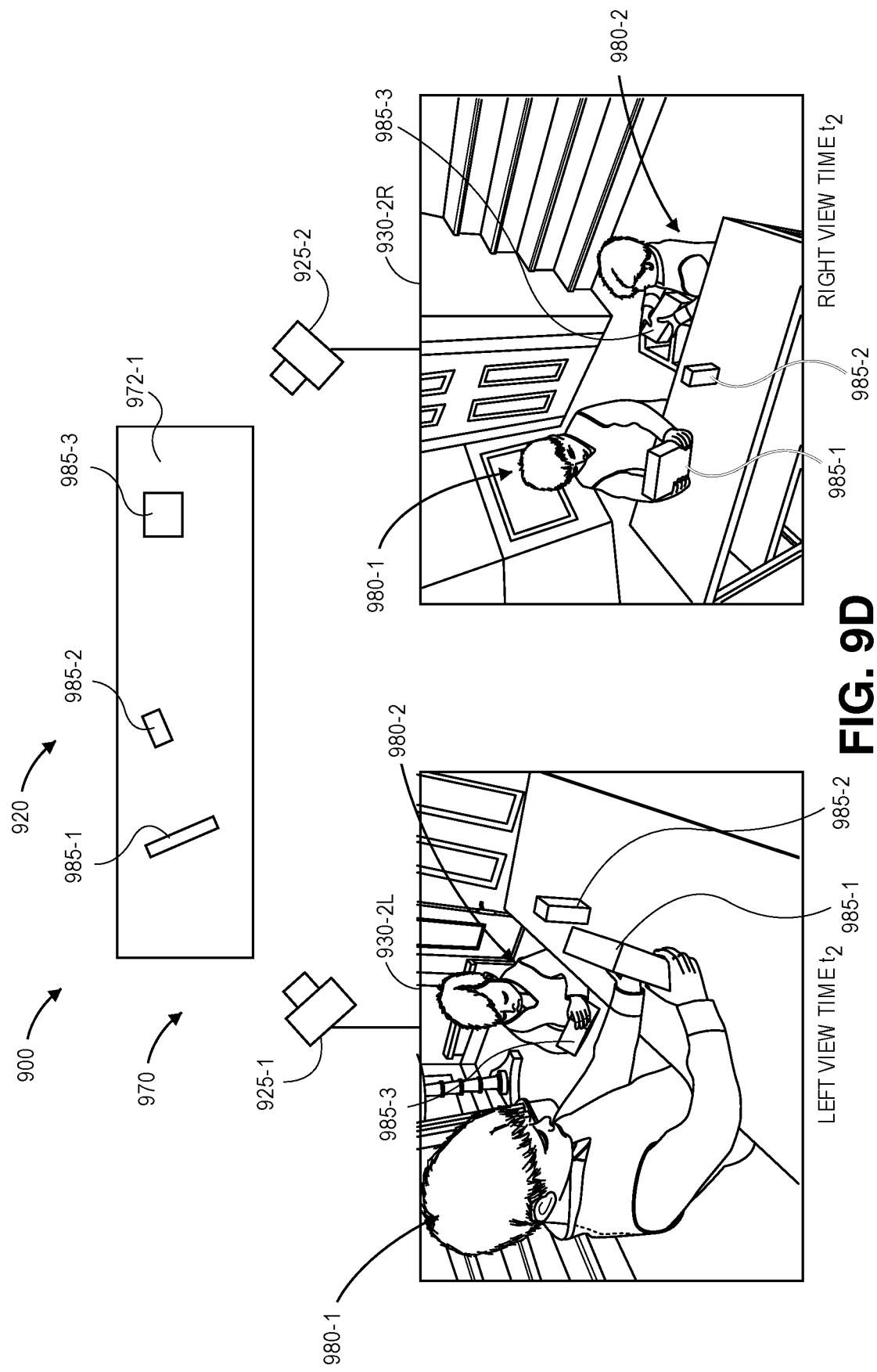
Figure 9E:
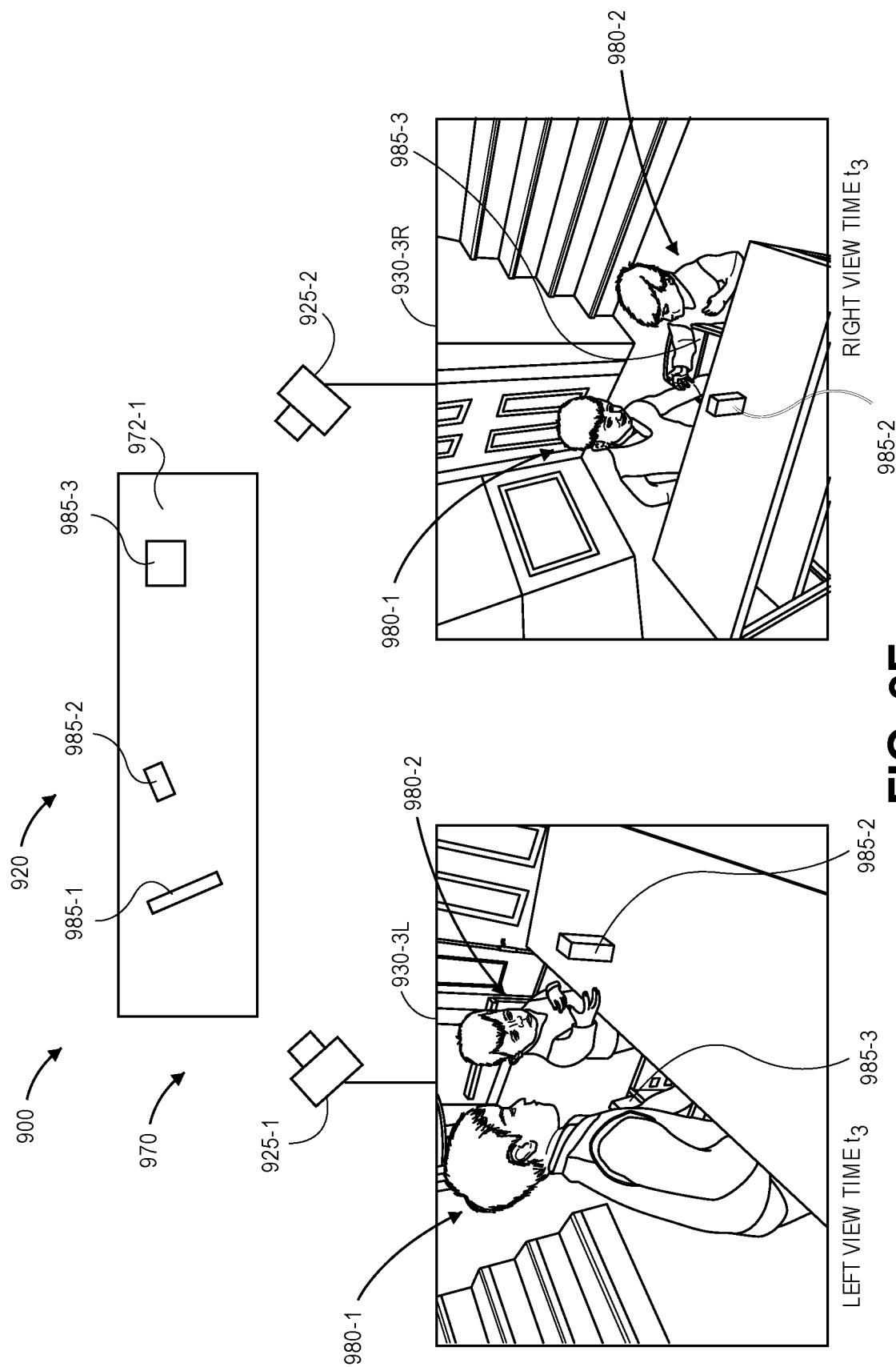
Figure 9F:
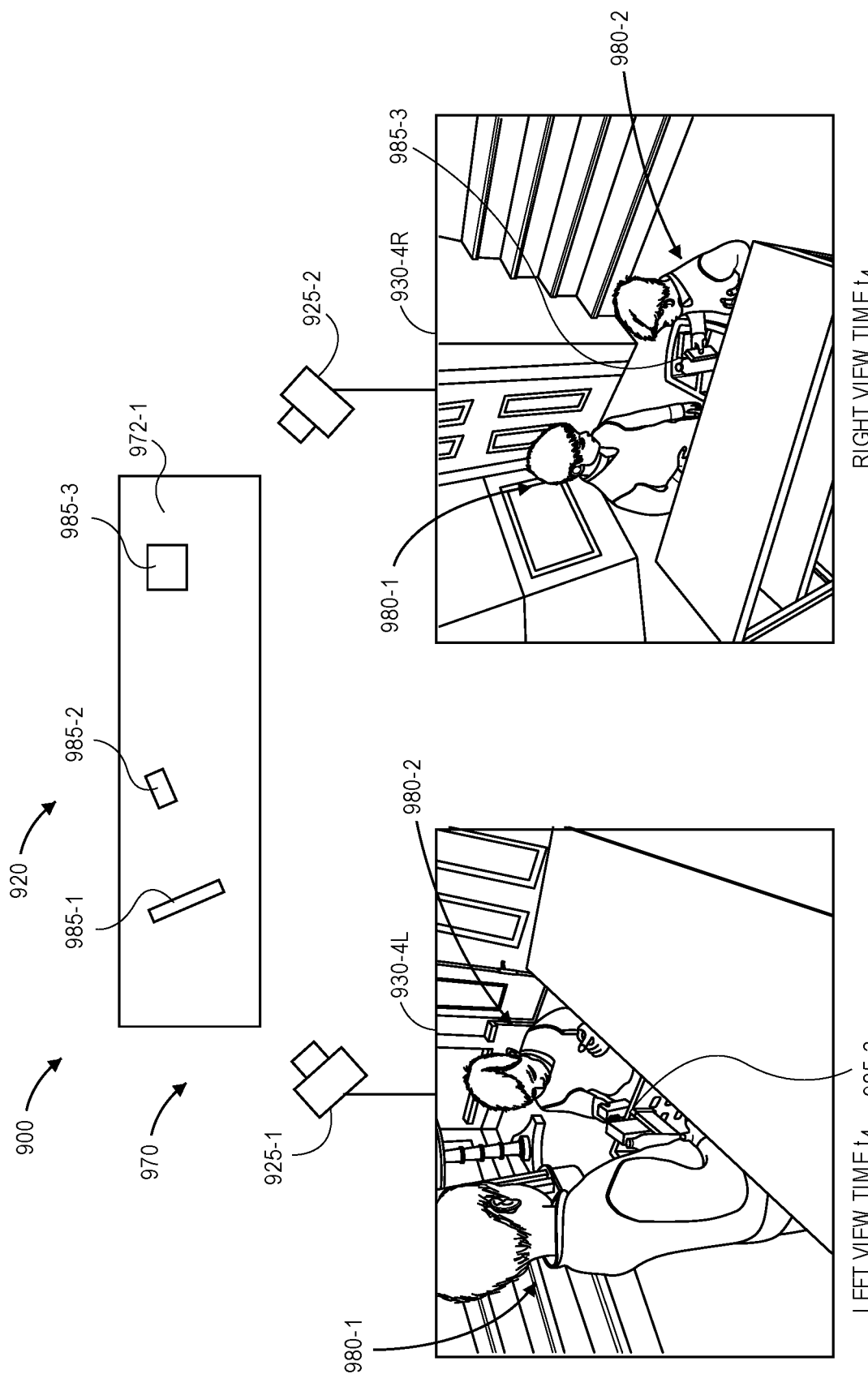

As is shown in FIG. 9D, the imaging devices 925-1, 925-2 captured the synchronized images 930-2L, 930-2R at a time $t_2$, with each of the images 930-2L, 930-2R depicting the actor 980-1 as he continues to evaluate the item 985-1, while the actor 980-2 retrieves the item 985-3 from the shelf 972-1 and places the item 985-3 into a cart. As is shown in FIG. 9E, the imaging devices 925-1, 925-2 captured the synchronized images 930-3L, 930-3R at a time $t_3$, with each of the images 930-3L, 930-3R depicting the actor 980-1 placing the item 985-1 into a cart, while the actor 980-2 attempts to retrieve the item 985-2 from the shelf 972-1. As is shown in FIG. 9F, the imaging devices 925-1, 925-2 captured the synchronized images 930-4L, 930-4R at a time $t_4$, with each of the images 930-4L, 930-4R depicting the actor 980-1 looking on as the actor 980-2 places the item 985-2 into the cart.

As is discussed above, the systems and methods of the present disclosure may identify and distinguish between two or more actors within a scene, such as by generating score maps from synchronized image frames for one or more body parts, determining whether two or more detections of the same body part type appear within the synchronized image frames based on the score maps, and confirming that the detections correspond to different actors, such as by associating the detections with other body parts, or evaluating the detections with respect to one or more known physiological parameters or constraints.

Figure 9G:
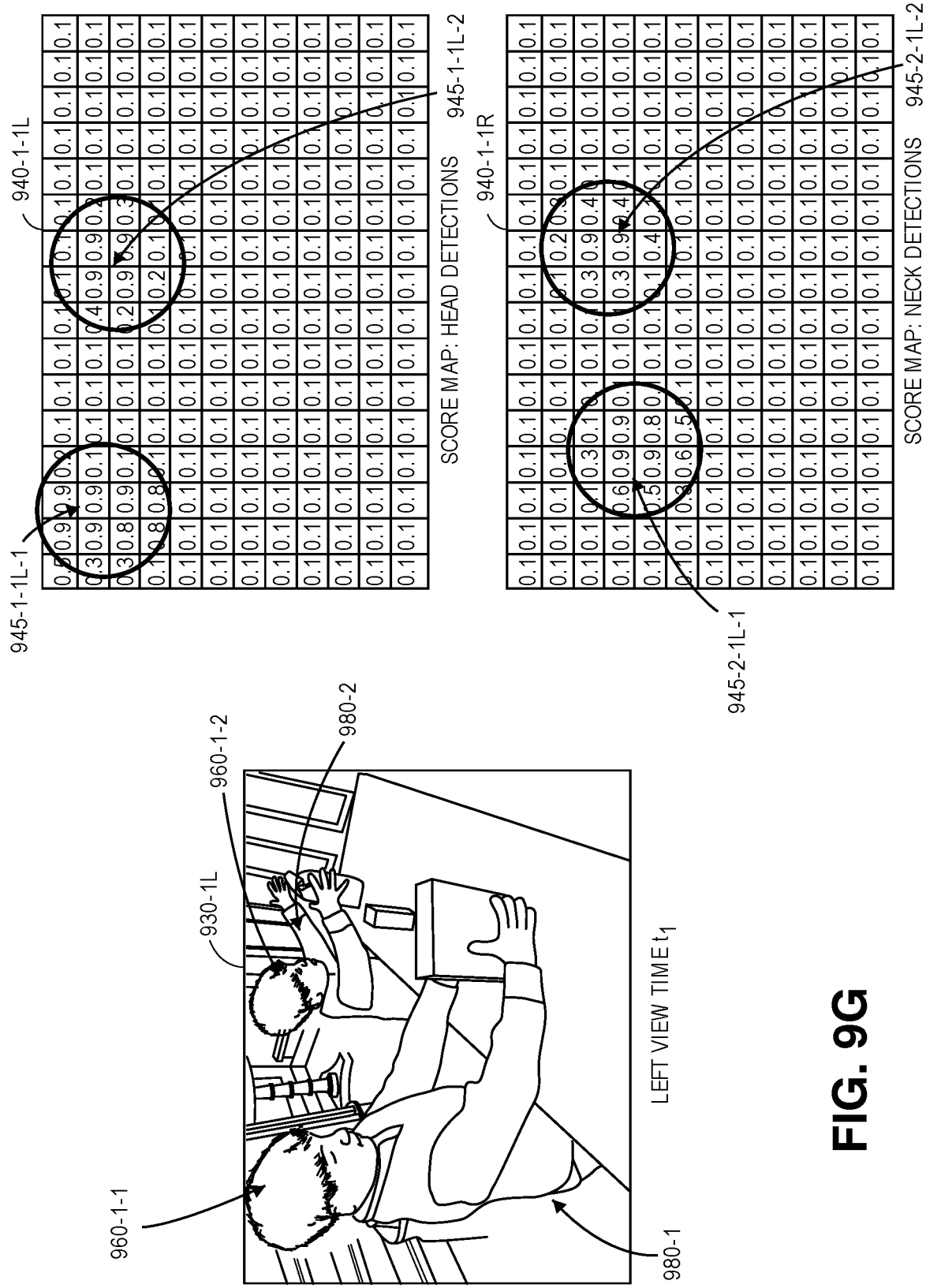

As is shown in FIG. 9G, a score map 940-1-1L and a score map 940-2-1L are generated based on the synchronized image frame 930-1L, e.g., by providing the image frame 930-1L to a classifier such as a deep neural network, a convolutional neural network or a support vector machine that is trained to detect one or more given body parts (viz., a head and a neck) within imaging data. For example, as is shown in FIG. 9G, the score map 940-1-1L is generated based on the image frame 930-1L, which was captured at the time $t_1$, and includes a region 945-1-1L-1 of peak values corresponding to a location of a head 960-1-1L-1 of the actor 980-1 within the image frame 930-1L. As is also shown in FIG. 9G, the score map 940-1-1L also includes a region 945-1-1L-2 of peak values corresponding to a location of a head 960-1-2-1L-1 of the actor 980-2 within the image frame 930-1L. Similarly, as is also shown in FIG. 9G, the score map 940-2-1L is generated based on the image frame 930-1L and includes both a region 945-2-1L-1 of peak values corresponding to a location of a neck 960-2-1L-1 of the actor 980-1 and a location of a neck 960-2-1L-2 of the actor 980-2 within the image frame 930-1L.

Figure 9H:
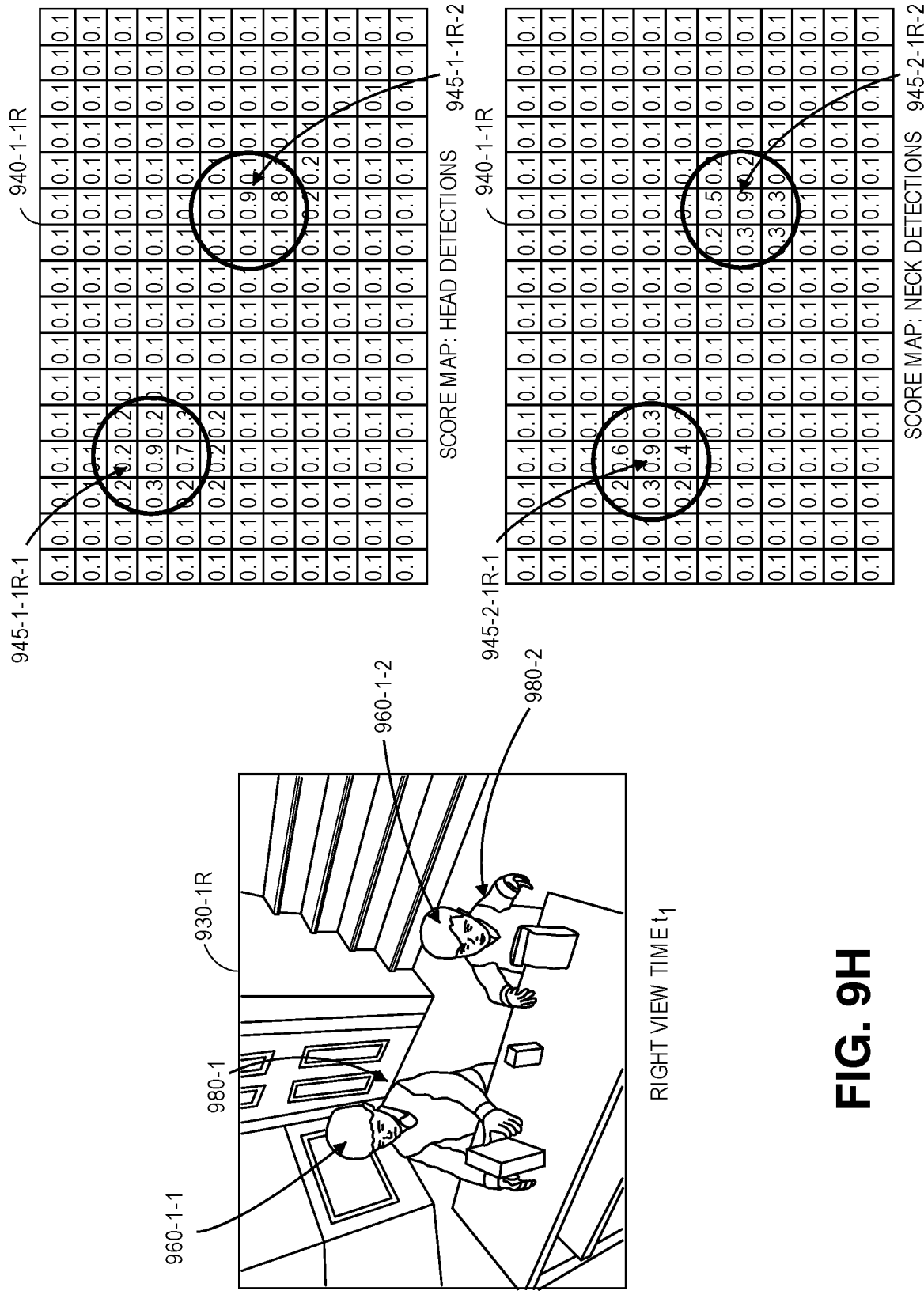

Likewise, as is shown in FIG. 9H, the score map 940-1-1R is generated based on the image frame 930-1R, which was also captured at the time $t_1$. The score map 940-1-1R includes a region 945-1-1R-1 of peak values corresponding to a location of the head 960-1-1R-1 of the actor 980-1 within the image frame 930-1R, and a region 945-1-1R-2 of peak values corresponding to a location of the head 960-1-1R-2 of the actor 980-2 within the image frame 930-1R. The score map 940-2-1R is also generated based on the image frame 930-1R, and includes a region 945-2-1R-1 of peak values corresponding to a location of the neck 960-2-1R-1 of the actor 980-1 and also a region 945-2-1R-2 of peak values corresponding to a location of the neck 960-2-1R-2 of the actor 980-2 within the image frame 930-1R.

The region 945-1-1L-1 of the score map 940-1-1L and the region 945-1-1R-1 of the score map 940-1-1R may be confirmed to correspond to the same head by establishing nodes based on such regions, by extending rays from the sensor of the imaging device 925-1 through the node corresponding to the region 945-1-1L-1, and from the sensor of the imaging device 925-2 through the node corresponding to the region 945-1-1R-1, and by correlating pairs of the regions 945-1-1L-1, 945-1-1R-1 accordingly. For example, because a ray extending from the imaging device 925-1 through a node defined by the region 945-1-1L-1 of the score map 940-1-1L and a ray extending from the imaging device 925-2 through the region 945-1-1R-1 of the score map 940-1-1R would intersect, the regions 945-1-1L-1, 945-1-1R-1 may be determined to correspond to the same body part, viz., the head of the actor 980-1. Similarly, the region 945-1-1L-2 of the score map 940-1-1L and the region 945-1-1R-2 of the score map 940-1-1R may also be confirmed to correspond to the same head by establishing nodes based on such regions, by extending rays from the sensor of the imaging device 925-1 through the node corresponding to the region 945-1-1L-2, and from the sensor of the imaging device 925-2 through the node corresponding to the region 945-1-1R-2 and by correlating pairs of the regions 945-1-1L-2, 945-1-1R-2 accordingly.

The region 945-2-1L-1 of the score map 940-2-1L and the region 945-2-1R-1 of the score map 940-2-1R may be confirmed to correspond to the same neck by establishing nodes based on such regions, by extending rays from the sensor of the imaging device 925-1 through the node corresponding to the region 945-2-1L-1, and from the sensor of the imaging device 925-2 through the node corresponding to the region 945-2-1R-1, and by correlating pairs of the regions 945-2-1L-1, 945-2-1R-1 accordingly. For example, because a ray extending from the imaging device 925-1 through a node defined by the region 945-2-1L-1 of the score map 940-2-1L and a ray extending from the imaging device 925-2 through the region 945-2-1R-1 of the score map 940-2-1R would intersect, the regions 945-2-1L-1, 945-2-1R-1 may be determined to correspond to the same body part, viz., the neck of the actor 980-1. Similarly, the region 945-2-1L-2 of the score map 940-2-1L and the region 945-2-1R-2 of the score map 940-2-1R may also be confirmed to correspond to the same neck by establishing nodes based on such regions, by extending rays from the sensor of the imaging device 925-1 through the node corresponding to the region 945-2-1L-2, and from the sensor of the imaging device 925-2 through the node corresponding to the region 945-2-1R-2 and by correlating the pair of the regions 945-2-1L-2, 945-2-1R-2 accordingly.

As is discussed above, when locations of peak values are identified in score maps corresponding to individual body parts, and nodes are defined based on such locations, edges may be established between corresponding nodes on a temporal basis, a triangulation basis or a regression basis. For example, triangulation edges may be established between nodes corresponding to detections of the same body part in synchronized image frames captured from different views, while temporal edges may be established between nodes corresponding to detections of the same body part in image frames captured by a common imaging device, and regression edges may be established between nodes corresponding to detections of different body parts in the same image frame. Such edges may be contracted or severed, however, when probabilities that each of the nodes connected by an edge is associated with a common actor are sufficiently high or low, respectively. For example, an edge between nodes corresponding to two body parts may be confirmed where it is sufficiently certain that the two body parts belong to the same actor, while an edge between the two body parts may be severed where it is sufficiently certain that the two body parts do not belong to the same actor.

Figure 9I:
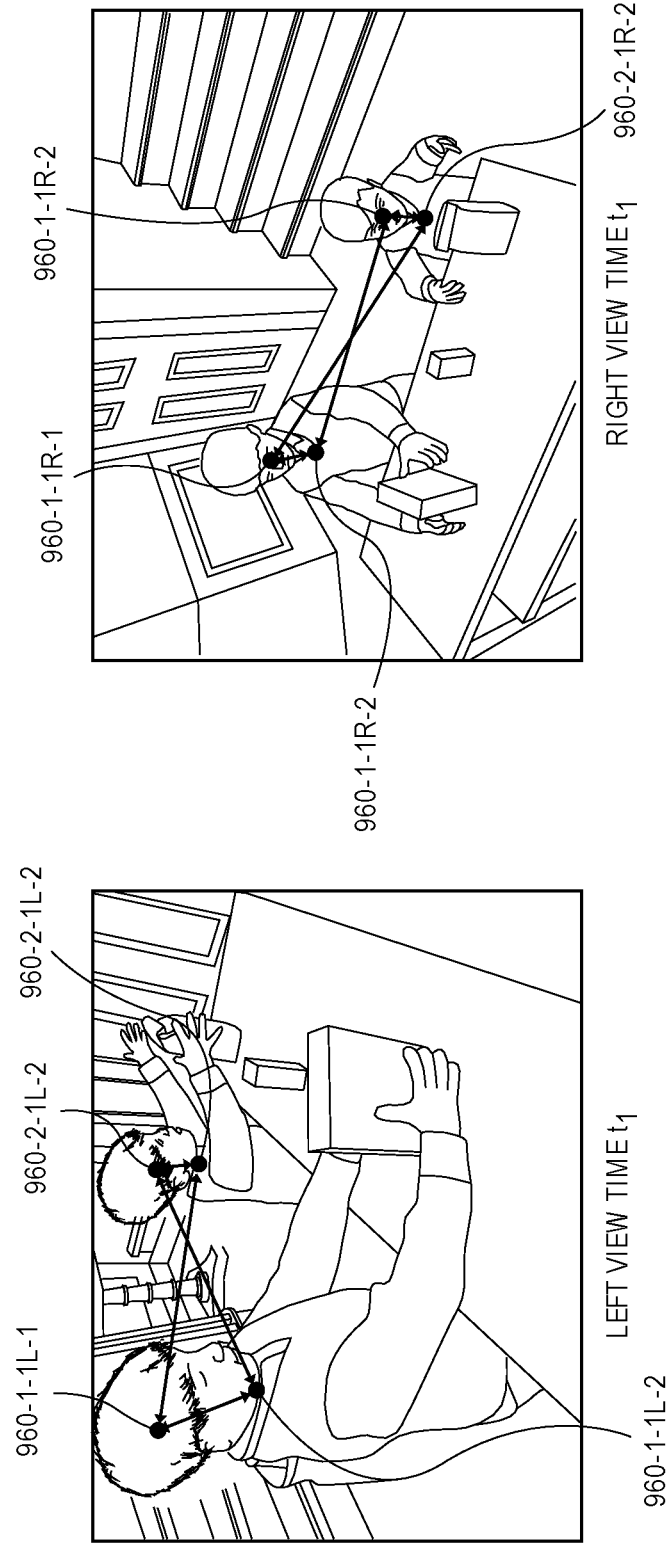

As is shown in FIG. 9I, the detections 960-1-1L-1, 960-1-1L-2 of heads within the image frame 930-1L captured at time $t_1$ and the detections 960-1-1R-1, 960-1-1R-2 of heads within the image frame 930-1R captured at time $t_1$ are sufficiently separate and distinct from one another, such that the detections 960-1-1L-1 and 960-1-1R-1, and the detections 960-1-1L-2 and 960-1-1R-2 may be determined to not correspond to the same head. Similarly, the detections 960-2-1L-1, 960-2-1L-2 of necks within the image frame 930-1L and the detections 960-2-1R-1, 960-2-1R-2 of necks within the image frame 930-1R are sufficiently separate and distinct from one another, such that the detections 960-2-1L-1 and 960-2-1L-2, and the detections 960-2-1R-1 and 960-2-1R-2 may be determined to not correspond to the same neck.

Moreover, as is also shown in FIG. 9I, the detection 960-1-1L-1 of a head in the image frame 930-1L is sufficiently close to the detection 960-2-1L-1 of a neck, and is sufficiently separate and distinct from the detection 960-2-1L-2, while the detection 960-1-1R of a head in the image frame 930-1R is sufficiently close to the detection 960-2-1R-1 of a neck, and is sufficiently separate and distinct from the detection 960-2-1R-2. Therefore, it may be determined based on any known physiological parameters or constraints (e.g., standard neck lengths, or standard positions of necks between shoulders) that the head corresponding to the detection 960-1-1L-1 in the image frame 930-1L and the detection 960-1-1R-1 in the image frame 930-1R is associated with the neck corresponding to the detection 960-2-1L-1 in the image frame 930-1L and the detection 960-2-1R-1 in the image frame 930-1R, but is not associated with the neck corresponding to the detection 960-2-1L-2 in the image frame 930-1L and the detection 960-2-1R-2 in the image frame 930-1R. Similarly, it may also be determined that the head corresponding to the detection 960-1-1L-2 in the image frame 930-1L and the detection 960-1-1R-2 in the image frame 930-1R is associated with the neck corresponding to the detection 960-2-1L-2 in the image frame 930-1L and the detection 960-2-1R-2 in the image frame 930-1R, and is not associated with the neck corresponding to the detection 960-2-1L-1 in the image frame 930-1L and the detection 960-2-1R-1 in the image frame 930-1R.

The processes by which nodes are defined from locations of peak values within score maps and edges are established between such nodes described above, and the processes by which such edges may be contracted or severed, as necessary, as described above, may be performed and/or repeated for every detection of every body part under consideration, in every image frame captured from every view, at any time, as necessary, in order to determine which of the detections of body parts corresponds to which actor within a scene, and which of the detections of body parts is correlated with other detections of body parts. For example, as is discussed above, each human has only one head, only one neck, only one left shoulder, and so on and so forth. Similarly, each head is only connected to one neck, each neck is connected to only one left shoulder, and each left shoulder is connected to only one left elbow, and so on and so forth.

For example, as is shown in FIG. 9J, a plurality of body parts of the actors 980-1, 980-2 that are within the fields of view of the imaging devices 925-1, 925-2 may be detected from peak values of score maps generated based on the image 930-2L and the image 930-2R (not shown in FIG. 9J), each of which was captured at the time $t_2$, or from any other pairs of synchronized image frames, may be merged together in order to detect heads 960-1-1, 960-1-2, necks 960-2-1, 960-2-2, left shoulders 960-3-1, 960-3-2, right shoulders 960-4-1, 960-4-2, left elbows 960-5-1, 960-5-2, right elbows 960-6-1, left wrists 960-7-1, 960-7-2, right wrists 960-8-1, 960-8-2, left hips 960-11-1, 960-11-2, and right hips 960-12-1, 960-12-2.

Figure 9K:
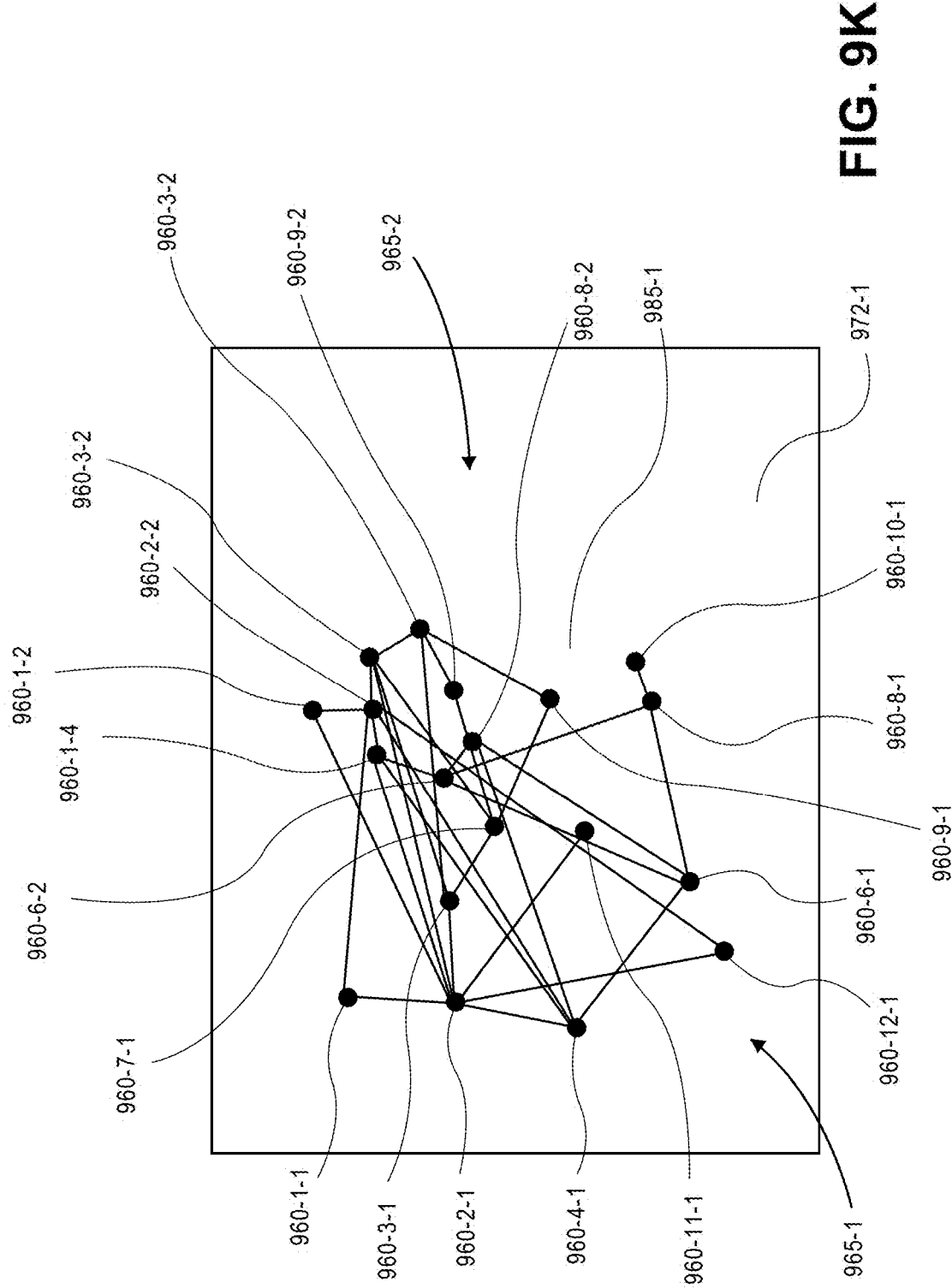

Subsequently, as is shown in FIG. 9K, edges may be established between each of the nodes corresponding to the detected heads 960-1-1, 960-1-2, necks 960-2-1, 960-2-2, left shoulders 960-3-1, 960-3-2, right shoulders 960-4-1, 960-4-2, left elbows 960-5-1, 960-5-2, right elbows 960-6-1, left wrists 960-7-1, 960-7-2, right wrists 960-8-1, 960-8-2, left hips 960-11-1, 960-11-2, and right hips 960-12-1, 960-12-2. For example, as is shown in FIG. 9K, a first edge extends between the detected head 960-1-1 and the detected neck 960-2-1, and a second edge extends between the detected head 960-1-1 and the detected neck 960-2-2. Probabilities that the respective necks 960-2-1, 960-2-2 are associated with the head 960-1-1 may be assigned to each of the edges accordingly. Similarly, edges extend between the detected right shoulder 960-4-1 and each of the detected necks 960-2-1, 960-2-2, and also between the detected right shoulder 960-4-1 and each of the detected right wrists 960-8-1, 960-8-2. Probabilities that the detected right shoulder 960-4-1 is assigned to one of the detected necks 960-2-1, 960-2-2, and to one of the detected right wrists 960-8-1, 960-8-2, may be assigned accordingly.

Subsequently, as is shown in FIG. 9L, the detections of the body parts of the actors 980-1, 980-2 may be bifurcated into discrete articulated models 965-1, 965-2 that are detected based on peak values of score maps generated from the synchronized image frames 930-2L, 930-2R may be merged into virtual skeletons (or models) 965-1, 965-2 of the actors 980-1, 980-2, subject to one or more physiological parameters or constraints. For example, as is shown in FIG. 9L, the articulated model 965-1 representative of the actor 980-1 is formed from the head 960-1-1, the neck 960-2-1, the left shoulder 960-3-1, the right shoulder 960-4-1, the left elbow 960-5-1, the right elbow 960-6-1, the left wrist 960-7-1, the right wrist 960-8-1, the left hip 960-11-1 and the right hip 960-12-1. Likewise, the articulated model 965-2 representative of the actor 980-2 is formed from the head 960-1-2, the neck 960-2-2, the left shoulder 960-3-2, the right shoulder 960-4-2, the left elbow 960-5-2, the right elbow 960-6-2, the left wrist 960-7-2, the right wrist 960-8-2, the left hip 960-11-2 and the right hip 960-12-2.

The articulated models 965-1, 965-2 may continue to be monitored and tracked within the fields of view of the imaging devices 925-1, 925-2, as long as at least one of the body parts remains within the fields of view. Poses and/or gestures of the actors 980-1, 980-2 may be detected and analyzed to update the positions and orientations of the respective body parts therein, and to update a representation of the motion accordingly.

Although some of the implementations disclosed herein reference the detection and tracking of body parts of human actors, the systems and methods of the present disclosure are not so limited. For example, the systems and methods disclosed herein may be used to detect and track candidate body parts of any non-human animals, as well as candidate parts of any number of machines or robots, and are not limited to detecting and tracking humans. Furthermore, although some of the implementations disclosed herein reference detecting and tracking interactions with specific items in a commercial setting, e.g., within a materials handling facility such as a fulfillment center, the systems and methods of the present disclosure are likewise not so limited. Rather, the systems and methods disclosed herein may be utilized to detect and track actors within any type of commercial or non-commercial settings, such as the live filming of performances in a stadium or theater, where one or more of the implementations disclosed herein may be used to determine whether an athlete's poses or gestures are associated with man-to-man or zone defense, or are indicative of an injury. Additionally, although some of the implementations described herein or shown in the accompanying figures refer to the processing of imaging data that is in color, e.g., according to an RGB color model, the systems and methods disclosed herein are not so limited, and may be used to process any type of information or data that is provided in color according to any color model, or in black-and-white or grayscale.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Additionally, it should also be appreciated that the detailed description is set forth with reference to the accompanying figures. In the figures, the use of the same reference numbers in different figures indicates similar or identical items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Moreover, with respect to the one or more methods or processes of the present disclosure shown or described herein, including but not limited to the flow charts shown in FIG. 3, 5 or 8, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A system comprising:
a first digital camera including at least a portion of a storage unit of a materials handling facility within a first field of view;
a second digital camera including at least the portion of the storage unit within a second field of view, wherein the second field of view overlaps the first field of view at least in part; and
a computer system in communication with the first digital camera and the second digital camera,
wherein the computer system includes at least one computer processor configured to at least:
capture a first image by the first digital camera at a first time;
generate a first plurality of score maps based at least in part on the first image, wherein each of the first plurality of score maps indicates probabilities that corresponding image pixels of the first image depict one of a plurality of body parts of a user of the materials handling facility;
identify, in a first score map of the first plurality of score maps, a first region of pixels corresponding to a first peak probability value for a first body part of the user;
capture a second image by the second digital camera at the first time;
generate a second plurality of score maps based at least in part on the second image, wherein each of the second plurality of score maps indicates probabilities that corresponding image pixels of the second image depict one of the plurality of body parts of the user;
identify, in a second score map of the second plurality of score maps, a second region of pixels corresponding to a second peak probability value for the first body part of the user;
capture a third image by the first digital camera at a second time;
generate a third plurality of score maps based at least in part on the third image, wherein each of the third plurality of score maps indicates probabilities that corresponding image pixels of the third image depict one of the plurality of body parts of the user;
identify, in a third score map of the third plurality of score maps, a third region of pixels corresponding to a third peak probability value for the first body part of the user;
capture a fourth image by the second digital camera at the second time;
generate a fourth plurality of score maps based at least in part on the fourth image, wherein each of the fourth plurality of score maps indicates probabilities that corresponding pixels of the fourth image depict one of the plurality of body parts of the user;
identify, in a fourth score map of the fourth plurality of score maps, a fourth region of pixels corresponding to a fourth peak probability value for the first body part of the user;
determine a first position of the first body part of the user in the materials handling facility at the first time based at least in part on the first region of pixels of the first score map and the third region of pixels of the third score map;
determine a second position of the first body part of the user in the materials handling facility at the second time based at least in part on the second region of pixels of the second score map and the fourth region of pixels of the fourth score map;
generate, for each of the plurality of body parts of the user, a first plurality of vectors extending from the first position of the first body part of the user to possible positions of each of the plurality of body parts of the user at the first time based at least in part on at least one physiological constraint;
generate, for each of the plurality of body parts of the user, a second plurality of vectors extending from the second position of the first body part of the user to possible positions of each of the plurality of body parts of the user at the second time based at least in part on the at least one physiological constraint;

determine a third position of a second body part at the first time based at least in part on a first one of the plurality of vectors;

determine a fourth position of the second body part at the second time based at least in part on a second one of the plurality of vectors; and define a skeletal model of the user based at least in part on the first position of the first body part at the first time, the second position of the first body part at the second time, the third position of the second body part at the first time and the fourth position of the second body part at the second time.

2. The system of claim 1, wherein the at least one computer processor is further configured to at least:

define a first trajectory of motion of the first body part from the first time to the second time based at least in part on the first region in the first position and the second position; and define a second trajectory of motion of the first body part from the first item to the second time based at least in part on the third position and the fourth position, wherein the skeletal model of the user is defined based at least in part on the first trajectory merged with the second trajectory.

3. The system of claim 1, wherein the at least one physiological constraint is a distance between the first body part and at least the second body part or a range in motion of at least the second body part with respect to the first body part, and wherein the at least one computer processor is further configured to at least:

determine the third position of the second body part at the first time based at least in part on the distance between the first body part and the second body part or the range in motion of the second body part with respect to the first body part.

4. A computer-implemented method comprising:

identifying a first image captured from a scene at a first time by a first imaging device having a first field of view;

providing at least the first image to at least one classifier as a first input;

receiving a first output from the at least one classifier;

determining, by at least one computer processor, a first location of a first body part of a first actor in the first image based at least in part on the first output, wherein the first body part is one of a plurality of body parts of the first actor;

identifying a second image captured from the scene at the first time by a second imaging device having a second field of view, wherein the second field of view at least partially overlaps the first field of view;

providing at least the second image to the at least one classifier as a second input;

receiving a second output from the at least one classifier;

determining, by the at least one computer processor, a second location of the first body part in the second image based at least in part on the second output;

correlating the first location and the second location to determine a first position of the first body part at the first time by the at least one computer processor;

defining at least a first vector based at least in part on the second output, wherein the first vector extends from the first position of the first body part at the first time to a possible position of a second body part at the first time;

determining a second position of the second body part at the first time based at least in part on the first position of the first body part and the first vector; and defining a virtual model of the first actor based at least in part on the first position of the first body part and the second position of the second body part.

5. The computer-implemented method of claim 4, wherein the first output comprises a first score map including a first plurality of probabilities that each of a plurality of corresponding image pixels of the first image depicts the first body part, wherein the second output comprises a second score map including a second plurality of probabilities that each of the plurality of corresponding image pixels of the second image depicts the first body part, wherein the determining the first location comprises:

selecting a first region of the first score map having at least one of a maximum peak value or a local peak value, wherein the selected first region of the first score map includes probabilities corresponding to image pixels of the first location of the first body part in the first image, and wherein the determining the second location comprises:

selecting a second region of the second score map having at least one of a maximum peak value or a local peak value, wherein the selected second region of the second score map includes probabilities corresponding to image pixels of the second location of the first body part in the second image.

6. The computer-implemented method of claim 5, wherein the first output further comprises a third score map including a third plurality of probabilities that each of a plurality of corresponding image pixels of the first image depicts the second body part, wherein the second output further comprises a fourth score map including a fourth plurality of probabilities that each of a plurality of corresponding image pixels of the second image depicts the second body part, wherein the computer-implemented method further comprises:

selecting a third region of the third score map having at least one of a maximum peak value or a local peak value, wherein the selected third region of the third score map includes probabilities corresponding to image pixels of a third location of the second body part in the third image; and selecting a fourth region of the fourth score map having at least one of a maximum peak value or a local peak value, wherein the selected fourth region of the fourth score map includes probabilities corresponding to image pixels of a fourth location of the second body part in the fourth image, and wherein the second position of the second body part at the first time is determined based at least in part on the selected third region and the selected fourth region.

7. The computer-implemented method of claim 4, wherein correlating the first location and the second location comprises:

defining, by the at least one computer processor, at least a first ray extending from a position of an optical element of the first imaging device through a position corresponding to at least a first pixel of the first image corresponding to the first location;

defining, by the at least one computer processor, at least a second ray extending from a position of an optical element of the second imaging device through a position corresponding to at least a second pixel of the second image corresponding to the second location; and determining, by the at least one computer processor, that the first ray and the second ray intersect, wherein the first position is determined in response to determining that the first ray and the second ray intersect.

8. The computer-implemented method of claim 4, wherein the first body part is one of:
a head, a neck, a left shoulder, a right shoulder, a left elbow, a right elbow, a left wrist, a right wrist, a left hand, a right hand, a left hip, a right hip, a left knee, a right knee, a left ankle or a right ankle of the first actor.

9. The computer-implemented method of claim 4, wherein correlating the first location and the second location comprises:
generating, by the at least one computer processor, a graph comprising a first node and a second node, wherein the first node corresponds to the first location and is defined based at least in part on the first body part, the first field of view and the first image, and wherein the second node corresponds to the second location and is defined based at least in part on the first body part, the second field of view and the second image;
establishing, by the at least one computer processor, a first edge between the first node and the second node; and
calculating, by the at least one computer processor, a first probability associated with the first edge, wherein the first probability is a probability that the first location and the second location belong to a common actor,
wherein defining the virtual model of the first actor based at least in part on the first position of the first body part and the second position of the second body part at the first time comprises:
determining that the first probability exceeds a predetermined threshold.

10. The computer-implemented method of claim 9, wherein the first body part is one of a type of body part, wherein determining the second location comprises:
determining, by the at least one computer processor, locations of a plurality of body parts of the type in the second image based at least in part on the second output, wherein the second location is one of the locations, wherein the graph further comprises a plurality of nodes corresponding to the locations, and wherein each of the plurality of nodes is defined based at least in part on the type of body part, the second field of view and the second image,
wherein establishing the first edge comprises:
establishing, by the at least one computer processor, edges between the first node and each of the plurality of nodes, wherein the first edge is one of the edges,
wherein calculating the first probability comprises:
calculating, by the at least one computer processor, probabilities associated with each of the edges, wherein the first probability is one of the probabilities;
ranking, by the at least one computer processor, each of the edges based at least in part on the probabilities; and
selecting the one of the edges having a highest probability,
wherein the selected one of the edges is the first edge.

11. The computer-implemented method of claim 4, wherein determining the first location comprises:
determining, based at least in part on the first output, a first plurality of locations of at least some of the plurality of body parts of the first actor in the first image, wherein the first location is one of the first plurality of locations, and wherein determining the second location comprises:
determining, based at least in part on the second output, a second plurality of locations of at least some of the plurality of body parts of the first actor in the second image, wherein the second location is one of the second plurality of locations, wherein correlating the first location and the second location comprises:
correlating, by the at least one computer processor, pairs of locations of at least some of the plurality of body parts of the first image and the second image to determine positions of the at least some of the plurality of body parts of the first actor at the first time, wherein each of the pairs comprises one of the first plurality of locations and one of the second plurality of locations, wherein the virtual model of the first actor is defined based at least in part on the positions of the body parts at the first time.

12. The computer-implemented method of claim 11, wherein correlating the pairs of locations comprises:
generating, by the at least one computer processor, a graph comprising a first plurality of nodes and a second plurality of nodes,
wherein each of the first plurality of nodes corresponds to one of the first plurality of locations and is defined based at least in part on one of the plurality of body parts, the first field of view and the first image, and
wherein each of the second plurality of nodes corresponds to one of the second plurality of locations and is defined based at least in part on one of the plurality of body parts, the second field of view and the second image;
establishing a plurality of edges by the at least one computer processor, wherein each of the plurality of edges extends between one of the first plurality of nodes and one of the second plurality of nodes;
calculating, by the at least one computer processor, probabilities associated with each of the plurality of edges, wherein each of the probabilities is a probability that the one of the first plurality of nodes and the one of the second plurality of nodes correspond to one of the plurality of body parts of the first actor;
determining that a first one of the probabilities exceeds a predetermined threshold by the at least one computer processor; and
identifying one of the first plurality of edges associated with the first one of the probabilities, wherein the one of the first plurality of edges extends between a first one of the first plurality of nodes corresponding to the first location and a second one of the second plurality of nodes corresponding to the second location.

13. The computer-implemented method of claim 11, further comprising:
generating, by the at least one computer processor, a graph comprising a first plurality of nodes, wherein each of the first plurality of nodes corresponds to one of the first plurality of locations and is defined based at least in part on one of the plurality of body parts, the first field of view and the first image;

establishing a plurality of edges by the at least one computer processor, wherein each of the plurality of edges extends between two of the first plurality of nodes;

calculating, by the at least one computer processor, probabilities associated with each of the plurality of edges, wherein each of the probabilities is a probability that the two of the first plurality of nodes correspond to two body parts of the first actor;

determining that a first one of the probabilities exceeds a predetermined threshold by the at least one computer processor; and identifying one of the plurality of edges associated with the first one of the probabilities, wherein the one of the first plurality of edges is established between a first one of the first plurality of nodes corresponding to the first location and a second one of the first plurality of nodes corresponding to a location of the second body part in the first image.

14. The computer-implemented method of claim 11, further comprising:

identifying a third image captured from the scene at a second time by the first imaging device;

providing at least the third image to the at least one classifier as a third input;

receiving a third output from the at least one classifier;

determining, based at least in part on the third output, a third plurality of locations of at least some of the plurality of body parts of the first actor in the third image, wherein a third location of the first body part is one of the third plurality of locations;

generating, by the at least one computer processor, a graph comprising a first plurality of nodes and a second plurality of nodes, wherein each of the first plurality of nodes corresponds to one of the first plurality of locations and is defined based at least in part on one of the plurality of body parts, the first field of view and the first image, and wherein each of the second plurality of nodes corresponds to one of the third plurality of locations and is defined based at least in part on one of the plurality of body parts, the first field of view and the third image;

establishing a plurality of edges by the at least one computer processor, wherein each of the plurality of edges extends between one of the first plurality of nodes and one of the second plurality of nodes;

calculating, by the at least one computer processor, probabilities associated with each of the plurality of edges, wherein each of the probabilities is a probability that the one of the first plurality of nodes and the one of the second plurality of nodes correspond to at least one body part of the first actor;

determining that a first one of the probabilities exceeds a predetermined threshold by the at least one computer processor; and identifying one of the plurality of edges associated with the first one of the probabilities is assigned by the at least one computer processor, wherein the one of the plurality of edges is established between a first one of the first plurality of nodes corresponding to the first location and a second one of the second plurality of nodes corresponding to the third location; and in response to identifying the one of the first plurality of edges, determining a third position of the first body part at the second time by the at least one computer processor, wherein the virtual model is defined based at least in part on the third position of the first body part at the second time.

15. The computer-implemented method of claim 4, further comprising:

identifying a third image captured from the scene at a second time by the first imaging device;

providing at least the third image to the at least one classifier;

receiving a third output from the at least one classifier;

determining, by the at least one computer processor, a third location of the first body part in the third image based at least in part on the third output;

identifying a fourth image captured from the scene at the second time by the second imaging device;

providing at least the fourth image to the at least one classifier as a fourth input;

receiving a fourth output from the trained classifier;

determining, by the at least one computer processor, a fourth location of the first body part in the fourth image based at least in part on the fourth output;

correlating the third location and the fourth location to determine a third position of the first body part at the second time by the at least one computer processor, wherein the virtual model of the first actor is defined based at least in part on the third position of the first body part at the second time.

16. The computer-implemented method of claim 15, further comprising:

defining, by the at least one computer processor, a first trajectory of motion of the first body part from the first time to the second time based at least in part on the first location and the third location;

defining, by the at least one computer processor, a second trajectory of the motion of the first body part from the first time to the second time, based at least in part on the second location and the fourth location; and merging the first trajectory of the motion and the second trajectory of the motion by the at least one computer processor, wherein the virtual model of the first actor is defined based at least in part on the merged trajectories.

17. The computer-implemented method of claim 4, further comprising:

determining, by the at least one computer processor, a third location of the second body part of the first actor in the first image at the first time based at least in part on the first output; and determining that the third location is compatible with the first location based at least in part on at least one physiological constraint, wherein the second position of the second body part at the first time is determined based at least in part on the third location of the second body part.

18. The computer-implemented method of claim 4, further comprising:

determining, by the at least one computer processor, a third location of the first body part in the second image based at least in part on the second output; and at least one of:

determining that the second location of the first body part is compatible with the first location of the first body part based at least in part on at least one physiological constraint; or determining that the third location of the first body part of the first actor is incompatible with the first location of the first body part based at least in part on the at least one physiological constraint.

19. The computer-implemented method of claim 4, wherein defining at least the first vector comprises:
identifying, by the at least one computer processor, at least one physiological relationship between the first body part and the second body part, wherein the at least one physiological relationship is at least one of:
an expected distance between the first body part and the second body part; or
an expected range of motion of the second body part with respect to the first body part, and
wherein the first vector is defined based at least in part on the physiological relationship between the first body part and the second body part.

20. The computer-implemented method of claim 4, further comprising:
prior to providing at least the first image to the trained classifier as the first input:
providing a plurality of training images to the at least one classifier as training inputs, wherein each of the training images depicts at least one portion of a body part of a type of the first body part;
providing a plurality of training data to the at least one classifier as training outputs, wherein the training data comprises maximum values for regions of the training images including image pixels corresponding to body parts of the type and minimum values for regions of the training images not including image pixels corresponding to the body parts of the type; and
training the at least one classifier to recognize the type of the first body part in imaging data based at least in part on the training inputs and the training outputs.

21. The computer-implemented method of claim 4, wherein the trained classifier is one of a deep neural network, a convolutional neural network or a support vector machine.

22. A facility comprising:
a storage unit;
a first imaging device aligned to include at least a portion of the storage unit within a first field of view;
a second imaging device aligned to include at least a portion of the storage unit within a second field of view, wherein the second field of view at least partially overlaps the first field of view; and
a computer resource in communication with at least the first imaging device and the second imaging device,
wherein the computer resource is configured to at least:
capture a first image by the first imaging device at a first time;
provide the first image to a classifier as a first input, wherein the classifier is trained to identify a plurality of body parts in images;
receive, from the classifier as a first output, a first plurality of score maps, wherein each of the first plurality of score maps includes probabilities that each of a plurality of corresponding image pixels of the first image depicts one of the plurality of body parts;
capture a second image by the second imaging device at the first time;
provide the second image to the classifier as a second input;
receive, from the classifier as a second output, a second plurality of score maps, wherein each of the second plurality of score maps includes probabilities that each of a plurality of corresponding image pixels of the second image depicts one of the plurality of body parts;
determine, based at least in part on a first score map, that the first image includes a first location of a first type of body part and a second location of the first type of body part, wherein the first score map is one of the first plurality of score maps;
determine, based at least in part on a second score map, that the second image includes a third location of the first type of body part and a fourth location of the first type of body part, wherein the second score map is one of the second plurality of score maps;
determine, by the at least one computer processor, that the first location and the third location correlate to a first position of a first body part of the first type at the first time based at least in part on at least one physiological constraint;
determine, by the at least one computer processor, that the second location and the fourth location correlate to a second position of a second body part of the first type at the first time based at least in part on the at least one physiological constraint;
define, by the at least one computer processor, a first plurality of vectors based at least in part on the first output, wherein each of the first plurality of vectors extends from the first position of the first body part to possible positions of each of a first plurality of body parts at the first time, and wherein a first vector of the first plurality of vectors extends from the first position to a possible position of a third body part of a second type;
define, by the at least one computer processor, a second plurality of vectors based at least in part on the second output, wherein each of the second plurality of vectors extends from the second position of the second body part to possible positions of each of a second plurality of body parts at the first time, and wherein a second vector of the second plurality of vectors extends from the second position to a possible position of the fourth body part of the second type;
define, by the at least one computer processor, a first virtual model of a first actor based at least on the first position of the first body part of the first type and the first vector; and
define, by the at least one computer processor, a second virtual model of a second actor based at least in part on the second position of the second body part of the first type and the second vector.

23. The facility of claim 22, wherein the classifier is one of a deep neural network, a convolutional neural network or a support vector machine.

* * * * *